(12) United States Patent
Chiba et al.

(10) Patent No.: US 10,705,737 B2
(45) Date of Patent: Jul. 7, 2020

(54) STORAGE SYSTEM AND DATA ARRANGEMENT METHOD OF STORAGE SYSTEM

(71) Applicant: HITACHI, LTD., Tokyo (JP)

(72) Inventors: Takeru Chiba, Tokyo (JP); Masakuni Agetsuma, Tokyo (JP); Takahiro Yamamoto, Tokyo (JP); Hiroto Ebara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/563,522

(22) Filed: Sep. 6, 2019

(65) Prior Publication Data

US 2020/0125258 A1 Apr. 23, 2020

(30) Foreign Application Priority Data

Oct. 17, 2018 (JP) .................................. 2018-196235

(51) Int. Cl.
*G06F 3/06* (2006.01)
*G06F 11/20* (2006.01)

(52) U.S. Cl.
CPC ............ *G06F 3/061* (2013.01); *G06F 3/0653* (2013.01); *G06F 3/0679* (2013.01); *G06F 11/2094* (2013.01)

(58) Field of Classification Search
CPC ...... G06F 3/061; G06F 3/0653; G06F 3/0679; G06F 11/2094
See application file for complete search history.

(56) References Cited

U.S. PATENT DOCUMENTS

| 7,529,834 | B1 * | 5/2009 | Birrell | G06F 11/1464 |
| | | | | 707/999.1 |
| 7,886,016 | B1 * | 2/2011 | Tormasov | G06F 16/1865 |
| | | | | 709/213 |
| 7,958,433 | B1 * | 6/2011 | Yoon | G06F 11/1048 |
| | | | | 711/173 |
| 8,874,494 | B1 * | 10/2014 | Evans | G06F 11/3485 |
| | | | | 706/12 |

(Continued)

FOREIGN PATENT DOCUMENTS

WO 2016/051512 A1 4/2016

*Primary Examiner* — Ryan Bertram
(74) *Attorney, Agent, or Firm* — Volpe and Koenig, P.C.

(57) ABSTRACT

An object is to construct a storage system configured with a high degree of freedom while ensuring a certain fault tolerance. The storage system includes a plurality of nodes that process an I/O processing request of data. The node has a storage device and a processor that performs the I/O processing on the storage device. The processor constitutes a data redundancy configuration in which data stored in different storage devices is combined as a data set. A management unit for managing the storage system performs a fault tolerance calculation of calculating fault tolerance information for a failure of each component by using component information that is information of a component including at least the and the storage device, and by using data redundancy configuration information related to the data redundancy configuration, and determines a data arrangement by applying the data redundancy configuration related to the calculated fault tolerance information.

7 Claims, 42 Drawing Sheets

(56) References Cited

U.S. PATENT DOCUMENTS

| | | | |
|---|---|---|---|
| 2002/0048284 A1* | 4/2002 | Moulton | G06F 11/1076 370/500 |
| 2007/0041313 A1* | 2/2007 | Hidle | H04L 41/0659 370/216 |
| 2007/0288791 A1* | 12/2007 | Allen | G06F 11/0709 714/4.11 |
| 2013/0275815 A1* | 10/2013 | De Keyser | G06F 11/30 714/47.2 |
| 2016/0371145 A1* | 12/2016 | Akutsu | G06F 3/0619 |
| 2019/0004911 A1* | 1/2019 | Das | G06F 11/2094 |
| 2019/0050302 A1* | 2/2019 | Juniwal | G06F 3/067 |

* cited by examiner

FIG. 9

PHYSICAL CHUNK MANAGEMENT TABLE 1001

| Drive# (2000) | Pchunk# (2001) | ChunkGroup# (2002) |
|---|---|---|
| 0x00000 | 0x0000 | 0x0000 |
|  | 0x0001 | 0x0001 |
|  | 0x0002 | 0x0002 |
|  | 0x0003 | 0x0003 |
| 0x00001 | 0x0010 | 0x0000 |
|  | 0x0011 | 0x0001 |
|  | 0x0012 | 0x1000 |
|  | 0x0013 | 0x1001 |
| 0x00002 | 0x0020 | Not Allocated |
|  | 0x0021 | 0x3001 |
| ... | ... | ... |

FIG. 10

LOGICAL CHUNK MANAGEMENT TABLE 1002

| Lchunk# (2010) | Pchunk# (2011) | Allocated Storage Pool (2012) | Status (2013) |
|---|---|---|---|
| 0x0000 | 0x0000 | 0x01 | Normal |
| 0x0001 | 0x0002 | Not Allocated | Normal |
| 0x0002 | 0x0004 | 0x00 | Correction |
| 0x0003 | 0x1000 | 0x01 | Blocked |
| ... | ... | ... | ... |

FIG. 11

| Chunk Group# | Protection Type | Pchunk# 1 | Pchunk# 2 | Pchunk# 3 | Pchunk# 4 | Pchunk# 5 | Status |
|---|---|---|---|---|---|---|---|
| 0x0000 | Mirror | 0x0000 | 0x0101 | N/A | N/A | N/A | Normal |
| 0x0001 | Mirror | 0x1000 | 0x1101 | N/A | N/A | N/A | Blocked |
| 0x0002 | 2D1P | 0x2000 | 0x2101 | 0x2202 | N/A | N/A | Critical |
| 0x0003 | 3D2P | 0x3000 | 0x3101 | 0x3202 | 0x3303 | 0x3404 | Normal |
| 0x0004 | 3D2P | 0x4000 | 0x4101 | 0x4202 | 0x4303 | 0x4404 | Caution |
| ... | ... | ... | ... | ... | ... | ... | ... |

CHUNK GROUP MANAGEMENT TABLE 1003

FIG. 12

| Node# | Drive# | Type | Size(Block) | Usage | Status |
|---|---|---|---|---|---|
| 0x0000 | 0x00000 | SSD | 0x040000000 | 50% | Normal |
| | 0x00001 | SSD | 0x040000000 | 40% | Normal |
| | 0x00002 | SSD | 0x020000000 | 40% | Normal |
| | 0x00003 | SSD | 0x020000000 | 50% | Blocked |
| 0x0001 | 0x00010 | SAS-HDD | 0x100000000 | 35% | Normal |
| | 0x00011 | SAS-HDD | 0x100000000 | 20% | Blocked |
| | 0x00012 | SATA-HDD | 0x200000000 | 5% | Normal |
| | 0x00013 | SATA-HDD | 0x200000000 | 0% | Normal |
| ... | ... | ... | ... | ... | ... |

DRIVE MANAGEMENT TABLE 1004

NODE MANAGEMENT TABLE 1005

FAULT SET MANAGEMENT TABLE 1006

FIG. 15

| Storage-Pool # | Size(Block) | Usage | Allocated Lchunk# |
|---|---|---|---|
| 0x00 | 0x000100000000 | 50% | 0x0000, 0x0001, 0x0002 |
| 0x01 | 0x000200000000 | 90% | 0x0003, 0x0005 |
| 0x02 | 0x000300000000 | 30% | 0x1000, 0x1001, 0x1002 |
| 0x03 | 0x000100000000 | 25% | 0x2000 |
| ... | ... | ... | ... |

STORAGE-POOL MANAGEMENT TABLE 1007

| VVOL# | Size(Block) | VVOL-Page# | Pool-Page# |
|---|---|---|---|
| 0x0000 | 0x00100000 | 0x00 | 0x0000 |
| | | 0x01 | 0x0001 |
| | | 0x02 | Not Allocated |
| | | ... | ... |
| 0x0001 | 0x00020000 | 0x00 | 0x1000 |
| | | 0x01 | 0x2000 |
| ... | ... | ... | ... |

VVOL MANAGEMENT TABLE 1008

| Pool-Page# | START LBA IN STORAGE-POOL | Lchunk# | START LBA IN LCHUNK |
|---|---|---|---|
| 0x0000 | 0x00000000 | 0x0000 | 0x00001000 |
| 0x0001 | 0x00000100 | 0x0010 | 0x00002000 |
| 0x0002 | 0x00000200 | 0x0020 | 0x00003000 |
| 0x0003 | 0x00000300 | 0x0030 | 0x00004000 |
| ... | ... | ... | ... |
| POOL-PAGE MANAGEMENT TABLE 1009 | | | |

STORAGE SYSTEM AND DATA ARRANGEMENT METHOD OF STORAGE SYSTEM

BACKGROUND OF THE INVENTION

1. Field of the Invention

The present invention relates to a storage system and a data arrangement method of the storage system.

2. Description of the Related Art

In order to increase the utilization efficiency of a storage capacity of a storage system, there has been an increasing demand for Software-Defined Storage (SDS). In consideration of capacity efficiency and reliability, data protection of the storage system is performed using an Erasure Coding scheme.

For example, WO2016/051512 discloses a technique of arranging data units each constituting a data set of mDnP, which consists of mpieces of data andnparities, in different storage nodes in a storage system employing the Erasure Coding scheme.

In SDS, when a data set having redundancy of 1 or more is specified, the redundancy of the data set is reduced by 2 or more at one time due to a single failure of a component (for example, a power source, a node, or a drive) constituting the storage system, and data loss may occur. Therefore, in SDS, data units of the same data set are generally arranged in storage nodes whose power source systems belong to different groups.

In the related art described above, it is assumed that the same protection level (fault tolerance) can be ensured in all the components in the storage system.

A specific example will be described with reference to FIG. 47. FIG. 47 is a diagram illustrating a configuration example in which the same protection level (fault tolerance) can be ensured for all components in a storage system of the related art. As shown in FIG. 47, a case is considered where one of the components in the storage system is a Fault Set (power source boundary) composed of one power source and two Nodes. In this case, components (one power source and two Nodes) provided in one Fault Set are in a range that is affected by a single power source failure.

For example, a case is considered where each data unit of a data set of 4D2P consisting of four pieces of data and two parities is arranged in a node so as to be able to withstand simultaneous failures of two components (for example, two power sources, one power source and one node, or two nodes). In this case, as shown in FIG. 47, it is necessary to arrange one data unit in one Node of each of the six Fault Sets (Fault Sets #0 to #5).

As described, by arranging each data unit of the data set of 4D2P in the six Fault Sets, the configuration is capable of withstanding the failure of two components in total among all the components (the power sources and the Nodes in the example of FIG. 47). That is, the same protection level (fault tolerance) can be ensured for all the components.

However, as described above, when the same protection level (fault tolerance) can be ensured for all the components in the storage system, there is a problem that the degree of freedom of the configuration decreases and the storage system cannot be constructed flexibly, for example, a small-scale configuration cannot be coped with.

SUMMARY OF THE INVENTION

The invention has been made in view of the above points, and an object thereof is to construct a storage system with a configuration having a high degree of freedom while ensuring a certain protection level (fault tolerance).

In order to solve such a problem, in an example of the invention, there is provided a storage system including a plurality of nodes that process an I/O processing request of data, wherein the node includes a storage device and a processor configured to perform the I/O processing on the storage device, the processor constitutes a data redundancy configuration in which data stored in different storage devices is combined as a data set, and a management unit for managing the storage system performs fault tolerance calculation of calculating fault tolerance information for a failure of each component by using component information that is information of a component including at least the node and the storage device, and by using data redundancy configuration information related to the data redundancy configuration, and determines a data arrangement by applying the data redundancy configuration related to the calculated fault tolerance information.

According to an aspect of the invention, a storage system can be constructed with a high degree of freedom while ensuring a certain protection level (fault tolerance).

BRIEF DESCRIPTION OF THE DRAWINGS

FIG. 9 illustrates a configuration example of a physical chunk management table according to the first embodiment.

FIG. 10 illustrates a configuration example of a logical chunk management table according to the first embodiment.

FIG. 11 illustrates a configuration example of a chunk group management table according to the first embodiment.

FIG. 12 illustrates a configuration example of a drive management table according to the first embodiment.

FIG. 15 illustrates a configuration example of a Storage-Pool management table according to the first embodiment.

FIG. 16 illustrates a configuration example of a VVOL management table according to the first embodiment.

FIG. 17 illustrates a configuration example of a Pool-Page management table according to the first embodiment.

DESCRIPTION OF THE PREFERRED EMBODIMENTS

In the following description, some embodiments will be described with reference to the drawings. It should be noted that the embodiments described below do not limit the invention according to the scope of claims, and all of the elements described in the embodiments and combinations thereof are not necessarily essential to the solution to the problem.

In the following description, various kinds of information are described in the expression of "aaa table", and alternatively the various kinds of information may be expressed with a data structure other than a table. The "aaa table" may also be referred to as "aaa information" to indicate that the various kinds of information do not depend on the data structure.

A part or all of processing to be executed by a processor may be processed by a hardware circuit. A program that specifies the processing to be executed by the processor may be acquired from, for example, an external device via a network, or may be acquired via a storage medium and executed by the processor.

First Embodiment (Configuration of Computer System)

Figure 1:
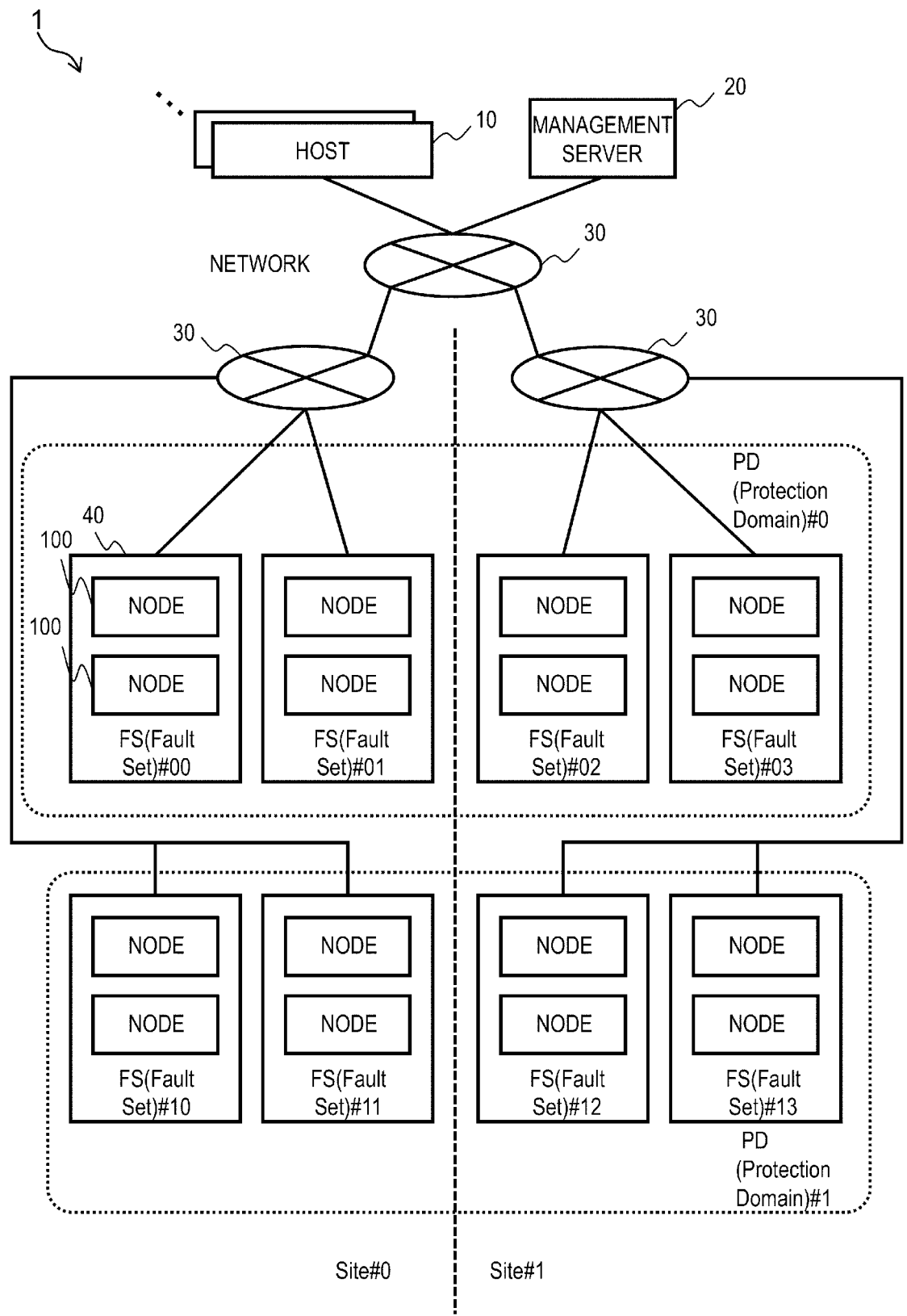
FIG. 1 illustrates a configuration example of a computer system according to a first embodiment.

FIG. 1 illustrates a configuration example of a computer system according to a first embodiment. FIG. 1 shows a relation of Protection Domains (hereinafter may be abbreviated as "PD"), Sites, Fault Sets (hereinafter may be abbreviated as "FS"), and Nodes in a computer system 1 according to the first embodiment. Each of the Protection Domain, the Site, the Fault Set, the Node, and a storage device in the Node to be described below is referred to as a component.

The computer system 1 includes one or more hosts 10, one or more management servers 20, networks 30, and a plurality of FSs 40 (eight FSs 40, that is, FS #00 to FS #03, and FS #10 to FS #13 in the example of FIG. 1).

The host 10 receives a file I/O request from a client terminal (not shown) connected to the host 10, and implements access to a Node 100 according to the I/O request. The management server 20 works to manage operations of the entire computer system 1.

The network 30 is a public network, a closed network, or a dedicated line network. The host 10 and the management server 20 are communicably connected to the FS 40 respectively via the network 30.

As shown by FS #00 in FIG. 1, the FS 40 includes a plurality of Nodes 100 (two Nodes 100 in the example of FIG. 1). The FS 40 is, for example, a maintenance and management unit for the Node 100 formed by bundling a plurality of Nodes 100 which share a power source and a network switch that are accommodated in one rack. Components in the same FS 40 are simultaneously affected by a single failure of the power source, the network switch, or the like. FS #01 to FS #03, and FS #10 to FS #13 in FIG. 1 are similar to FS #00.

It should be noted that one FS 40 is accommodated in one rack in the present embodiment, and alternatively a plurality of FSs 40 may be accommodated in one rack.

The Node 100 is, for example, a general-purpose server. Components in the same Node 100 are simultaneously affected by a single failure of the Node (such as a CPU failure or a port failure).

The PD is a management unit of the FS 40 in the computer system 1 and is constructed such that I/O, a failure, a maintenance operation, and the like in one PD do not affect another PD. In the example illustrated in FIG. 1, the computer system 1 includes a PD #0 and a PD #1. The PD #0 is constructed with four FSs, FS #00, FS #01, FS #02, and FS #03. The PD #1 is constructed with four FSs, FS #10, FS #11, FS #12, and FS #13.

The Site is, for example, a unit of a data center, and components in the same Site are simultaneously affected by local disasters such as fire and earthquake. In the example illustrated in FIG. 1, the computer system 1 includes a Site #0 and a Site #1. The Site #0 is constructed with four FSs, FS #00, FS #01, FS #10, and FS #11. The Site #1 is constructed with four FSs, FS #02, FS #03, FS #12, and FS #13.

It should be noted that FIG. 1 merely shows an example of the configuration of the computer system 1, and the configuration shown in FIG. 1 and the number of components are not essential for implementing the present embodiment. For example, there may be no layer of Site. There may be a layer such as an "Operation Set" (maintenance unit), which bundles plurality of Nodes 100, between the FS 40 and the Node 100.

Also, overlapping arrangement of components between PDs is allowed. For example, the PD #0 may be composed of the Site #1 and a Site #2, and a PD #2 may also be composed of the Site #1 and the Site #2. Further, for example, one FS may be arranged across the PDs.

However, it is generally desirable that the PD is constructed such that other components are not affected when a single component fails. For example, a configuration in which a Drive #1 and a Drive #2 are in a Node #1, with the Drive #1 belonging to the PD #1 and the Drive #2 belonging to the PD #2 is undesirable since the failure of the Node #1 affects both the PD #1 and the PD #2.

Thus, FIG. 1 illustrates an example in which only the Site is allowed to overlap between PDs and one FS is arranged in one PD in a closed manner.

(Hardware Configuration of FS)

Figure 2:
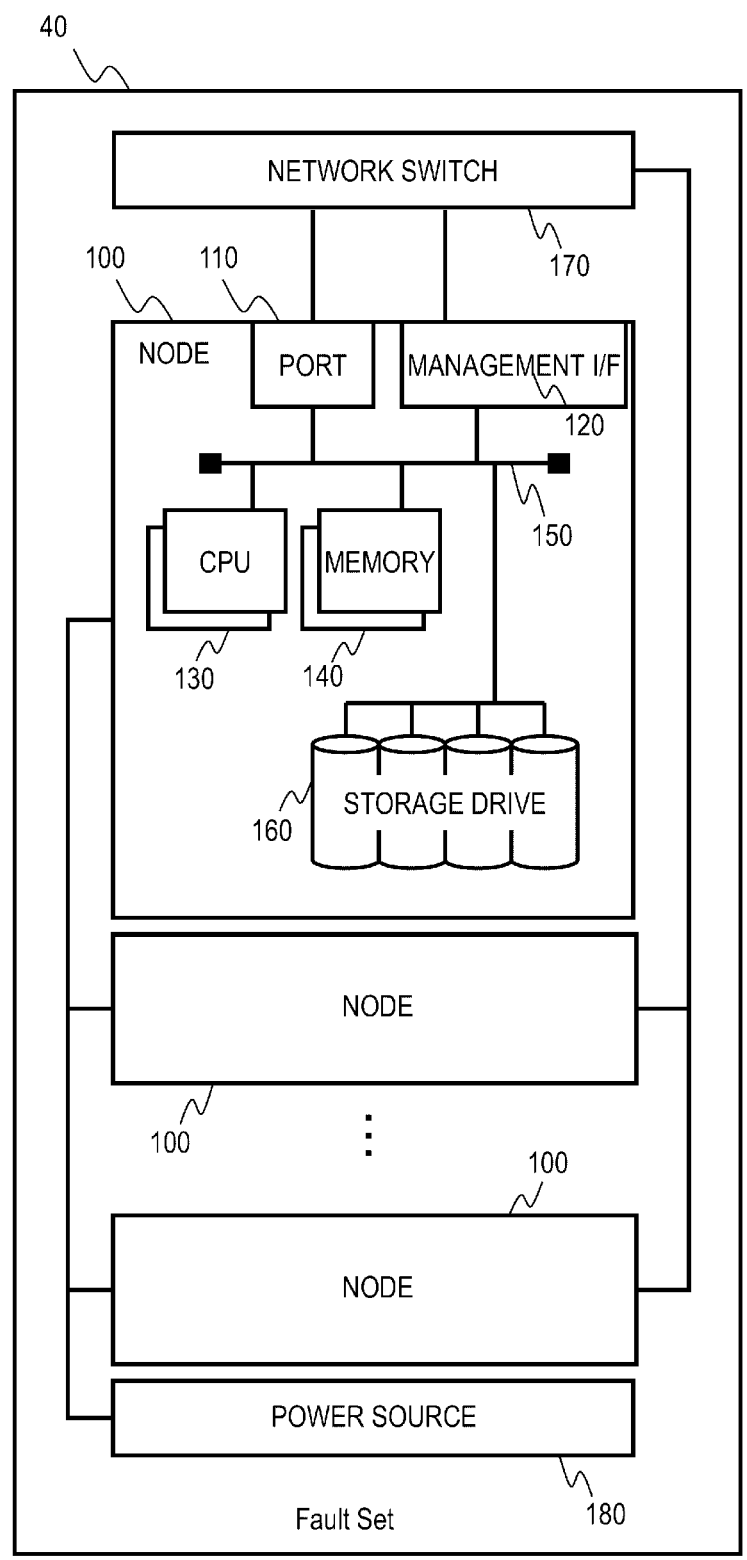
FIG. 2 illustrates a hardware configuration example of an FS according to the first embodiment.

FIG. 2 illustrates a hardware configuration example of the FS according to the first embodiment. As shown in FIG. 2, the FS 40 includes a plurality of Nodes 100, a network switch 170, and a power source 180. Since the network switch 170, the power source 180, and the like are shared by the plurality of Nodes 100 in the FS 40, when a failure thereof occurs, a failure occurs in the unit of the FS 40.

The network switch 170 connects the Node 100 to the host 10 and the management server 20 via the networks 30. The power source 180 supplies electric power to the plurality of Nodes 100.

Each Node 100 includes a port 110 for connecting the Node 100 to the host 10 via the networks 30, a management I/F 120 for connecting the Node 100 to the management server 20 via the networks 30, a memory 140 for storing various kinds of management information, a storage device 160 for storing data, and a Central Processing Unit (CPU) 130 that is a processor for controlling the data and the management information in the memory 140, and these components are connected to each other via an internal bus 150.

As will be described below with reference to FIGS. 3 and 4, the memory 140 includes a control information storage area 141 in which various kinds of control information of the Node 100 is stored, and a control program storage area 142 in which various control programs are stored. The memory 140 includes a cache area. The cache area temporarily stores data (write data) to be written from the host 10 to the storage device 160 and the like, and data (read data) read from the storage device 160.

The storage device 160 is composed of one or a plurality of drive devices (Drive). The drive device is, for example, a Hard Disk Drive (HDD) that uses a storage medium of a magnetic disk, or a Solid State Drive (SSD) that uses a storage medium such as a flash memory.

The CPU 130 performs control in the Node 100, and performs various processing by executing the various control programs stored in the memory 140, based on the various kinds of control information of the Node 100 stored in the memory 140. Further, the CPU 130 can transmit various commands to the storage device 160, and transmit various commands to other Nodes 100 to cause CPUs 130 of the other Nodes 100 to perform predetermined processing.

(Table Stored in Control Information Storage Area in Memory)

Figure 3:
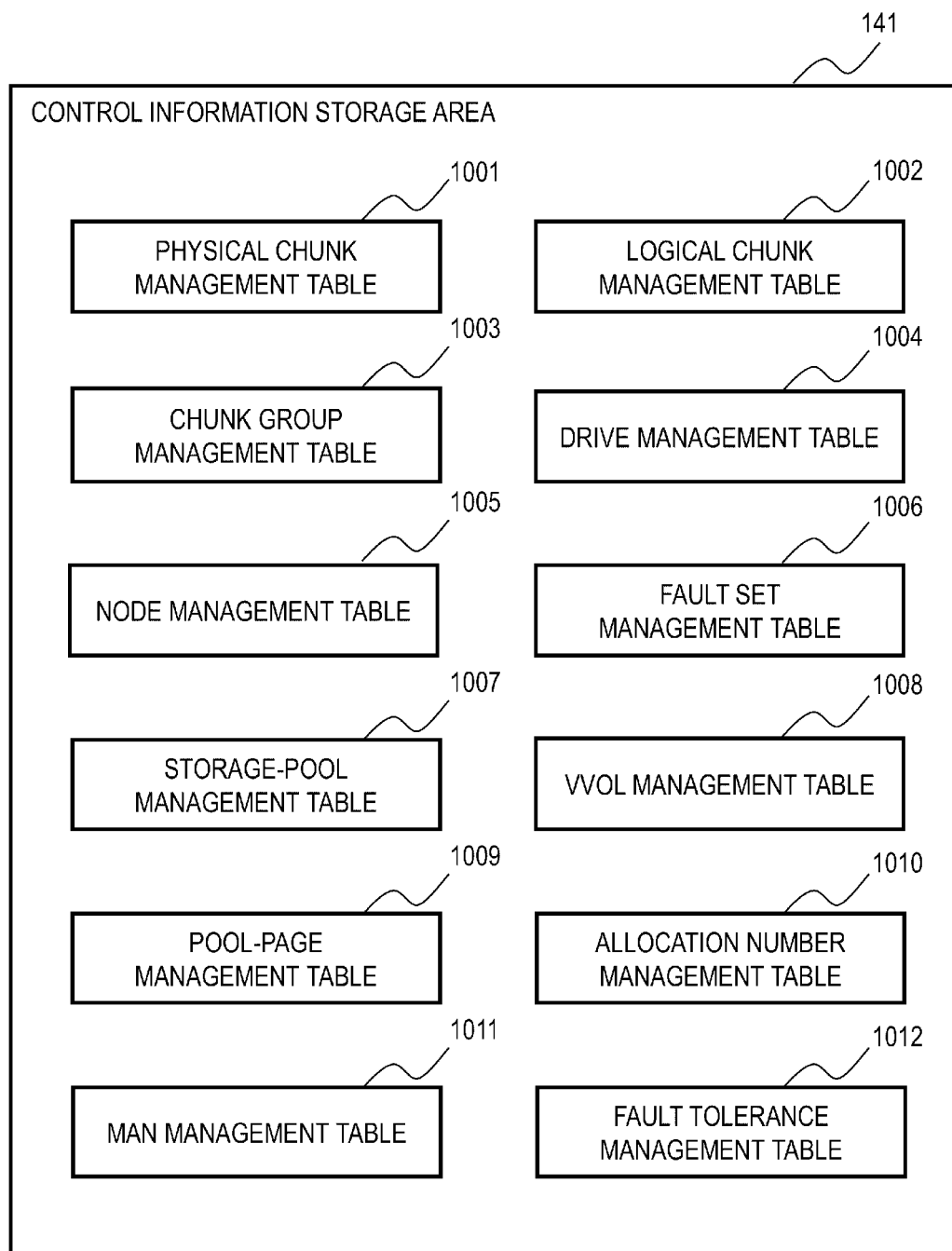
FIG. 3 illustrates an example of tables stored in a control information storage area in a memory according to the first embodiment.

FIG. 3 illustrates an example of tables stored in the control information storage area in the memory according to the first embodiment. In a control information storage area 141 in the memory 140, a physical chunk management table 1001, a logical chunk management table 1002, a chunk group management table 1003, a drive management table 1004, a node management table 1005, and a Fault Set management table 1006 are stored. In addition, in the control information storage area 141, a Storage-Pool management table 1007, a Virtual Volume (VVOL) management table 1008, a Pool-Page management table 1009, an allocated number management table 1010, a Max Allocated Number (MAN) management table 1011, and a fault tolerance management table 1012 are stored. Details of these tables will be described below.

The tables stored in the control information storage area 141 are loaded on the memory 140 during operation of the Node 100. Since it is necessary to read the tables at the time of starting the Node 100, it is necessary to always store the tables in a nonvolatile area such as an SSD in preparation for a power failure and the like. However, since the allocated number management table 1010 and the MAN management table 1011 relate to information that does not cause any problem even when the information volatilizes at the time the Node 100 is powered off, storage thereof in the nonvolatile area is not essential.

(Program Stored in Control Program Storage Area in Memory)

Figure 4:
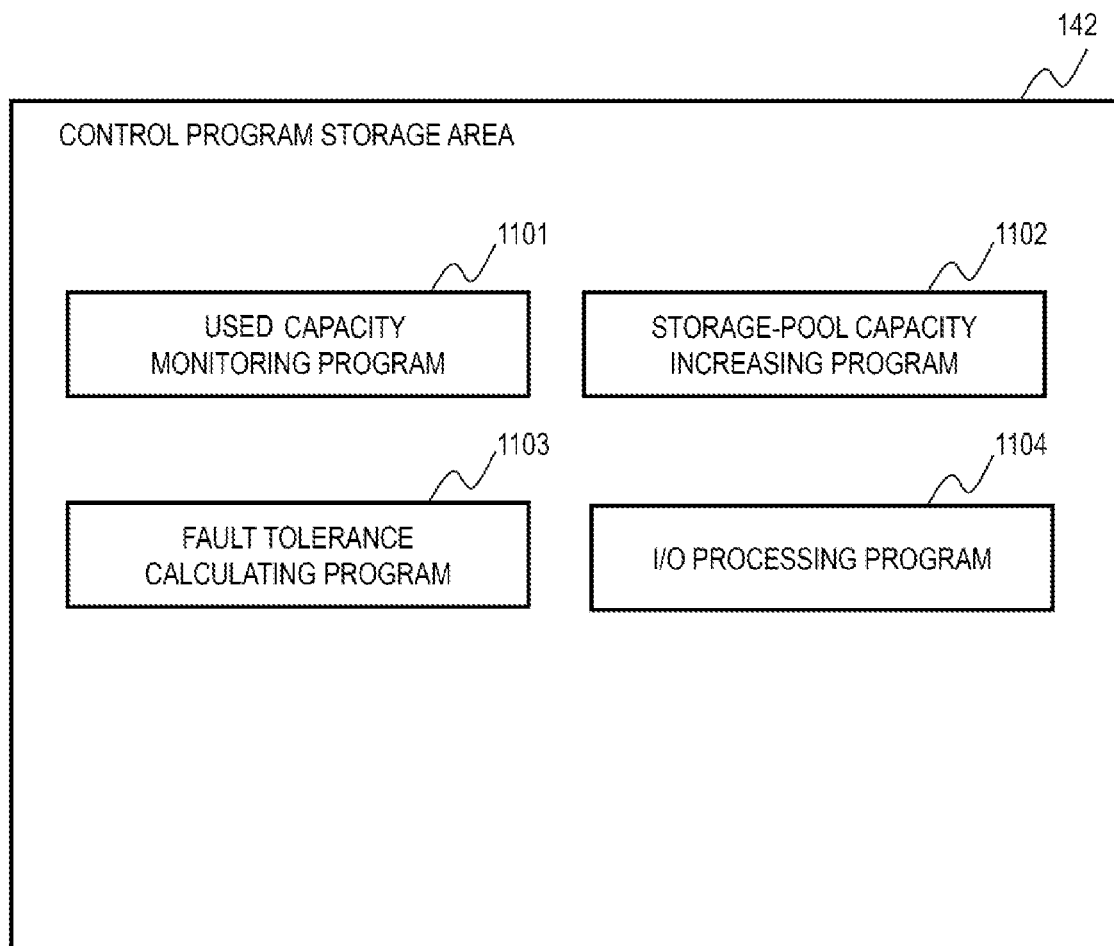
FIG. 4 illustrates an example of programs stored in a control program storage area in the memory according to the first embodiment.

FIG. 4 illustrates an example of programs stored in the control program storage area in the memory according to the first embodiment. In a control program storage area 142 in the memory 140, a used capacity monitoring program 1101, a Storage-Pool capacity increasing program 1102, a fault tolerance calculating program 1103, and an I/O processing program 1104 are stored.

Among the plurality of Nodes 100 provided in the computer system 1, the CPU 130 of a predetermined Node 100, as a main CPU, executes a program while the other CPUs 130 operates in accordance with an instruction from the main CPU. Accordingly, processes of the used capacity monitoring program 1101, the Storage-Pool capacity increasing program 1102, the fault tolerance calculating program 1103, and the I/O processing program 1104 are performed.

The used capacity monitoring program 1101 is a program for monitoring a usage rate (in-use capacity) of a Storage-Pool 501 (see FIG. 8) to be described below. The Storage-Pool capacity increasing program 1102 is a program for increasing a capacity of the Storage-Pool 501 when a usage rate of the Storage-Pool 501 falls below a prescribed value.

The fault tolerance calculating program 1103 is a program for calculating fault tolerance of the computer system 1 based on a system configuration of the computer system 1 and the protection level of each component (Site, FS, Node, and Drive). The I/O processing program 1104 is a program for performing Read/Write processing in response to an I/O request from the host 10 by a user.

(Data Configuration of Storage Device)

Figure 5:
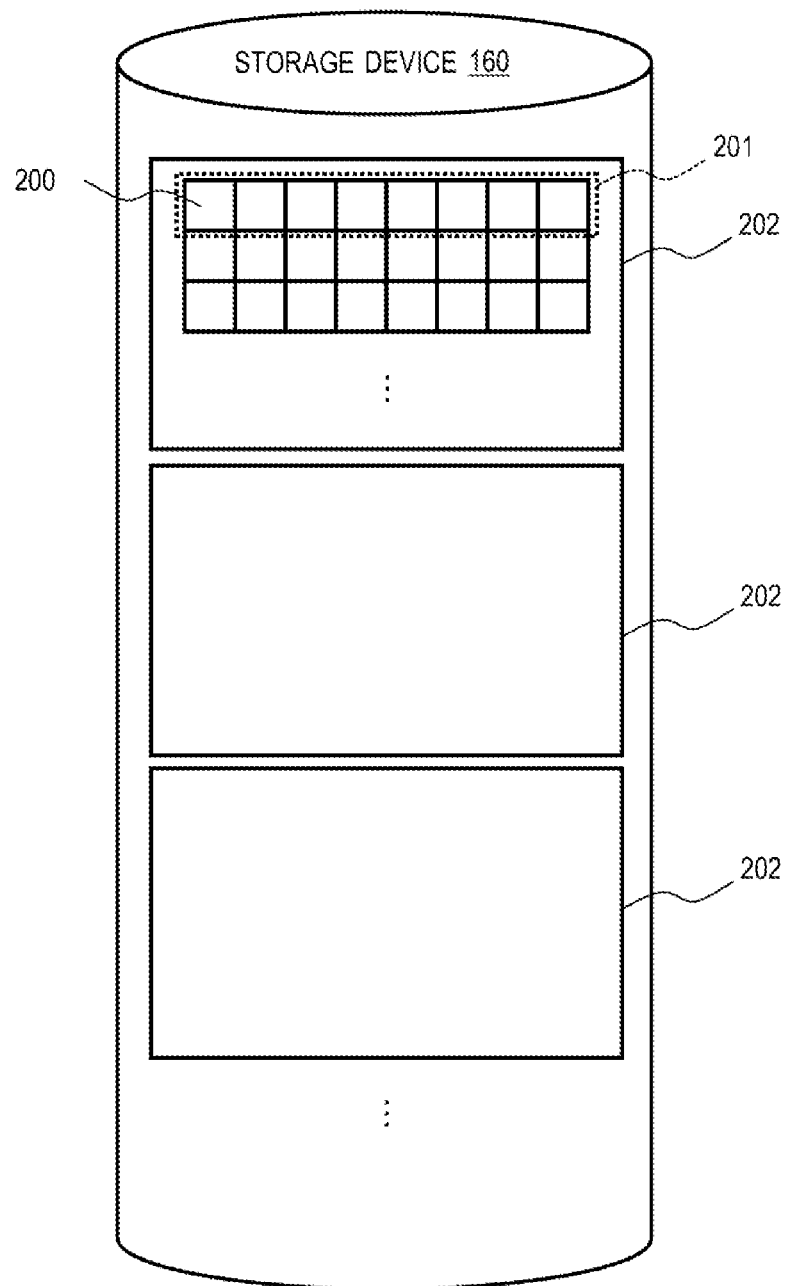
FIG. 5 illustrates a configuration example of data of a storage device according to the first embodiment.

FIG. 5 illustrates a configuration example of the storage device according to the first embodiment. A physical area of the storage device 160 is divided into a plurality of physical chunks 202. The physical chunk 202 is a management unit of the physical area, and a capacity of each of the physical chunks 202 is, for example, several tens of GiB. The physical chunk 202 may be used for data only or for parity only. Alternatively, data and parity may coexist in one physical chunk 202.

The physical chunk 202 is a management unit of capacity and mapping in the present embodiment. For example, a storage device 160 having a capacity Vd only includes floor (Vd/Vp) physical chunks 202 having a physical chunk size Vp. "Floor (*)" is a floor function that rounds down the numbers after the decimal point.

Further, each of the plurality of physical chunks 202 is divided into, for example, units of 4 KiB, each unit being called a stripe block 201 constituting a stripe. Further, the stripe block 201 is divided into sub-blocks 200 equivalent to the minimum unit of I/O processing. A size of the sub-block 200 is 512 bytes when an I/O command is, for example, a Small Computer System Interface (SCSI)

(Configuration of Chunk Group)

Figure 6:
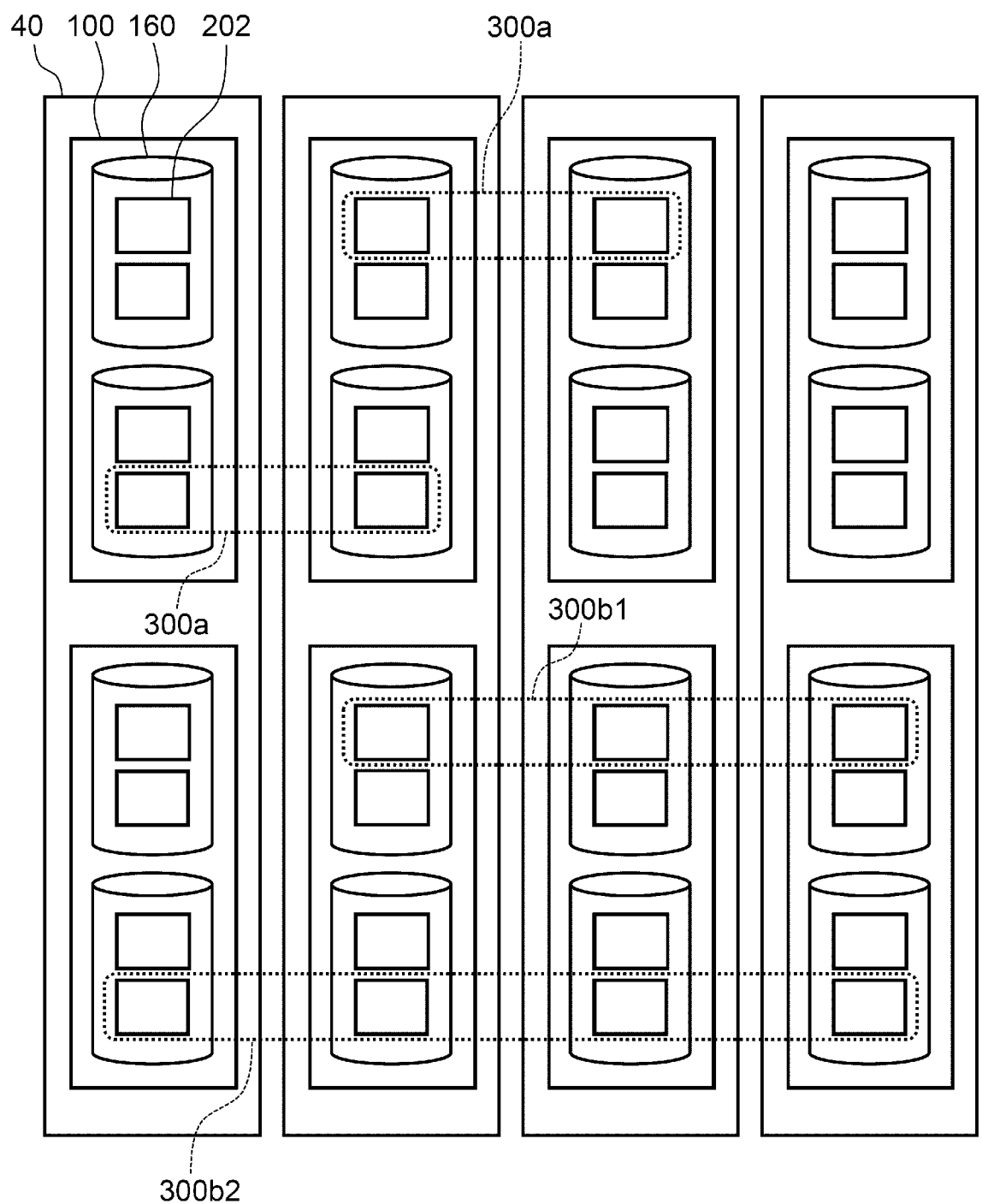
FIG. 6 illustrates a configuration example of a chunk group according to the first embodiment.

FIG. 6 illustrates a configuration example of a chunk group according to the first embodiment. As shown in FIG. 6, a chunk group 300 (300*a*, 300*b*1, and 300*b*2 are collectively referred to as 300) is composed of a plurality of physical chunks 202. The chunk group 300 is an example of a data set having redundancy, and the physical chunk 202 is an example of each data unit constituting the data set.

The chunk group 300 is composed of two physical chunks 202 in a case where a protection type (protection level is mDnP) is mirroring (1D1D) (see the chunk group 300*a*), three physical chunks 202 in a case of 2D1P (see the chunk group 300*b*1) and four physical chunks 202 in a case of 3D1P or 2D2P (see the chunk group 300*b*2). In a single Protection Domain, protection types may be unified to simplify management, or different protection types may be used in a mixed manner.

It is desirable that each physical chunk 202 constituting the chunk group 300 is allocated to a different Drive, Node, Fault Set, Site, or Protection Domain in order to prevent the redundancy from being reduced by 2 or more at one time when a component fails. However, when the number of components is less than (m+n) with respect to the protection type of mDnP, a plurality of physical chunks may be selected from the same component. Since each physical chunk 202 has a performance characteristic corresponding to the type of a corresponding drive, it is desirable that the physical chunk 202 constituting the chunk group 300 is selected from physical chunks 202 having the same speed characteristic.

(Stripe in Chunk Group)

Figure 7:
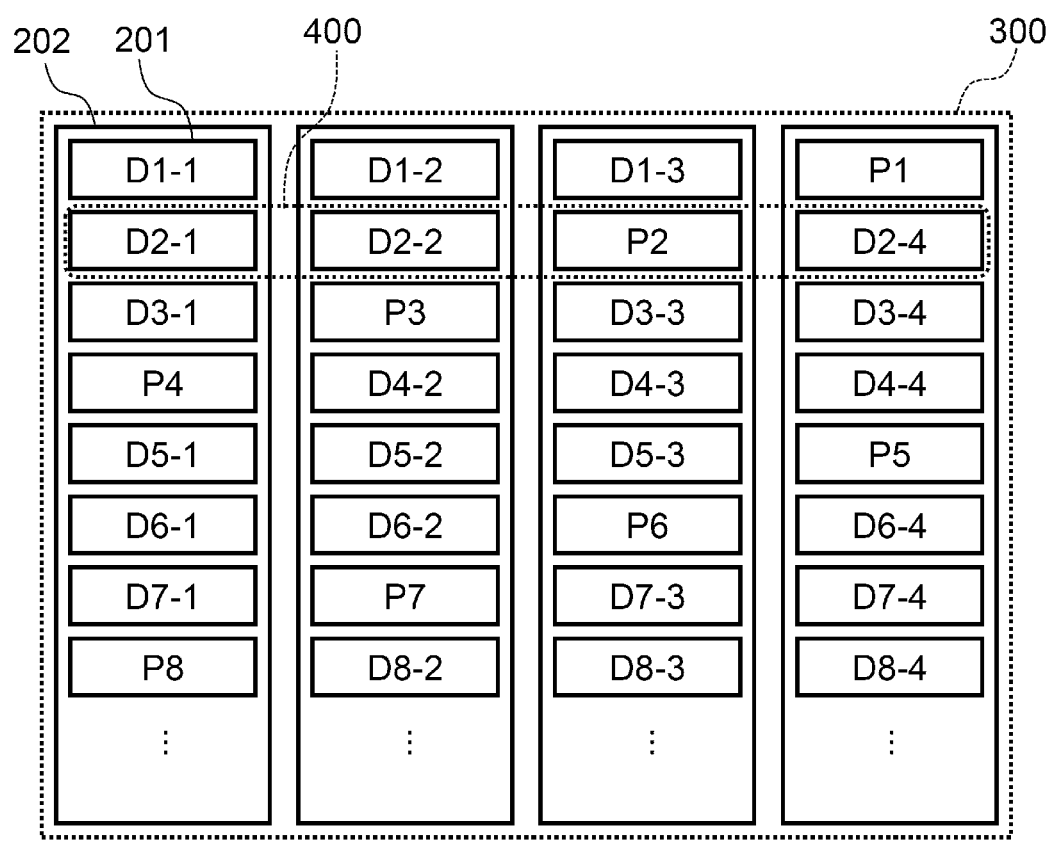
FIG. 7 illustrates a configuration example of stripes in the chunk group according to the first embodiment.

FIG. 7 illustrates a configuration example of stripes in the chunk group according to the first embodiment. As described above, the chunk group 300 is composed of a plurality of physical chunks 202. FIG. 7 illustrates extracted physical chunks 202 belonging to the same chunk group 300, and all physical chunks 202 constituting one chunk group 300 are arranged in a scattered manner in one or more Nodes 100 and one or more storage devices 160.

As shown in FIG. 7, the physical chunk 202 is composed of a plurality of stripe blocks 201. For example, when the protection type is 3D1P, a stripe 400 is composed of four stripe blocks 201.

When updating data, processing is performed in units of stripes 400. For example, when updating a data block D2-1 shown in FIG. 7, the data block D2-1, and a parity block P2 in the stripe 400 including the data block D2-1 are updated, instead of updating the entire physical chunk 202.

(Logical Configuration of Computer System 1)

Figure 8:
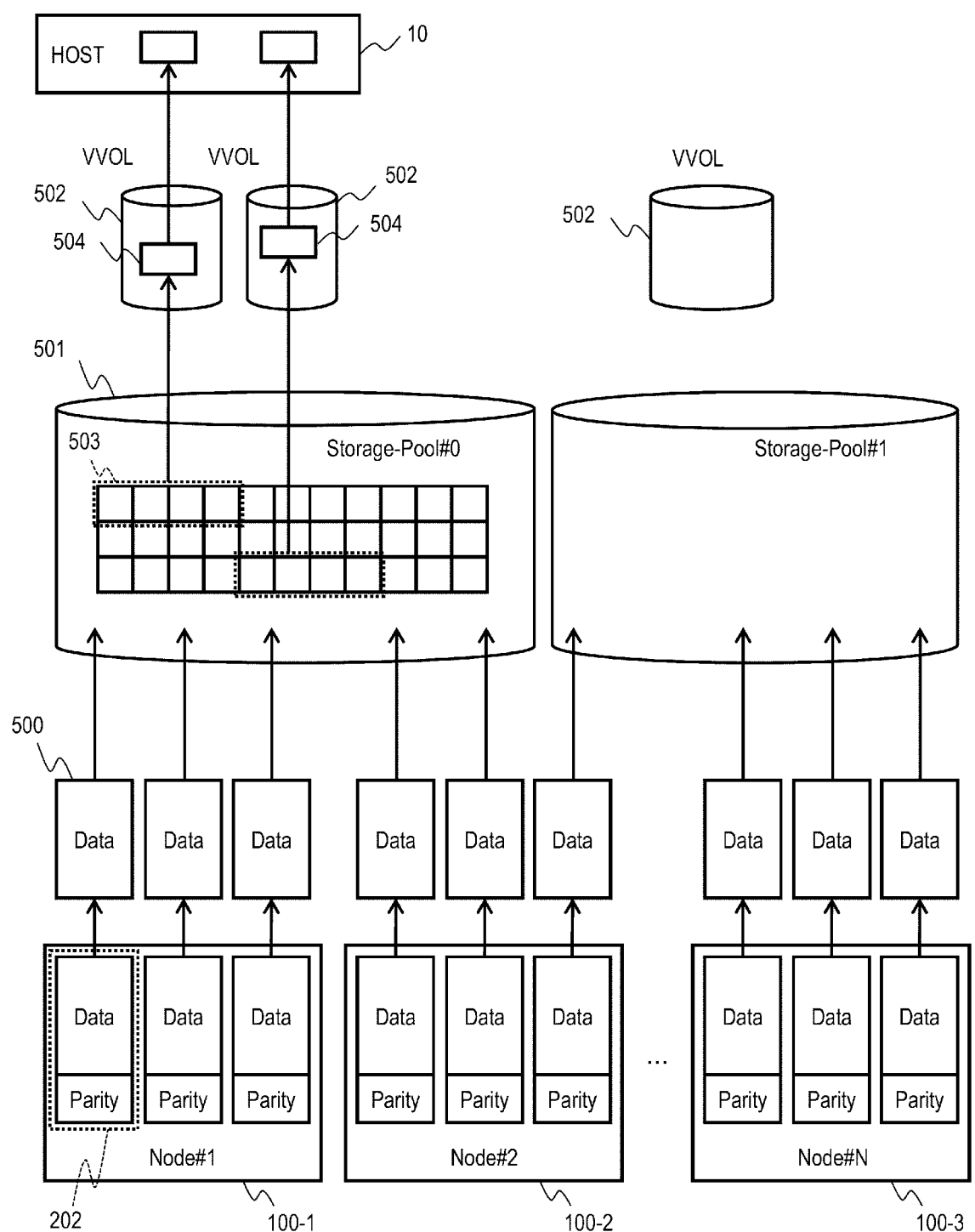
FIG. 8 illustrates a logical configuration example of the computer system according to the first embodiment.

FIG. 8 illustrates a logical configuration example of the computer system 1 according to the first embodiment. A logical chunk 500 is obtained by extracting only a data area from the physical chunk 202 that is composed of the data area and a parity area. The logical chunk 500 is provided to the Storage-Pool 501. Therefore, a capacity of the Storage-Pool 501 is the same as that of the physical chunk 202 excluding a parity part, that is, a capacity that can be allocated by the user. However, in order to manage a spare area or the like, which is used for recovery of the redundancy when a failure occurs, separately from the capacity of the Storage-Pool 501, a part of the physical chunks 202 may be retained without being allocated to the Storage-Pool 501; and in order to flexibly increase the capacity when the Storage-Pool 501 runs out of capacity, a part of the logical chunks 500 may be retained without being allocated to the Storage-Pool 501. One or more Storages-Pools 501 are provided for each Protection Domain.

When the physical chunk 202 is only composed of the data area or the parity area, the physical chunk 202 only composed of the data area is treated as the logical chunk 500.

An in-Node Pool may be defined in each Node, a logical chunk 500 in the Node may be allocated to the in-Node Pool to generate a volume of any size from the in-Node Pool, and the volume of any size may be allocated to the Storage-Pool 501.

The logical chunk 500 has a performance characteristic corresponding to the device type (for example, SSD or HDD) to which the physical chunk 202 constituting the logical chunk 500 belongs, and it is desirable that one Storage-Pool 501 is composed of a logical chunk 500 having a single performance characteristic.

Similarly, the logical chunk 500 has a performance characteristic corresponding to the protection type of the chunk group 300 to which the physical chunk 202 constituting the logical chunk 500 belongs, and it is desirable that one Storage-Pool 501 is composed of a logical chunk 500 having a single performance characteristic.

Alternatively, the Storage-Pool 501 may be divided into a plurality of partitions (Tier), and chunk groups 300 having the same device type to which the physical chunk 202 belongs or having the same protection type may be configured with data blocks present in a single Tier.

A Pool-Page 503 is composed of one or more sub-blocks in the Storage-Pool 501. A VVOL 502 is generated in accordance with an instruction from the management server 20. A size of the VVOL 502 does not depend on an actual total available capacity of the storage device 160. In accordance with an I/O request from the host 10, the Pool-Page 503 is dynamically allocated to a storage area (VVOL-Page 504) in the VVOL 502.

(Configuration of Physical Chunk Management Table)

FIG. 9 illustrates a configuration example of the physical chunk management table according to the first embodiment. The physical chunk management table 1001 indicates a relation of the storage device 160 (Drive # column 2000), the physical chunk 202 (Pchunk # column 2001), and the chunk group 300 (ChunkGroup # column 2002).

When the storage device 160 and the physical chunk 202, which correspond to IDs stored in the Drive # column 2000 and the Pchunk # column 2001 respectively, are allocated to a chunk group 300, an ID of the chunk group 300 is stored in the ChunkGroup # column 2002. On the other hand, when the storage device 160 and the physical chunk 202, which correspond to the IDs stored in the Drive # column 2000 and the Pchunk # column 2001 respectively, are not allocated to the chunk group 300, "Not Allocated" is stored in the ChunkGroup # column 2002.

Since the chunk size of the physical chunk 202 is a fixed value in the same Protection Domain, a start Logical Block Address (LBA) of each physical chunk 202 in the storage device 160 can be uniquely determined if an offset value indicating which number the physical chunk 202 is from the top in each storage device 160 is known.

(Configuration of Logical Chunk Management Table)

FIG. 10 illustrates a configuration example of the logical chunk management table according to the first embodiment. The logical chunk management table 1002 indicates relation of the logical chunk 500 (Lchunk # column 2010) and the physical chunk 202 (Pchunk # column 2011).

FIG. 10 shows that the logical chunk 500 (Lchunk # column 2010) is composed of a single physical chunk 202 (Pchunk # column 2011), using a corresponding relationship between IDs thereof. In an Allocated Storage Pool column 2012, an ID of the Storage-Pool 501 to which the logical chunk 500 is allocated is stored, and "Not Allocated" is stored when the logical chunk 500 is not allocated to any Storage-Pool 501.

In a Status column 2013, the following statuses that indicate access performance of the logical chunk 500 are stored. "Normal" indicates that there is no failure in the ChunkGroup to which the Pchunk constituting the Lchunk belongs. "Correction" indicates a state, in which a failure occurs in the Pchunk constituting the Lchunk or in a Pchunk in a ChunkGroup to which the Lchunk belongs, and in which a performance degradation due to Correction R/W occurs. "Blocked" indicates a state, in which a failure of a certain redundancy or more occurs in the ChunkGroup to which the Pchunk constituting the Lchunk belongs, and in which data cannot be accessed.

(Configuration of Chunk Group Management Table)

FIG. 11 illustrates a configuration example of the chunk group management table according to the first embodiment. The chunk group management table 1003 shows a configuration and a status of each chunk group 300 whose ID is stored in a ChunkGroup # column 2020. A ProtectionType column 2021 indicates protection types of the ChunkGroup. In a Pchunk # column 2022a (Pchunk #1), a Pchunk # column 2022b (Pchunk #2), a Pchunk # column 2022c (Pchunk #3), a Pchunk # column 2022d (Pchunk #4), and a Pchunk # column 2022e (Pchunk #5), IDs of physical chunks 202 constituting the chunk groups 300 are stored respectively. In the present embodiment, the number of the physical chunks 202 constituting the chunk group 300 is at most five.

In a Status column 2024, the following statuses indicating presence or absence of a failure in the physical chunks 202 of the chunk groups 300 are stored. "Normal" indicates a state in which no failure occurs in the physical chunks 202 in the chunk group 300. "Caution" indicates a state, in which a failure occurs in a physical chunk 202 in the chunk group 300 but a redundancy of 1 or more is ensured. "Critical" indicates a state, in which a failure occurs in a physical chunk 202 in the chunk group 300 and the redundancy is 0. "Blocked" indicates a state, in which a failure occurs in a physical chunk 202 in the chunk group 300 and data is lost. By dividing the state in which a failure occurs in a physical chunk 202 in the chunk group 300 into two stages of "Caution" and "Critical", a detailed state can be notified to an administrator, and alternatively the two stages may be unified as "Caution".

When each physical chunk 202 has a data attribute such as data or parity, the attribute information may be added to the physical chunk 202 in the chunk group management table 1003.

(Configuration of Drive Management Table)

FIG. 12 illustrates a configuration example of the drive management table according to the first embodiment. The drive management table 1004 shows configurations and statuses, of Nodes and of Drives constituting storage devices 160, and a relation therebetween. Drive types (for example, SSD, SAS-HDD, and SATA-HDD) of the storage devices 160 of Nodes 100 are stored in a Type column 2032, IDs of the storage devices 160 and of the Nodes 100 being stored in a Node # column 2030 and a Drive # column 2031 respectively.

Storage capacities of the storage devices 160 of the Nodes 100 are stored in a Size (Block) column 2033, the IDs of the storage devices 160 and of the Nodes 100 being stored in the Node # column 2030 and the Drive # column 2031 respectively. Information stored in the Size (Block) column 2033 is, for example, "0x020000000" (=256 GiB) in a case of a Block (512 Byte) unit.

Usage rates (in-use capacities) of the storage capacities of the storage devices 160 of the Nodes 100 are stored in a Usage column 2034, the IDs of the storage devices 160 and of the Nodes 100 being stored in the Node # column 2030 and the Drive # column 2031 respectively.

The following statuses indicating presence or absence of a failure in the storage devices 160 of the Nodes 100 are stored in a Status column 2035, the IDs of the storage devices 160 and of the Nodes 100 being stored in the Node # column 2030 and the Drive # column 2031 respectively. "Normal" indicates that the storage device 160 is in a normal state. "Blocked" indicates that a failure occurs in the storage device 160 and the storage device 160 cannot be accessed.
(Configuration of Node Management Table)

Figure 13:
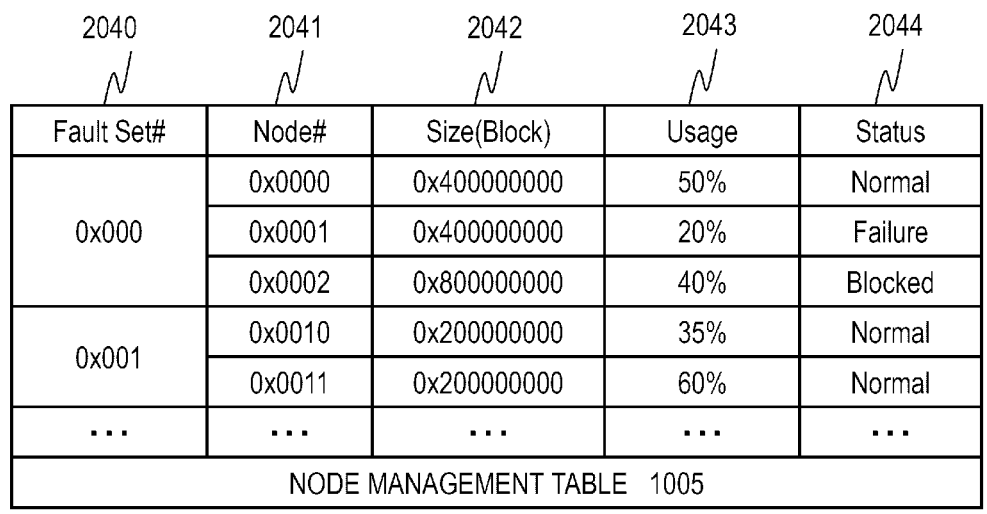
FIG. 13 illustrates a configuration example of a node management table according to the first embodiment.

FIG. 13 illustrates a configuration example of the node management table according to the first embodiment. The node management table 1005 indicates a relation between the Fault Set and the Node. Total storage capacities of all storage devices 160 in Nodes 100 of FSs 40 are stored in a Size (Block) column 2042, IDs of the FSs 40 and of the Nodes 100 being stored in a Fault Set # column 2040 and a Node # column 2041 respectively. Information stored in the Size (Block) column 2042 is usage rates (in-use capacities) of the total storage capacities of all the storage devices 160 in the Nodes 100 of the FSs 40 of the IDs stored in the Fault Set # column 2040 and the Node # column 2041 respectively.

The following statuses indicating presence or absence of a failure in all the storage devices 160 in the Nodes 100 of the FSs 40 are stored in a Status column 2044, the IDs of the FSs 40 and of the Nodes 100 being stored in the Fault Set # column 2040 and the Node # column 2041 respectively. "Normal" indicates that all of the storage devices 160 in the Node 100 are in a normal state. "Failure" indicates a state in which a failure occurs in some of the storage devices 160 in the Node 100 but the Node can be accessed. "Blocked" indicates a state, in which a failure occurs in the CPU 130 or the like in the Node 100, or in the network switch 170 or the power source 180 of the FS 40 to which the Node 100 belongs and the Node cannot be accessed.
(Configuration of Fault Set Management Table)

Figure 14:
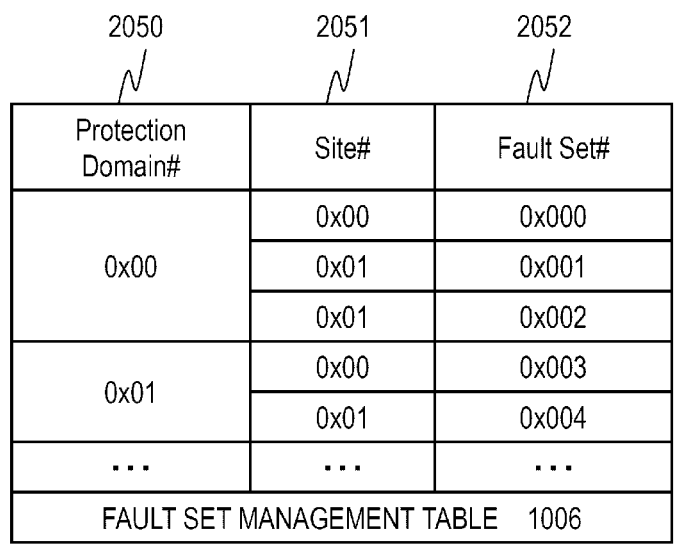
FIG. 14 illustrates a configuration example of a Fault Set management table according to the first embodiment.

FIG. 14 illustrates a configuration example of the Fault Set management table according to the first embodiment. The Fault Set management table 1006 shows a relation of the Protection Domain, the Site, and the Fault Set, in association with IDs thereof. In general, since the FS (Fault Set) 40 (for example, a rack) is outside the management of the computer system 1, state management is not performed (a rack failure is treated as a failure of all Nodes in the rack), and alternatively state management may be performed when the FS 40 is under the management of the computer system 1.
(Configuration of Storage-Pool Management Table)

FIG. 15 illustrates a configuration example of the Storage-Pool management table according to the first embodiment. The Storage-Pool management table 1007 shows a relation of the size (Size (Block)), the usage rate (Usage) and the allocated logical chunk 500 (Allocated Lchunk) of the Storage-Pool 501.

In a Storage-Pool column 2060, IDs of the Storage-Pools 501 are stored. Information stored in a Size (Block) column 2061 is sizes of the Storage-Pools 501 shown in units of block (for example, 512 bytes). Information stored in a Usage column 2062 is usage rates (in-use capacities) of storage capacities of the Storage-Pools 501. Information stored in an Allocated Lchunk # column 2063 is IDs of logical chunks 500 allocated to the Storage-Pools 501.

When the usage rate of the Storage-Pool 501 exceeds a certain value, a logical chunk 500 created from a predetermined physical chunk 202 is newly allocated to the Storage-Pool 501 to increase an available capacity of the Storage-Pool 501. Although it is desirable that the Storage-Pool 501 is composed of storage devices 160 having a single protection level and the same performance, the Storage-Pool 501 may be composed of storage devices 160 having different protection levels and different performances when the Storage-Pool 501 can be divided into Tiers and managed.
(Configuration of VVOL Management Table)

FIG. 16 illustrates a configuration example of the VVOL management table. The VVOL management table 1008 shows configuration information of the VVOL 502, the VVOL-Page 504 allocated to the VVOL 502, and a relationship between the VVOL-Page 504 the VVOL-Page 503. Sizes of the VVOL-Page 504 and the Pool-Page 503 are fixed values in the computer system 1, and alternatively may be over-provisioned.

In a VVOL # column 2070, IDs of the VVOLs 502 are stored. Information stored in a Size (Block) column 2071 is sizes of the VVOLs 502 in units of block (for example, 512 bytes). Information stored in a VVOL-Page # column 2072 is IDs of VVOL-Pages 504 on the VVOLs 502. Information stored in a Pool-Page # column 2073 is IDs of Pool-Pages 503 corresponding to the VVOL Pages 504 on the VVOLs 502. When the Pool-Page 503 corresponding to the VVOL-Page 504 is not allocated, "Not Allocated" is stored in the Pool-Page # column 2073.

When the VVOL 502 receives a Write request, data is written in the Pool-Page 503 that is allocated to the VVOL-Page 504 corresponding to a requested LBA. In an initial state, the Pool-Page 503 is not allocated to the VVOL-Page 504 (Not Allocated), and an appropriate Pool-Page 503 is newly allocated to the VVOL-Page 504 when the available capacity of the Pool-Page 503 is insufficient.
(Configuration of Pool-Page Management Table)

FIG. 17 illustrates a configuration example of the Pool-Page management table according to the first embodiment. The Pool-Page management table 1009 is a table for managing configurations of Pool-Pages 503. In a Pool-Page # column 2080, IDs of the Pool-Pages 503 are stored. In a start LBA in Storage-Pool column 2081, start LBAs of the Pool-Pages 503 in the Storage-Pool 501 are stored. In an Lchunk # column 2082, IDs of the logical chunks 500 allocated to the Pool-Pages 503 are stored. In a start LBA in Lchunck column 2083, information of an area in a logical chunk 500, which corresponds to an area in a Storage-Pool 501 indicated by a start LBA in Storage-Pool, is stored indicated by a start LBA in the logical chunk 500.

Since the size of the Pool-Page 503 is at a fixed value, it can be indicated by a combination of an ID of the Pool-Page 503 and a start LBA in the Storage-Pool 501 that the Pool-Page 503 corresponds to which area in the Storage-Pool 501. It can be indicated by a combination of an ID of a logical chunk 500 and a start LBA in the logical chunk 500 that the area in the Storage-Pool 501 corresponding to the Pool-Page 503 corresponds to which area of which logical chunk (Lchunk) 500.
(Data I/O Processing)

A flow of data write processing is as follows. First, the host 10 specifies a VVOL # and an LBA in VVOL, and issues a Write command. Next, the CPU 130 calculates a VVOL-Page 504 that corresponds to an area in the VVOL 502. Next, the CPU 130 calculates a Pool-Page 503 that corresponds to the VVOL-Page 504. Next, the CPU 130 calculates an area of a logical chunk 500 that corresponds to the Pool-Page 503. Next, the CPU 130 calculates an area of a physical chunk 202 that corresponds to the area of the logical chunk 500. Next, the CPU 130 calculates an area in a storage device 160 that corresponds to the area of the physical chunk 202. Next, the CPU 130 writes request data to the area in the storage device 160 (Write). Data Read processing is similar to that of Write.

(Allocated Number Management Table)

Figure 18:
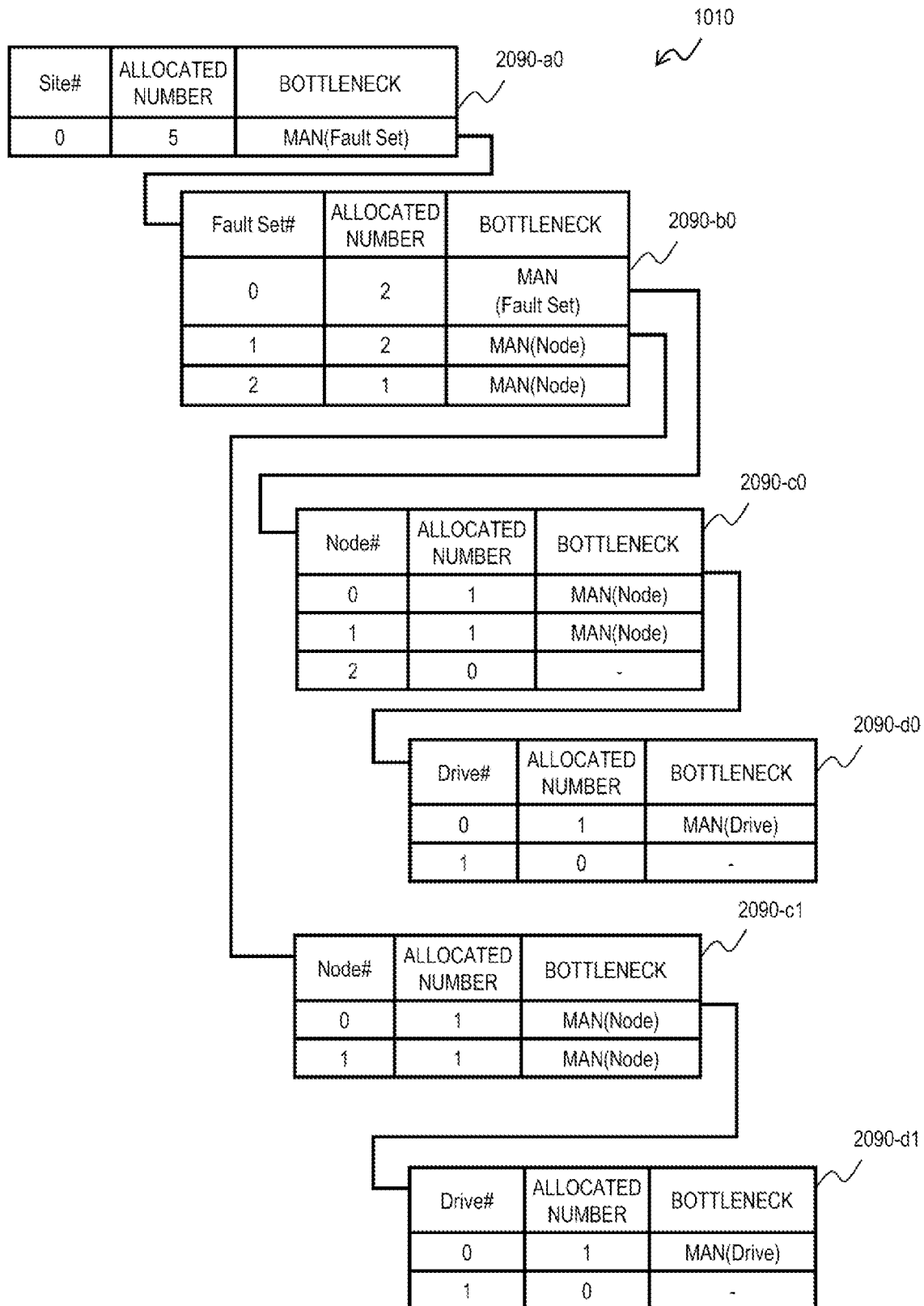
FIG. 18 illustrates a configuration example of an allocated number management table according to the first embodiment.

FIG. 18 illustrates a configuration example of the allocated number management table according to the first embodiment. The allocated number management table 1010 shows tables laid out in a tree form which are for managing the number of physical chunks 202 allocated to the Site, the Fault Set, the Node, and the Drive respectively. In the example of FIG. 18, the allocated number management table 1010 includes a table 2090-a0, a table 2090-b0, a table 2090-c0, a table 2090-c1, a table 2090-d0, and a table 2090-d1, each of which is laid out in the tree form. In the example of FIG. 18, some other tables are not shown.

Since the allocated number management table 1010 is used only at the time of creating a new chunk group 300 (at the time of selecting allocation destination of the physical chunk 202) and may be discarded after creating the chunk group, it is not essential to store the allocated number management table 1010 in the nonvolatile area.

The table 2090-a0 manages the number of physical chunks 202 allocated to each Site. The table 2090-a0 indicates that five physical chunks 202 are allocated to a Site #0. The table 2090-a0 indicates that a bottleneck of the number of the physical chunks 202 allocated to the Site #0 is a maximum allocated number MAN (Fault Set) of a Fault Set one hierarchy lower than the Site #0. MAN is an abbreviation for Max Allocated Number.

The table 2090-b0 manages the number of physical chunks 202 allocated to each Fault Set of the Site #0. The table 2090-b0 indicates that two physical chunks 202 are allocated to a Fault Set #0, two physical chunks 202 are allocated to a Fault Set #1, and one physical chunk 202 is allocated to a Fault Set #2.

The table 2090-b0 indicates that the number of the physical chunks 202 allocated to the Fault Set #0 reaches the maximum allocated number MAN (Fault Set)=2 of the Fault Set #0, and that a bottleneck region is the Fault Set #0. The table 2090-b0 indicates that all the Nodes one hierarchy lower in the Fault Set #1 reach a maximum allocated number MAN (Node), and that the Nodes one hierarchy lower are a bottleneck region. The table 2090-b0 indicates that all the Nodes one hierarchy lower in the Fault Set #2 reach a maximum allocated number MAN (Node)=1, and that the Nodes one hierarchy lower are a bottleneck region.

The table 2090-c0 manages the number of the physical chunks 202 allocated to each Node of the Fault Set #0. The table 2090-c0 indicates that one physical chunk 202 is allocated to a Node #0, one physical chunk 202 is allocated to a Node #1, and no physical chunk 202 is allocated to a Node #2.

The table 2090-c0 indicates that a bottleneck of the number of the physical chunks 202 allocated to the Node #0 is a maximum allocated number MAN (Node)=1 for the Node #0. The table 2090-c0 indicates that a bottleneck of the number of the physical chunks 202 allocated to the Node #1 is a maximum allocated number MAN (Node)=1 for the Node #1. Therefore, no more physical chunks 202 can be allocated to the Node #0 and the Node #1.

For example, in the example illustrated in the table 2090-d0, the number of physical chunks 202 allocated to a Drive #0 of the Node #0 is 1 and a bottleneck of the Drive #0 is MAN (Drive); no physical chunk 202 is allocated to a Drive #1 and a bottleneck thereof is not set. Therefore, MAN (Node)=1. As will be described in detail below, in order to allocate new physical chunks 202 to the Node #0 and the Node #1, it is necessary to increment the MAN (Node).

Since no physical chunk 202 is allocated to a Node #2 in the table 2090-c0, a bottleneck thereof is not set.

The table 2090-d0 manages the number of physical chunks 202 allocated to each Drive of the Node #0. The table 2090-d0 indicates that one physical chunk 202 is allocated to a Drive #0, and that no physical chunk 202 is allocated to a Drive #1.

The table 2090-d0 indicates that a bottleneck of the number of the physical chunks 202 allocated to the Drive #0 is a maximum allocated number MAN (Drive) of the Drive #0. Since no physical chunk 202 is allocated to the Drive #1 in the table 2090-d0, a bottleneck thereof is not set.

The table 2090-c1 indicating the number of physical chunks 202 allocated to each Node one hierarchy lower in the Fault Set #1 and the bottlenecks thereof is similar to the table 2090-c0. Further, the table 2090-d1 indicating the number of physical chunks 202 allocated to each Drive one hierarchy lower in the Node #0 of the Fault Set #1 and the bottleneck thereof, is similar to the table 2090-d0.

(Configuration of MAN Management Table)

Figure 19:
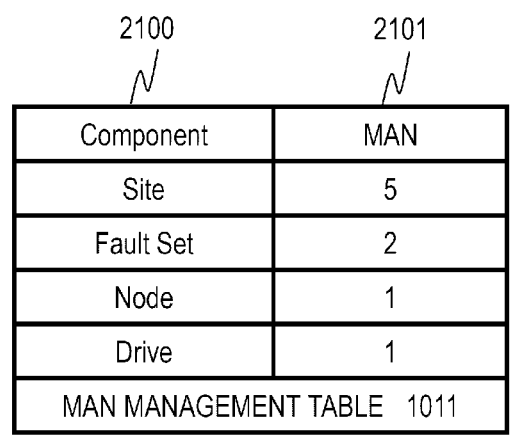
FIG. 19 illustrates a configuration example of an MAN management table according to the first embodiment.

FIG. 19 illustrates a configuration example of the MAN management table according to the first embodiment. The MAN management table 1011 manages the MAN of each component (Site, Fault Set, Node, and Drive). Since the MAN management table 1011 is used only at the time of creating a new chunk group 300 (at the time of selecting allocation destination of the physical chunk 202) and may be discarded after creating the chunk group, it is not essential to store the MAN management table 1011 in the nonvolatile area.

At the time of creating a certain new chunk group 300, physical chunks 202 of more than the MAN cannot be allocated to each component simultaneously. For example, in the example of FIG. 19, at most two physical chunks 202 per chunk group 300 can be allocated to a certain Fault Set (that is, the Node in the Fault Set and the Drive in the Node).

Values in a MAN column 2101 corresponding to the components shown in a Component column 2100 in the MAN management table 1011 are appropriately incremented by a MAN update process to be described below.

(Configuration of Failure Tolerance Management Table)

Figure 20:
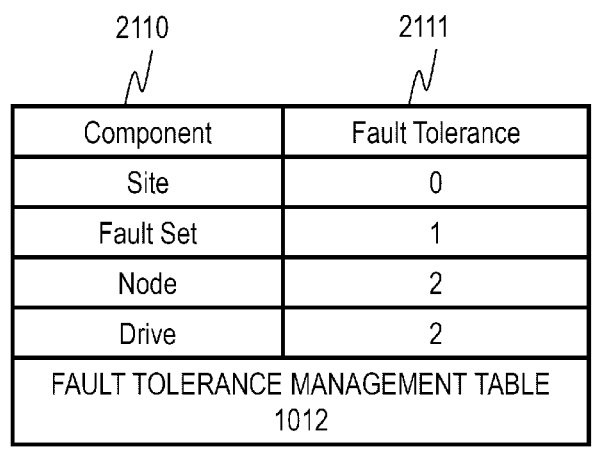
FIG. 20 illustrates a configuration example of a fault tolerance management table according to the first embodiment.

FIG. 20 illustrates a configuration example of the fault tolerance management table according to the first embodiment. The fault tolerance management table 1012 is managed in order to present current fault tolerance 2111 of each component 2110 (Site, Fault Set, Node, Drive) to the user.

For example, in the example of FIG. 20, the Node has tolerance to simultaneous failure of any two Nodes, and data loss may occur at the time of simultaneous failure of three Nodes. Meanwhile, the Fault Set only has tolerance to a failure of any one Fault Set, and data loss may occur at the time of simultaneous failure of two Fault Sets.

Here, when the protection level of the chunk group 300 is xDyP, fault tolerance of a component X is calculated by the following equation.

$$\text{Fault tolerance of the component } X = \text{floor}(y/\text{MAN}(X)) \quad (1)$$

Alternatively, if the structure in the computer system 1 is an ideal structure configured in a completely uniform manner (for example, each Fault Set is composed of three Nodes, and each Node is composed of eight Drives), the fault tolerance of the component X is calculated by the following equation.

$$\text{Fault tolerance of the component } X = \text{floor}(y/\text{ceiling}((x+y)/N)) \quad (2)$$

Floor (*) is a floor function (rounding down the numbers after the decimal point), ceiling (*) is a ceiling function (rounding up the decimal point), and N is the total number of components X in the computer system 1.

The fault tolerance management table 1012 may be updated using the current MAN when the creation of the chunk group 300 is completed (right before the MAN management table 1011 is deleted), or may be determined based on the number of Components in the computer system 1 (in this case, updated at the time of addition and reduction of Component).

In a case where the component X does not satisfy fault tolerance specified by the user (for example, in the present embodiment, when the Fault Set is desired to have tolerance of two or more), the user may be alerted and be prompted to take measures such as incrementing the number of Fault Sets or the number of Nodes, at the time of calculation of the fault tolerance management table 1012.

The fault tolerance management table 1012 may not be unique in the computer system 1. For example, a fault tolerance management table 1012 of another policy may be set for each Protection-Domain.

(Storage-Pool Capacity Increasing Process)

Figure 21:
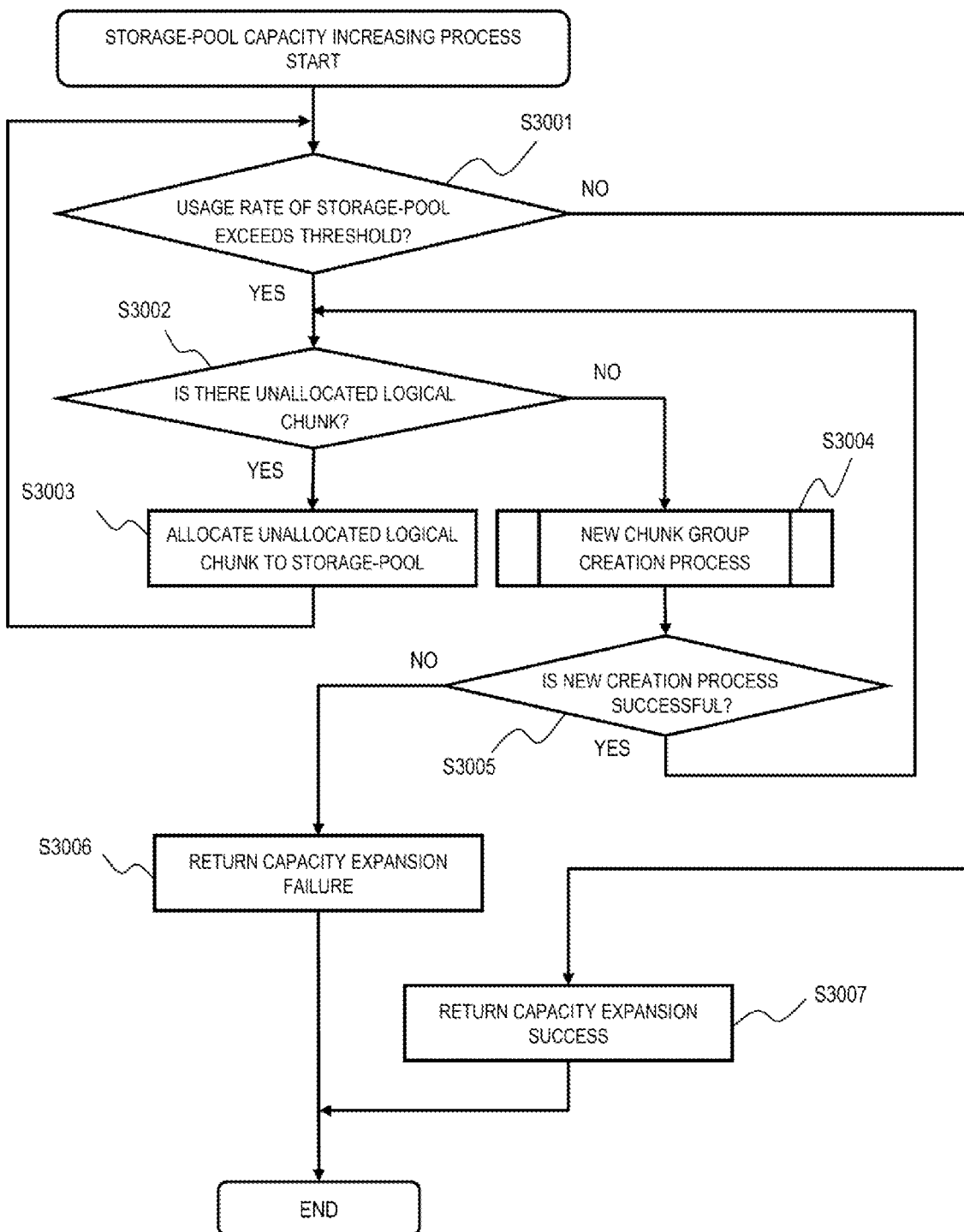
FIG. 21 is a flowchart illustrating an example of a Storage-Pool capacity increasing process according to the first embodiment.

FIG. 21 is a flowchart illustrating an example of the Storage-Pool capacity increasing process according to the first embodiment. In the following description, it is assumed that all the logical chunks 500 corresponding to a chunk group 300 are created at the time of creating the chunk group 300, and that addition of the logical chunk 500 to the Storage-Pool 501 can be implemented at any time. In each Node 100, the usage rate of the Storage-Pool 501 increases with implementation of the I/O process of the I/O processing program 1104. The Storage-Pool capacity increasing program 1102 is executed by the CPU 130 of each Node 100 when the used capacity monitoring program 1101 detects, at every I/O process or at fixed periods, that the usage rate of the Storage-Pool 501 exceeds a threshold.

First, the CPU 130 determines whether the usage rate of the Storage-Pool 501 exceeds a threshold (step S3001). The threshold may be a value uniquely determined by the system, or may be a value specified by the administrator. When the usage rate of the Storage-Pool 501 exceeds the threshold (step S3001: YES), the CPU 130 determines whether there is an unallocated logical chunk 500 (step S3002). On the other hand, when the usage rate of the Storage-Pool 501 does not exceed the threshold (step S3001: NO), the CPU 130 moves the process to step S3007.

When there is a created and unallocated logical chunk 500 (step S3002: YES), the CPU 130 allocates the unallocated logical chunk 500 to the Storage-Pool 501 (step S3003). On the other hand, when there is no unallocated logical chunk 500 (step S3002: NO), the CPU 130 executes a new chunk group creation process to create an unallocated logical chunk 500 (step S3004).

Here, the chunk group 300 to be newly created may adopt a protection level set for each Storage-Pool, or may adopt a protection level specified by the user. For example, when the available area is sufficiently present, the chunk group 300 is created adopting 3D1P that has good response performance; when the available area is less than a certain value, the chunk group 300 is created adopting 7D1P that has high capacity efficiency; and when fault occurrence frequency is high, the chunk group 300 is created adopting 4D2P that has redundancy and high reliability. Details of the new chunk group creation process will be described below with reference to FIG. 22.

When step S3003 ends, the CPU 130 returns the process to step S3001. When step S3004 ends, the CPU 130 determines whether the new creation process is successful (step S3005).

When the new creation process is successful (step S3005: YES), the CPU 130 returns the process to step S3002. On the other hand, when the new creation process is not successful (step S3005: NO), the CPU 130 returns "capacity expansion failure (NG)" (step S3006). For example, the management server 20 notifies the administrator that it is necessary to increase the available capacity such as by adding the Node or Drive, when the CPU 130 returns "capacity expansion failure (NG)".

On the other hand, in step S3007, the CPU 130 returns "capacity expansion success (OK) (normal end)". Cases of returning the capacity expansion success (OK) include one where the capacity expansion is not necessary since the usage rate of the Storage-Pool 501 does not exceed the threshold. When step S3006 or step S3007 ends, the CPU 130 ends the Storage-Pool capacity increasing process.

(New Chunk Group Creation Process)

Figure 22:
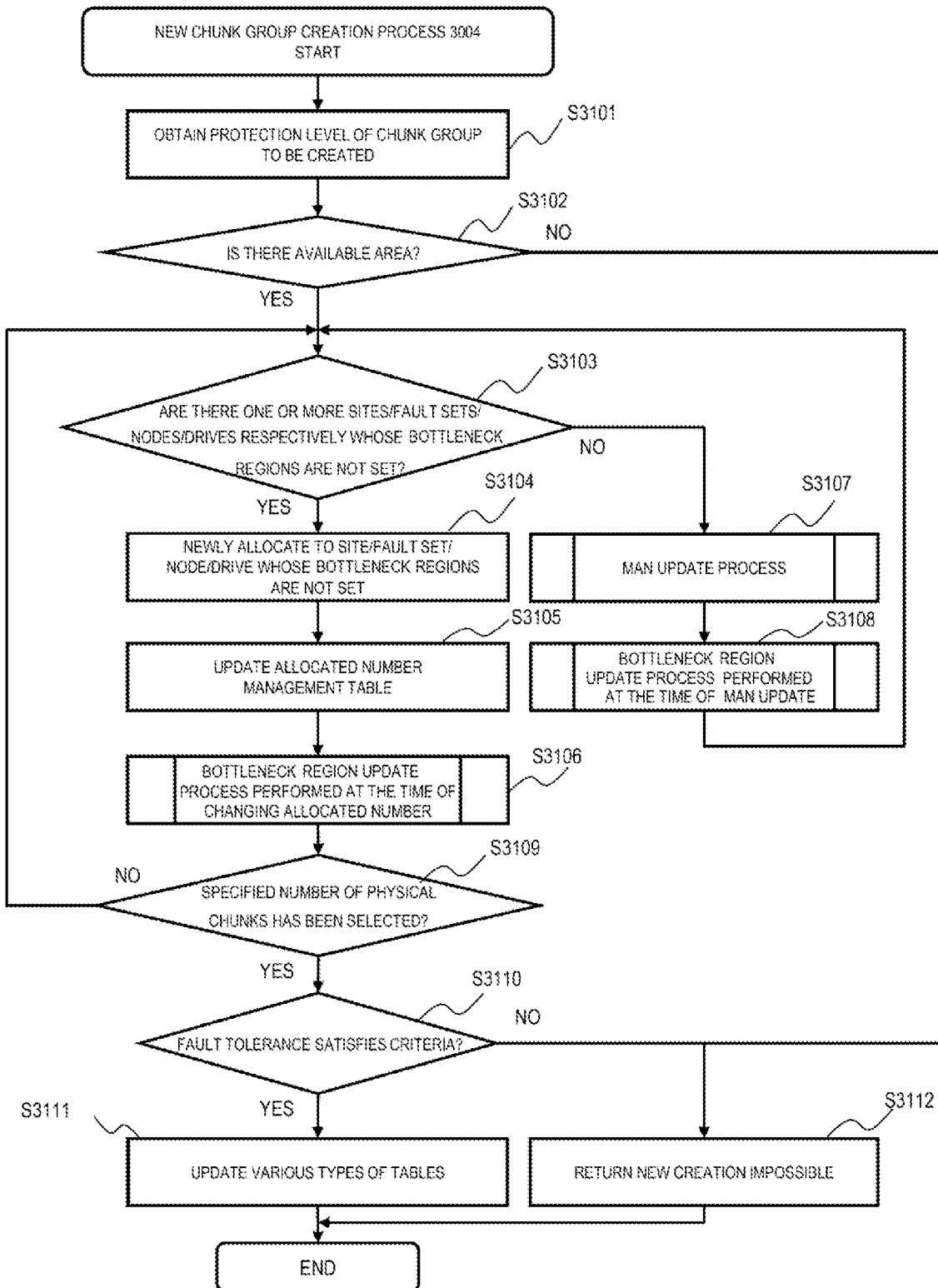
FIG. 22 is a flowchart illustrating an example of a new chunk group creation process according to the first embodiment.

FIG. 22 is a flowchart illustrating an example of the new chunk group creation process according to the first embodiment. FIG. 22 is a subroutine showing details of step S3004 of FIG. 21. The new chunk group creation process is a process of selecting a specified number of physical chunks 202 constituting the chunk group 300 at the time of creating a new chunk group 300. In respect of Maximum Allocatable Number (MAN) shown at the new chunk group creation process, for example, if MAN (Node)=2, two physical chunks 202 can be allocated to the same Node per chunk group 300.

First, the CPU 130 obtains a protection level of the chunk group 300 to be created (step S3101). For example, in step S3101, the CPU 130 recognizes that four physical chunks 202 are to be allocated if the protection level of the chunk group 300 to be created is 3D1P.

Next, based on a physical chunk size, the number of physical chunks to be allocated, and based on an unused capacity in the Node, the CPU 130 checks whether there is an available capacity allowing creation of the new chunk group at this time point, that is, whether there are sufficient unallocated (Not Allocated) physical chunks 202 corresponding to the required number of physical chunks obtained in step S3101 (step S3102). When there is an available capacity allowing creation of the new chunk group (step S3102: YES), the CPU 130 moves the process to step S3103, and if there is no available capacity (step S3102: NO), the CPU 130 moves the process to step S3112.

In step S3103, the CPU 130 determines whether the number of the Site, the Fault Set, the Node, and the Drive, whose bottleneck regions are not set, is one or more respectively. When the number of the Site, the Fault Set, the Node, and the Drive, whose bottleneck region is not set, is one or more respectively (step S3103: YES), since the physical chunks 202 can be allocated at the current time point, the CPU 130 newly allocates the physical chunks 202 to the Site, the Fault Set, the Node, and the Drive, whose bottleneck regions are not set (step S3104).

In newly allocating the physical chunks 202 in step S3104, an allocation destination is selected, for example, using the following method.

(1) A Site with the largest available capacity is selected from Sites whose bottleneck regions are not set and which are not in a failure state.
(2) A Fault Set with the largest available capacity is selected from Fault Sets which are present in the selected Site, whose bottleneck regions are not set, and which are not in a failure state.
(3) A Node with the largest available capacity is selected from Nodes which are present in the selected Fault Set, whose bottleneck regions are not set, and which are not in a failure state.
(4) A Drive with the largest available capacity is selected from Nodes which are present in the selected Node, whose bottleneck regions are not set, and which are not in a failure state.

Following step S3104, in step S3105, the CPU 130 updates the allocated number management table 1010 in accordance with a processing result of step S3104. Next, since it is necessary to update the bottleneck region when the allocation of the physical chunk 202 is incremented, the CPU 130 executes a bottleneck region update process performed at the time of changing the allocated number (step S3106). Details of the bottleneck region update process performed at the time of changing the allocated number will be described below with reference to FIG. 23. When the bottleneck region update process performed at the time of changing the allocated number ends, the CPU 130 moves the process to step S3109.

On the other hand, when the number of the Site, the Fault Set, the Node, and the Drive, whose bottleneck regions are not set, is less than one respectively (step S3103: NO), the MAN update process is executed (step S3107). Details of the MAN update process will be described below with reference to FIG. 25.

Next, since it is necessary to update the bottleneck region when the MAN is incremented, the CPU 130 executes the bottleneck region update process performed at the time of MAN update (step S3108). Details of the bottleneck region update process performed at the time of MAN update will be described below with reference to FIG. 26. When the bottleneck region update process performed at the time of MAN update ends, the CPU 130 moves the process to step S3103.

Following step S3106, in step S3109, the CPU 130 determines whether the allocation destination of the physical chunks 202 corresponding to the required number of physical chunks obtained in step S3101 has been determined. When the allocation destination of the specified number of physical chunks 202 has been selected (step S3109: YES), the CPU 130 determines whether the fault tolerance satisfies a reference set by the user by using the fault tolerance management table 1012 (step S3110). On the other hand, when the allocation destination of the specified number of physical chunks 202 is not selected (step S3109: NO), the CPU 130 returns the process to step S3103.

When the fault tolerance satisfies the reference (step S3110: YES), the CPU 130 updates the physical chunk management table 1001, the logical chunk management table 1002, and the chunk group management table 1003 (step S3111). Accordingly, each physical chunk 202 of the chunk group 300 can be allocated after confirming that the fault tolerance satisfies the reference. In response to a response from the CPU 130 that the fault tolerance satisfies the reference, the management server 20 presents the user with possible creation of the new chunk group 300, along with the component configuration of the system and fault tolerance, so that the user can recognize the fault tolerance and the possible creation of the new chunk group 300.

On the other hand, when the fault tolerance does not satisfy the reference (step S3110: NO), the CPU 130 returns "new creation impossible" (step S3112). In response to a response from the CPU 130 that the fault tolerance does not satisfy the reference, the management server 20 presents the user with impossible creation of the new chunk group 300, along with the component configuration of the system and fault tolerance. At this time, a component that needs to be added may be shown to prompt the addition.

In step S3112, for example, even when the fault tolerance does not satisfy the reference, there may be an option that the new chunk group can be created. In this case, for example, the new chunk group may be created after the user is notified that the fault tolerance is not satisfied. When step S3111 or step S3112 ends, the CPU 130 ends the new chunk group creation process.

(Bottleneck Region Update Process Performed at the Time of Changing Allocated Number)

Figure 23:
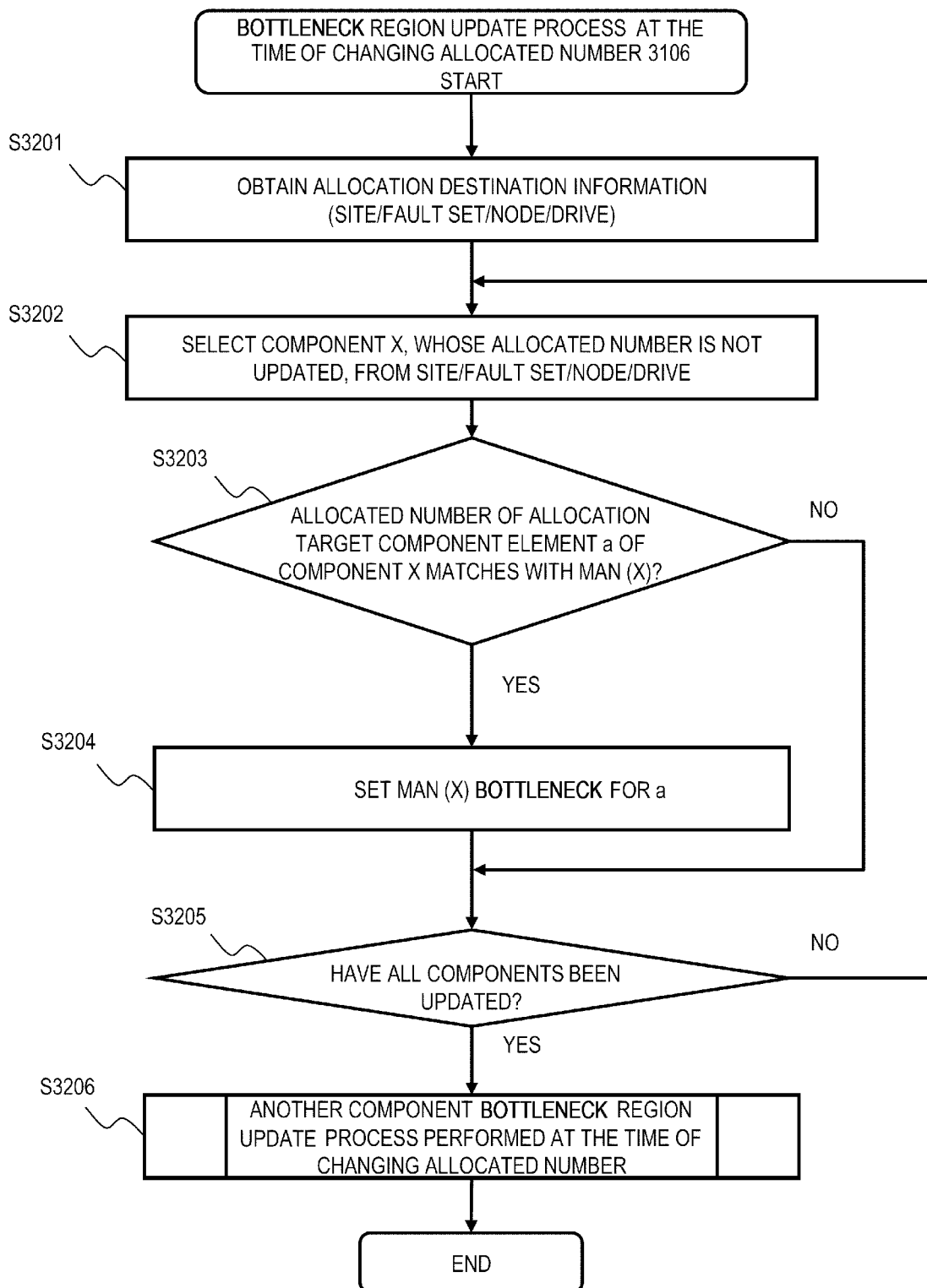
FIG. 23 is a flowchart illustrating an example of a component bottleneck region update process performed at the time of changing an allocated number according to the first embodiment.

FIG. 23 is a flowchart illustrating an example of the bottleneck region update process performed at the time of changing the allocated number according to the first embodiment. FIG. 23 is a subroutine showing details of step S3106 of FIG. 22. In the bottleneck region update process performed at the time of changing the allocated number, a component element, which becomes a bottleneck due to allocation taking place when the physical chunk 202, is updated, as one component of the new chunk group 300 to be created, is allocated to a certain area.

In the description of the bottleneck region update process performed at the time of changing the allocated number, the "component" indicates component types such as Drive and Node (the component is indicated by uppercase Latin letters). Meanwhile, a "component element" indicates any one element of the components, for example, a single Drive. An element in a certain component X is also referred to as a "component X element" (a component element is indicated by lowercase Latin letters).

In respect of the high-order/low-order concept of the components, when a component A includes one or more components B, it is defined that "the component A is the high-order component of the component B". In the present embodiment, since the components are in an inclusion relation of Site ⊃ Fault Set ⊃ Node ⊃ Drive, for example, the Site is a high-order component of the Fault Set and the Drive is a low-order component of the Node.

First, the CPU 130 obtains allocation destination information (Site/Fault Set/Node/Drive) (step S3201). Next, the CPU 130 selects a component X whose allocated number is not updated, according to the allocation destination information of the Site/Fault Set/Node/Drive obtained in step S3201 (step S3202).

Next, the CPU 130 determines whether the allocated number of an allocation target component element a of the component X matches with the MAN (X) (step S3203). That is, at the time of allocating the physical chunk 202, since the allocated number of one component element a is changed (+1) among the components of the Site/Fault Set/Node/Drive, it is checked whether each target component element a has become a bottleneck region (whether the MAN (X)) has been reached) where new allocation is inhibited.

When the allocated number of the allocation target component element a of the component X matches with the MAN (X) (step S3203: YES), the CPU 130 sets the MAN (X) bottleneck for the allocation target component element a of the component X (step S3204). When the allocated number of the allocation target component element a of the component X does not match with the MAN (X) (step S3203: NO), the CPU 130 moves the process to step S3205.

Following step S3203 or step S3204, in step S3205, the CPU 130 determines whether all the components have been updated. When all the components have been updated (step S3205: YES), the CPU 130 moves the process to step S3206. When not all the components have been updated (step S3205: NO), the CPU 130 moves the process to step S3202.

In step S3206, the CPU 130 executes another component bottleneck region update process performed at the time of changing the allocated number. The other component bottleneck region update process performed at the time of changing the allocated number is a process of checking a high-order component that may have been newly bottlenecked when the bottleneck region is changed. For example, in a case where all Drives subordinate to a certain Node become a MAN (Drive) bottleneck, since physical chunks cannot be allocated to the Node even when the allocated number of the Node has not reached the MAN (Node), it is necessary to set a MAN (Drive) bottleneck for the Node. Details of the other component bottleneck region at the time of changing the allocated number will be described below with reference to FIG. 24. When step S3206 ends, the CPU 130 ends the bottleneck region update process performed at the time of changing the allocated number.

(Other Component Bottleneck Region Update Process at the Time of Changing Allocated Number)

Figure 24:
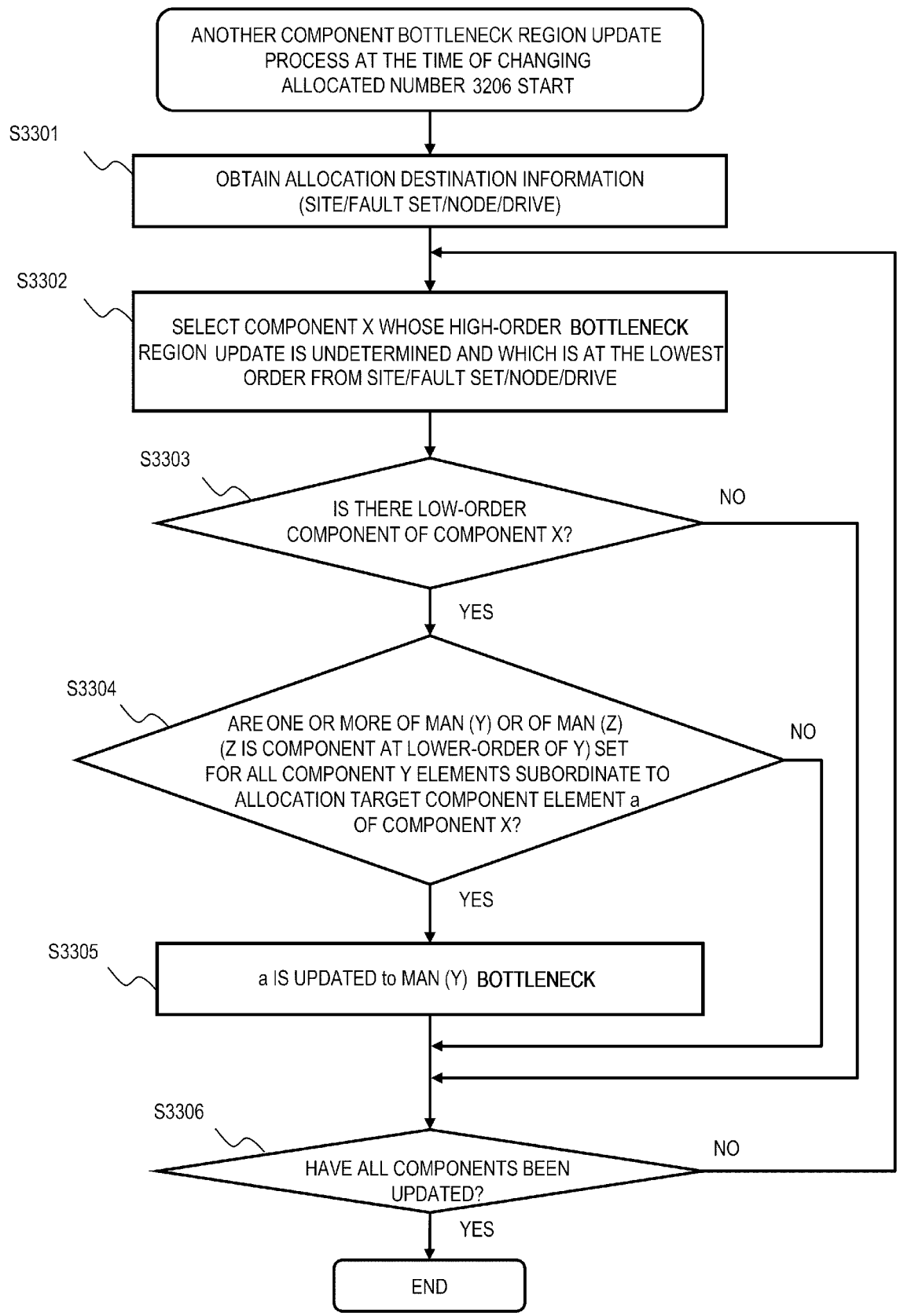
FIG. 24 is a flowchart illustrating an example of another component bottleneck region update process performed at the time of updating the allocated number according to the first embodiment.

FIG. 24 is a flowchart illustrating an example of the other component bottleneck region update process performed at the time of changing the allocated number according to the first embodiment. FIG. 24 is a subroutine showing details of step S3206 of FIG. 23.

First, the CPU 130 obtains the allocation destination information (the Site/Fault Set/Node/Drive) (step S3301). The other component bottleneck region update process performed at the time of changing the allocated number needs to be performed sequentially from lower-order components.

Next, the CPU 130 selects a component X whose high-order bottleneck region update is undetermined and which is at the lowest order, from among the Site/Fault Set/Node/Drive (step S3302). Next, the CPU 130 determines whether there is a low-order component of the component X selected in step S3302 (step S3303). However, in the case of the lowest-order component (for example, the Drive), since the lowest-order component is not affected by bottleneck region change of a component at a lower-order thereof, the lowest-order component is not selected in step S3302.

When there is a low-order component of the component X selected in step S3302 (step S3303: YES), the CPU 130 determines whether one or more of MAN (Y) or one or more of MAN (Z) (Z is a component at a lower-order of Y) are set for all component Y elements subordinate to the target component element a of the component X (step S3304). On the other hand, when there is no low-order component of the component X selected in step S3302 (step S3303: NO), the CPU 130 moves the process to step S3306.

When one or more of MAN (Y), and one or more of MAN (Z) (Z is a component at a lower-order of Y) are set for all the component Y elements subordinate to the target component element a of the component X (step S3304: YES), the target component element a is updated to the MAN (Y) bottleneck (step S3305).

For example, in a case where the physical chunk 202 is allocated to a certain Fault Set (target component element a), when one or more of MAN (Node) or one or more of MAN (Drive) are set for all Nodes (low-order component) subordinate to the Fault Set (target component element a) are all Node, a MAN (Node) bottleneck is set for the Fault Set (target component element a). Here, if each Node has the MAN (Drive), a MAN (Drive) bottleneck is set for the Fault Set (target component element a).

Next, the CPU 130 determines whether all the components have been determined (step S3306). When all the components have been determined (step S3306: YES), the CPU 130 ends the other component bottleneck region update process performed at the time of changing the allocated number, and when not all the components have not been determined (step S3306: NO), the CPU 130 moves the process to step S3302.

(MAN Update Process)

Figure 25:
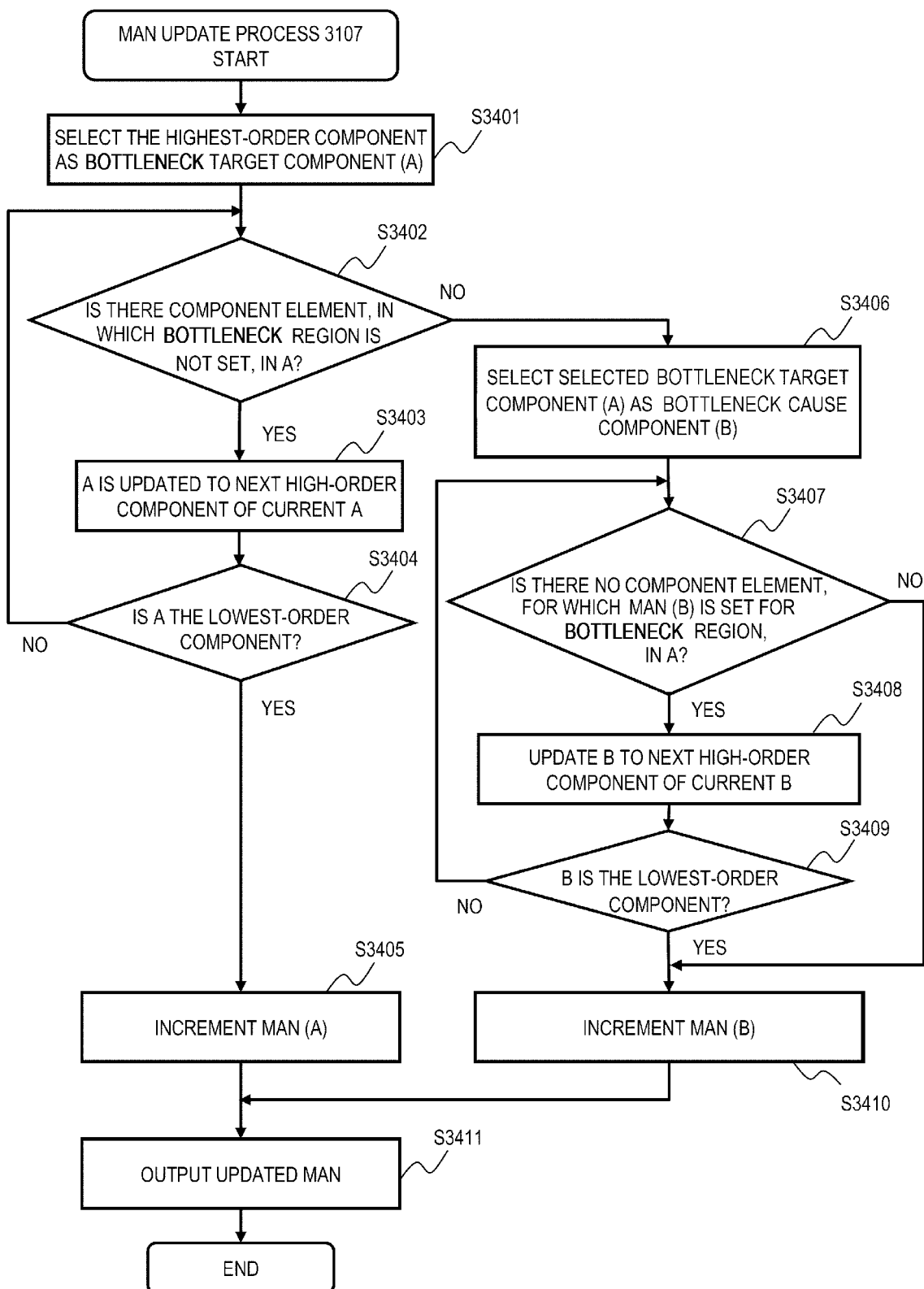
FIG. 25 is a flowchart illustrating an example of an MAN update process according to the first embodiment.

FIG. 25 is a flowchart illustrating an example of the MAN update process according to the first embodiment. FIG. 25 is a subroutine showing details of step S3107 in FIG. 21. The MAN update process is a process corresponding to incrementing the MAN when the allocation cannot be implemented in a current allocation state and at a current MAN.

Although only the MAN of one component is updated here, as illustrated in the new chunk group creation process (see FIG. 22), it is not always the case that the allocation can be implemented only by updating one MAN. Hereinafter, a bottleneck target component is assumed to be A and a bottleneck cause component is assumed to be B.

First, the CPU 130 selects the highest-order component as the bottleneck target component (A) (step S3401). In step S3401, since the MAN is preferentially increased from high-order components, the check is started from the highest-order component (Site).

Next, the CPU 130 determines whether there is a component element, in which a bottleneck region is not set, in the bottleneck target component A (step S3402). When there is a component element, in which the bottleneck region is not set, in the bottleneck target component A (step S3402: YES), the bottleneck target component A is updated to a next high-order component of the current bottleneck target component A (step S3403).

On the other hand, when there is no component element, in which the bottleneck region is not set, in the bottleneck target component A (step S3402: NO), the process is moved to step S3406. In step S3406, the CPU 130 selects the selected bottleneck target component (A) as the bottleneck cause component (B). That is, when there is a component (A), in which any bottleneck region is set, in all the component elements, the CPU 130 checks which component (B) the bottleneck region set in the component (A) is from.

Following step S3403, in step S3404, the CPU 130 determines whether the bottleneck target component A is the lowest-order component. When the bottleneck target component A is the lowest-order component (step S3404: YES), the CPU 130 increments the MAN (A) (step S3405). At the time point of reaching the lowest-order component (Drive), the MAN (A)=MAN (Drive) is updated since it is determined that the MAN to be updated is a MAN (Drive). When step S3405 ends, the CPU 130 moves the process to step S3411.

Following step S3406, the CPU 130 determines whether there is no component element, for which a MAN (B) is set for the bottleneck region, in A (step S3407). When there is no component element, for which the MAN (B) is set for the bottleneck region, in A (step S3407: YES), the CPU 130 updates B to a next high-order component of the current B (step S3408). On the other hand, when there is a component element, for which the MAN (B) is set for the bottleneck region, in A (step S3407: NO), the CPU 130 moves the process to step S3410.

Following step S3408, in step S3409, the CPU 130 determines whether B is the lowest-order component. When B is the lowest-order component (step S3409: YES), the CPU 130 moves the process to step S3410. When B is not the lowest-order component (step S3409: NO), the CPU 130 moves the process to step S3407.

In step S3410, the CPU 130 increments the MAN (B). When step S3410 ends, the CPU 130 moves the process to step S3411. In step S3411, the CPU 130 outputs the updated MAN. When step S3411 ends, the CPU 130 ends the MAN update process.

For example, when the bottleneck target component A is the Fault Set (some bottleneck regions are set in all the Fault Sets) and there is a Fault Set for which a MAN (Fault Set) is set, the MAN (Fault Set) is updated. Further, in a case where there is no Fault Set for which the MAN (Fault Set) is set, a MAN (Node) is updated (incremented) when there is a Fault Set for which the MAN (Node) is set, and a MAN (Drive) is updated (incremented) when there is no Fault Set for which the MAN (Node) is set.

(Bottleneck Region Update Process Performed at the Time of MAN Update)

Figure 26:
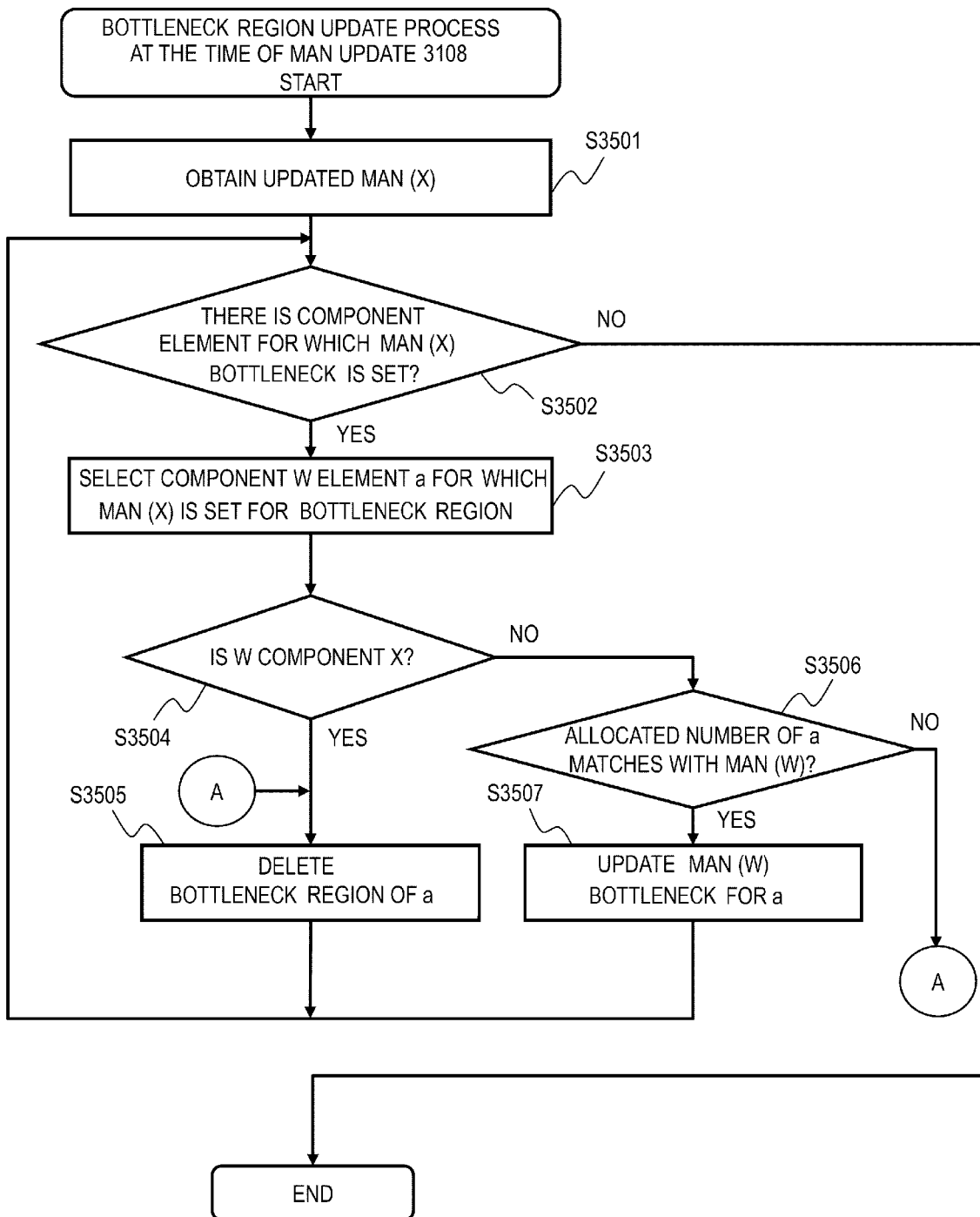
FIG. 26 is a flowchart illustrating an example of a bottleneck region update process performed at the time of MAN update according to the first embodiment.

FIG. 26 is a flowchart illustrating an example of the bottleneck region update process performed at the time of MAN update according to the first embodiment. FIG. 26 is a subroutine showing details of step S3108 of FIG. 22. In updating the MAN, there should be a component element (the bottleneck is removed or bottleneck of other component bottleneck is changed) whose bottleneck region is to be updated. The bottleneck region update process performed at the time of MAN update is a process of checking the component element whose bottleneck region is to be updated and updating the bottleneck region.

First, the CPU 130 obtains an updated MAN (X) (step S3501). Next, the CPU 130 determines whether there is a component element for which an MAN (X) bottleneck for the MAN (X) obtained in step S3501 is set (step S3502). When there is a component element for which the MAN (X) bottleneck for the MAN (X) obtained in step S3501 is set (step S3502: YES), the CPU 130 selects a component W element a for which the MAN (X) is set for a bottleneck region (step S3503). On the other hand, when there is no component element for which the MAN (X) bottleneck is set (step S3502: NO), the CPU 130 ends the bottleneck region update process performed at the time of MAN update. In step S3502, when it is determined that there is no component element for which the updated MAN (X) is set for the bottleneck region through step S3505 or step S3507 to be described below, that is, the determination result is NO, the bottleneck region update process performed at the time of MAN update ends.

Hereinafter, a case where the updated component (X) is a Fault Set (a case where a MAN (Fault Set) is updated) will be described as an example.

Next, the CPU 130 determines whether the component W selected in step S3503 is the component X (step S3504). When the component W selected in step S3503 is the component X (step S3504: YES), the bottleneck region of the component W element a is deleted (step S3505). That is, when there is a component W element a, for which the MAN (Fault Set) bottleneck is set, in the Fault Set (W), that is, when the MAN (Fault Set) bottleneck is set for a Fault Set (a), the set bottleneck region of the Fault Set is removed.

Here, since the MAN (Fault Set) bottleneck is set for a certain Fault Set, that is, there is one or more Nodes that are subordinate to the Fault Set and for which a bottleneck is not set, the bottleneck region may simply be deleted in this case. When step S3505 ends, the CPU 130 returns the process to step S3502.

On the other hand, when the component W selected in step S3503 is not the component X (step S3504: NO), the CPU 130 determines whether an allocated number of the component W element a matches with a MAN (W) (step S3506). When the allocated number of the component W element a matches with the MAN (W) (step S3506: YES), the CPU 130 updates the component W element a to the MAN (W) bottleneck (step S3507).

In other words, when there is the component W element a, for which the MAN (Fault Set) bottleneck is set, in a Site (W), that is, when the MAN (Fault Set) bottleneck is set for each Site (a), first, it is checked whether an allocated number of the Site (a) matches with a MAN (Site) (since there is a probability that it is hidden in a MAN (Fault Set) and may also be a MAN (Site) bottleneck). When the Site (a) has the MAN (Site) bottleneck, the Site (a) is updated from the MAN (Fault Set) bottleneck to the MAN (Site) bottleneck. Accordingly, it is possible to recognize whether the cause of becoming a bottleneck region is the component or a low-order component thereof.

When the allocated number of the component W element a does not match with the MAN (W) (step S3506: NO), the CPU 130 moves the process to step S3505. When step S3505 or step S3507 ends, the CPU 130 returns the process to step S3502.

(Change of Allocated Number Management Table Involved in Physical Chunk Allocation Process)

FIGS. 27 to 42 illustrate an example of a state transition of the allocated number management table and the MAN management table, involved in a physical chunk allocation process according to the first embodiment. Hereinafter, with reference to FIGS. 27 to 42, how the allocated number management table 1010 (see FIG. 18) and the MAN management table 1011 (see FIG. 19) change every time a physical chunk is allocated to a drive in a Site #0 during the new chunk group creation process shown in FIG. 22 will be described.

A case will be described below, where a Protection Domain #0 has one Site #0, the Site #0 has three Fault Sets of FS #0, FS #1 and FS #2, the FS #0 has three Nodes of Node #0-0, Node #0-1 and Node #0-2, the FS #1 has two Nodes of Node #1-0 and Node #1-1, the FS #2 has one Node #2-0, each Node has two Drives, and seven physical chunks (6D1P or 5D2P or the like) are allocated to each Drive.

In describing FIGS. 27 to 42, in the allocated number management table 1010, the MAN (Maximum Allocated Number) for the Component of Site is set as "Ms", the MAN for the Component of Fault Set as "Mf", the MAN for the Component of Node as "Mn", and the MAN for the Component of Drive as "Md".

In FIGS. 27 to 42, the following is a basic policy.

(1) The maximum allocated number for the same component is minimized. That is, physical chunks are allocated as equally as possible among the components.

(2) When the allocated number exceeds a certain number, the allocated number for low-order components is reduced as much as possible.

This is because it is considered that a failure easily occurs in a low-order component. Therefore, it is coped by incrementing the maximum allocated number of the high-order components as much as possible, if it is possible to arrange without incrementing the maximum allocated number of the low-order components by incrementing the maximum allocated number of high-order components. That is, it is finally performed to increment the maximum allocated number (MAN (Drive)) of the same drive.

Figure 27:
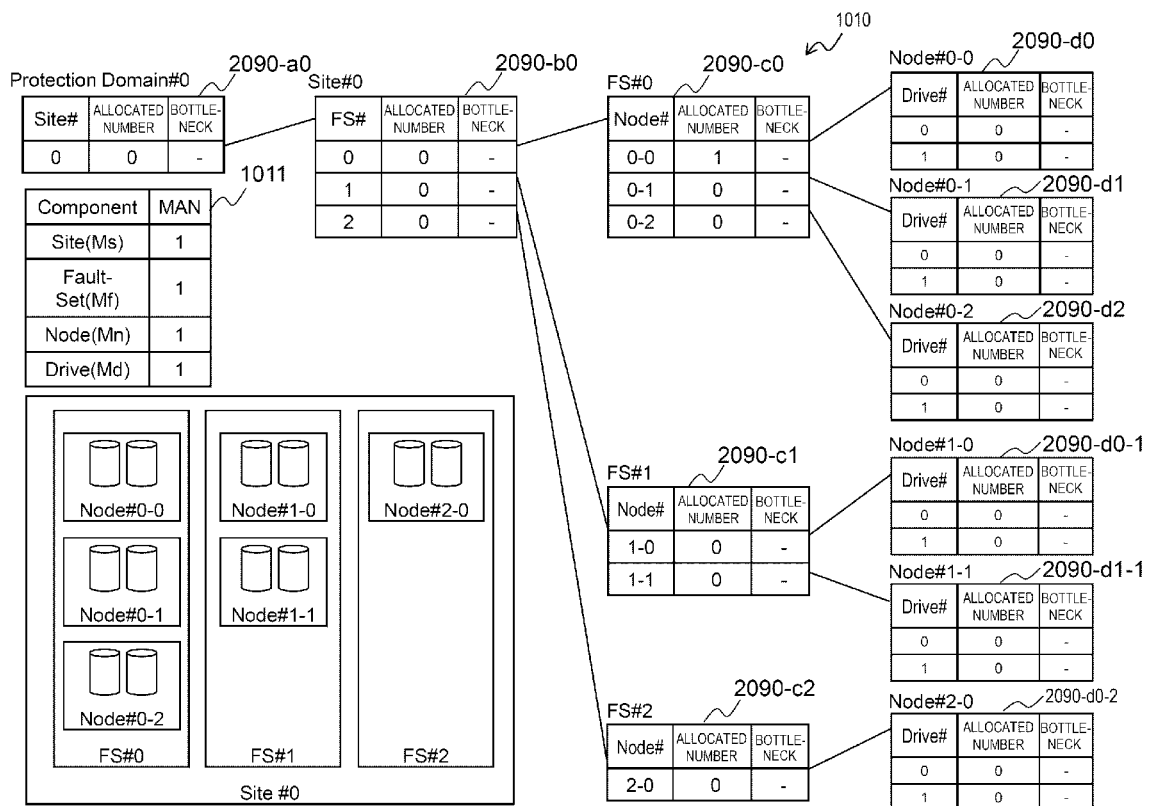
FIG. 27 illustrates an example of a state transition of the allocated number management table and the MAN management table, involved in a physical chunk allocation process according to the first embodiment (part 1).

First, FIG. 27 shows the allocated number management table 1010 and the MAN management table 1011 in an initial state in which no physical chunk is allocated to the Protection Domain #0.

Figure 28:
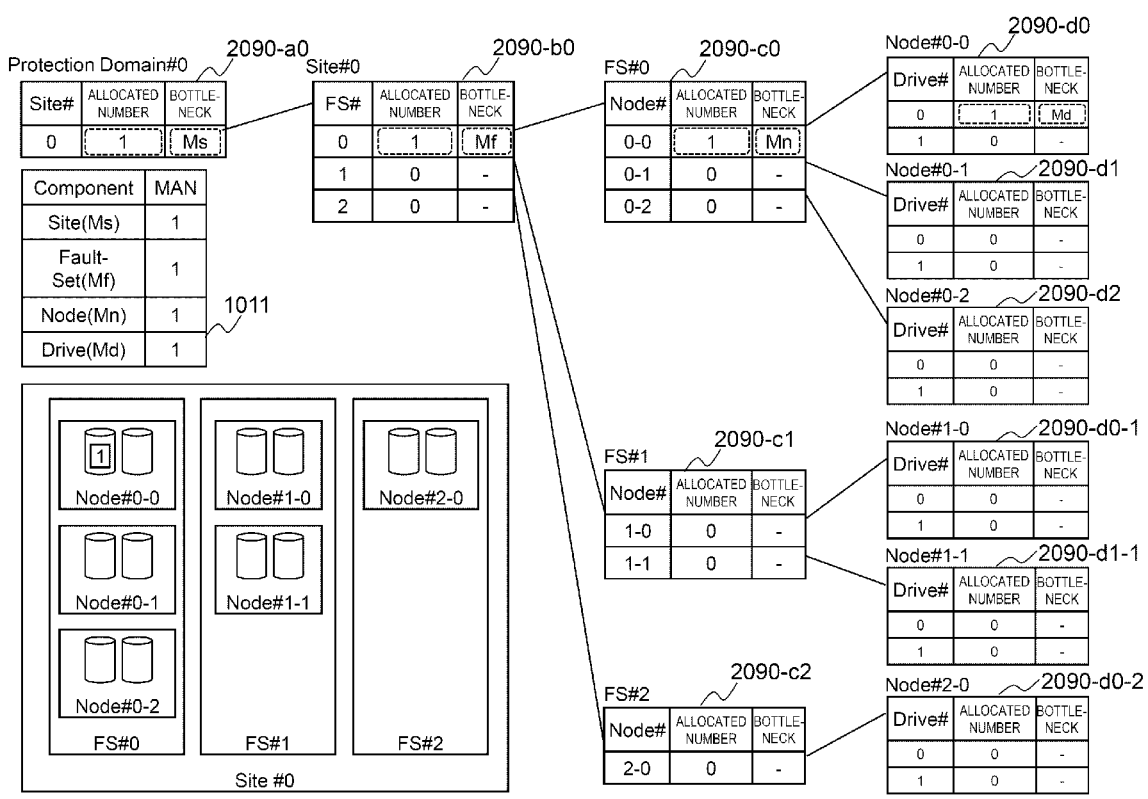
FIG. 28 illustrates the example of the state transition of the allocated number management table and the MAN management table, involved in the physical chunk allocation process according to the first embodiment (part 2).

Next, FIG. 28 shows a state in which a first physical chunk is allocated to the Drive #0 of the Node #0-0. When the first physical chunk is allocated to the Drive #0 of the Node #0-0, an allocated number of the Site #0 in a table 2090-a0, an allocated number of the FS #0 in a table 2090-b0, an allocated number of the Node #0-0 in a table 2090-c0, and an allocated number of the Drive #0 in the table 2090-d0 are incremented, respectively.

The allocated number of the Site #0 reaches Ms=1 in the table 2090-a0, and the FS #1 and the FS #2, for both of which neither an Mf bottleneck, an Mn bottleneck nor an Md bottleneck is set, are present among Fault Sets subordinate to the Site #0, therefore a Ms bottleneck of the Site #0 is set.

The allocated number of the FS #0 reaches Mf=1 in the table 2090-b0, and the Node #0-1 and the Node #0-2 subordinate to the FS #0, for both of which neither the Mn bottleneck nor the Md bottleneck is set, are present, therefore an Mf bottleneck is set.

The allocated number of the Node #0-0 reaches Mn=1 in the table 2090-c0, and a Drive #1 subordinate to the Node #0-0 for which the Md bottleneck is not set is present, therefore an Mn is set.

The allocated number of the Drive #0 reaches Md=1 in the table 2090-d0, therefore the Md bottleneck is set.

Figure 29:
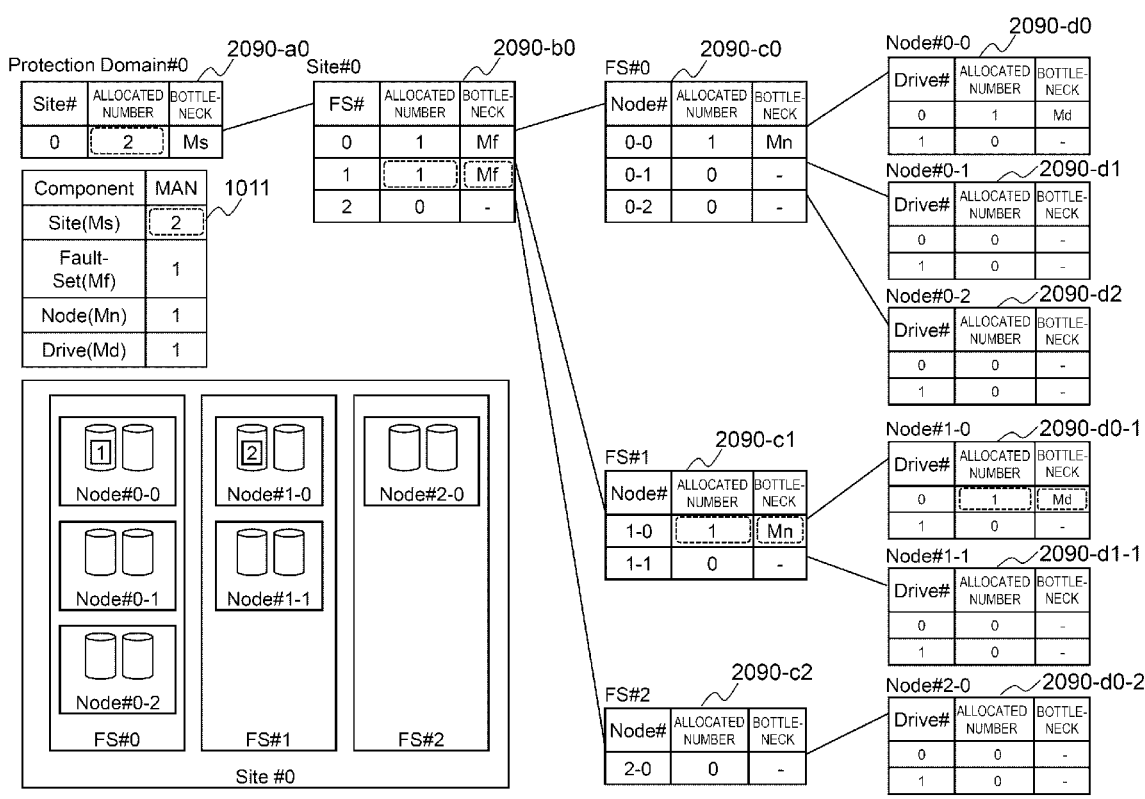
FIG. 29 illustrates the example of the state transition of the allocated number management table and the MAN management table, involved in the physical chunk allocation process according to the first embodiment (part 3).

Next, FIG. 29 shows a state in which a second physical chunk is allocated to a Drive #0 of the Node #1-0. All the Sites (only Site #0 in this example) have the Ms bottleneck. Since the allocated number of the Site #0 is less than the Ms due to incrementing Ms of the MAN management table 1011 to "2", the second physical chunk can be allocated to the Site #0.

When the second physical chunk is allocated to the Drive #0 of the Node #1-0, the allocated number of the Site #0 in the table 2090-a0, the allocated number of the FS #1 in the table 2090-b0, the allocated number of the Node #1-0 in the table 2090-c1, and the allocated number of the Drive #0 in a table 2090-d0-i are incremented, respectively.

The allocated number of the Site #0 reaches Ms=2 in the table 2090-a0, and the FS #2 subordinate to the Site #0 for which neither the Mf bottleneck, the Mn bottleneck nor the Md bottleneck is set, is present, therefore the Ms bottleneck is set.

The allocated number of the FS #1 reaches Mf=1 in the table 2090-b0, and the Node #1-1 subordinate to the FS #1 for which neither the Mn bottleneck nor the Md bottleneck is set, is present, therefore the Mf bottleneck is set.

The allocated number of the Node #1-0 reaches Mn=1 in the table 2090-c1, and a Drive #1 subordinate to the Node #1-0 for which the Md bottleneck is not set is present, therefore the Mn bottleneck is set.

Since the allocated number of the Drive #0 reaches Md=1 in the table 2090-d0-1, the Md bottleneck is set.

Figure 30:
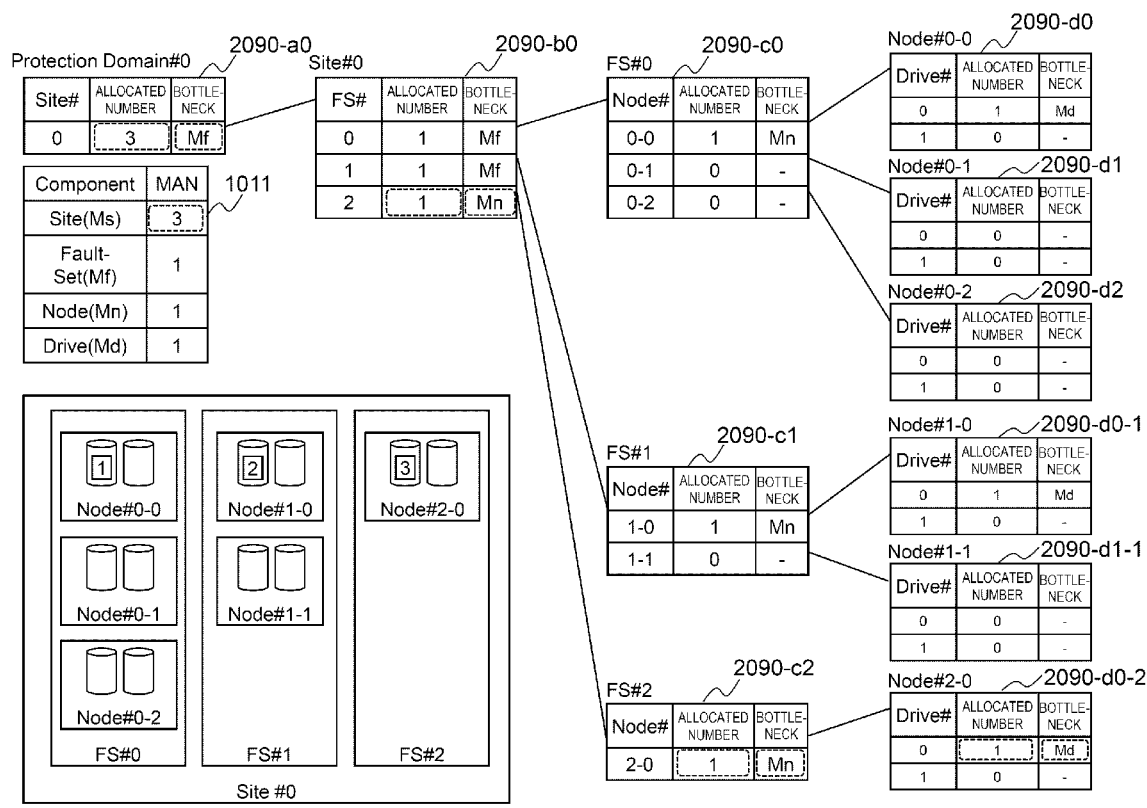
FIG. 30 illustrates the example of the state transition of the allocated number management table and the MAN management table, involved in the physical chunk allocation process according to the first embodiment (part 4).

Next, FIG. 30 shows a state in which a third physical chunk is allocated to the Drive #0 of the Node #2-0. All the Sites (only Site #0 in this example) have the Ms bottleneck. Since the allocated number of the Site #0 is less than Ms due to incrementing the Ms of the MAN management table 1011 to "3", the third physical chunk can be allocated to the Site #0.

When the third physical chunk is allocated to a Drive #0 of the Node #2-0, the allocated number of the Site #0 in the table 2090-a0, the allocated number of the FS #2 in the table 2090-b0, the allocated number of the Node #2-0 in the table 2090-c2, and the allocated number of a Drive #0 in a table 2090-d0-2 are incremented, respectively.

The allocated number of the Site #0 reaches Ms=3 in the table 2090-a0, and all FSs subordinate to the Site #0 have one or more Mf bottlenecks and Mn bottleneck or Md bottlenecks, therefore the Mf bottleneck is set.

The allocated number of the FS #2 reaches Mf=1 in the table 2090-b0, and all Nodes (Node #2-0) subordinate to the FS #2 have the Mn bottleneck, therefore the Mn bottleneck is set. Here, although the FS #2 has an Mf bottleneck, since all the Nodes in the FS #2 have the Mn bottlenecks even when Mf is incremented, physical chunks cannot be allocated. Since it is necessary to increase Mn in order to enable the allocation of physical chunks to the FS #2, the Mn bottleneck is set for the FS #2.

The allocated number of the Node #2-0 reaches Mn=1 in the table 2090-c2, and a Drive #1 subordinate to the Node #2-0 for which the Md bottleneck is not set is present, therefore the Mn bottleneck is set.

Since the allocated number of the Drive #0 reaches Md=1 in the table 2090-d0-2, the Md bottleneck is set for the Drive #0.

Figure 31:
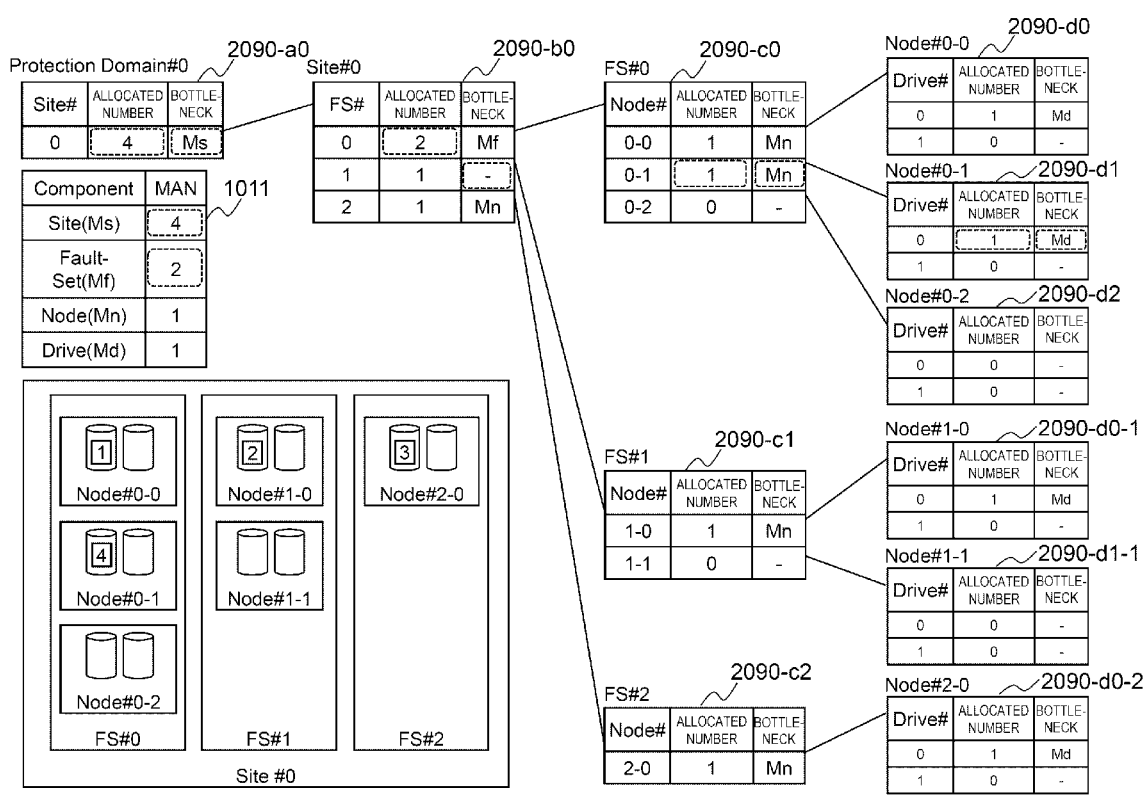
FIG. 31 illustrates the example of the state transition of the allocated number management table and the MAN management table, involved in the physical chunk allocation process according to the first embodiment (part 5).

Next, FIG. 31 shows a state in which a fourth physical chunk is allocated to a Drive #0 of the Node #0-1. All the Sites (only Site #0 in this example) have the Ms bottleneck. By incrementing the Ms of the MAN management table 1011 to "4", and Mf of the MAN management table 1011 to "2", the fourth physical chunk can be allocated to the Site #0. Accordingly, the allocated numbers of the FS #0 and the FS #1 are less than Mf, and the Mf bottlenecks of the FS #0 and the FS #1 are deleted.

When the fourth physical chunk is allocated to a Drive #0 of the Node #0-1, the allocated number of the Site #0 in the table 2090-a0, the allocated number of the FS #0 in the table 2090-b0, the allocated number of the Node #0-1 in the table 2090-c0, and the allocated number of the Drive #0 in the table 2090-d1 are incremented, respectively.

The allocated number of the Site #0 reaches Ms=4 in the table 2090-a0, and the FS #1 subordinate to the Site #0 for which neither the Mf bottleneck, the Mn bottleneck nor the Md bottleneck under is set, is present, therefore the Ms bottleneck is set.

In the table 2090-b0, the allocated number of the FS #0 reaches Mf=2, and the Drive #0-2 subordinate to the FS #0 for which neither the Mn bottleneck nor the Md bottleneck is set is present, therefore the Mf bottleneck is set again. Since the allocated number of the FS #1 is less than Mf=2 in the table 2090-b0, the bottleneck is not reset again. Since the lower-order Mn bottleneck is maintained, Mf is not set for the FS #2 even when allocated number of the FS #2 is less than Mf=2 in the table 2090-b0.

The allocated number of the Node #1 reaches Mn=1 in the table 2090-c0, and the Drive #1 subordinate to the Node #0-1 for which the Md bottleneck is not set is present, therefore the Mn bottleneck is set.

Since the allocated number of the Drive #0 of the Node #0-1 reaches Md=1 in the table 2090-d1, the Md bottleneck is set.

Figure 32:
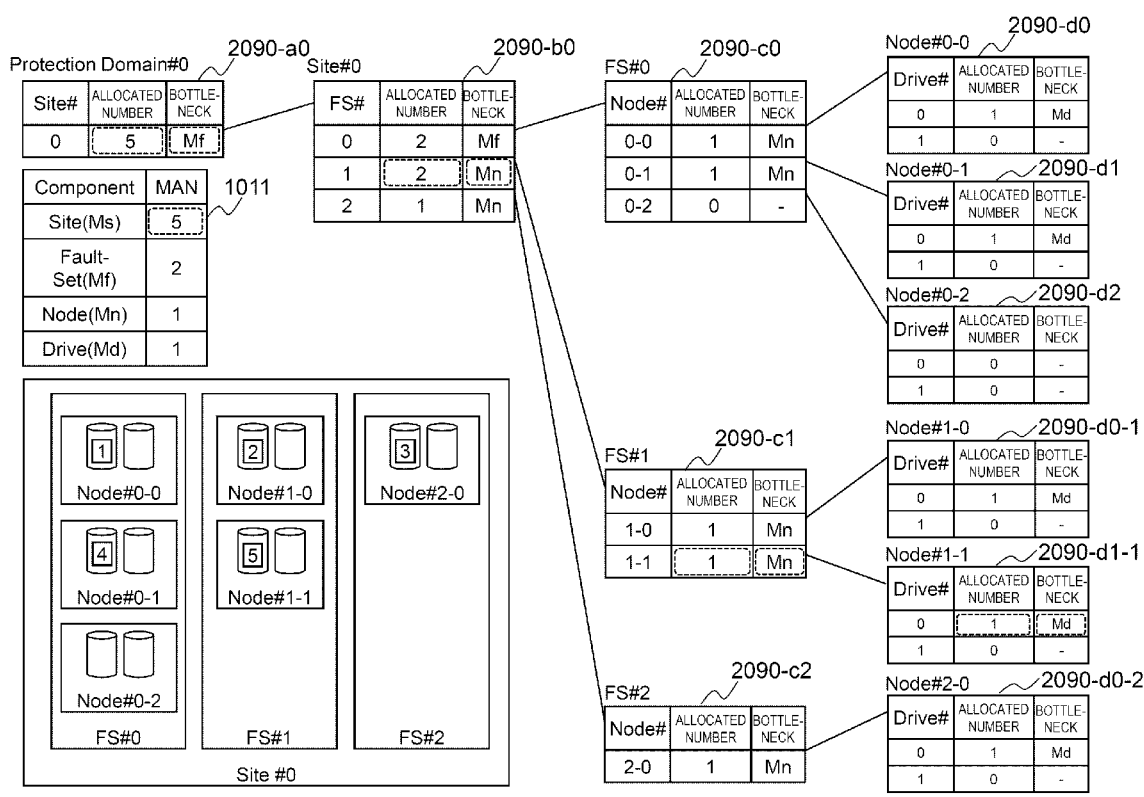
FIG. 32 illustrates the example of the state transition of the allocated number management table and the MAN management table, involved in the physical chunk allocation process according to the first embodiment (part 6).

Next, FIG. 32 shows a state in which a fifth physical chunk is allocated to a Drive #0 of the Node #1-1. All the Sites (only Site #0 in this example) have the Ms bottleneck. Since the allocated number of the Site #0 is less than Ms due to incrementing the Ms of the MAN management table 1011 to "5", the fifth physical chunk can be allocated to the Site #0.

When the fifth physical chunk is allocated to the Drive #0 of the Node #1-1, the allocated number of the Site #0 in the table 2090-a0, the allocated number of the FS #1 in the table 2090-b0, the allocated number of the Node #1-1 in the table 2090-c1, and the allocated number of the Drive #0 in a table 2090-d1-1 are incremented, respectively.

The allocated number of the Site #0 reaches Ms=5 in the table 2090-a0, and all FSs subordinate to the Site #0 have one or more Mf bottlenecks and Mn bottlenecks or Md bottlenecks, therefore the Mf bottleneck is set.

The allocated number of the FS #1 reaches Mf=2 in the table 2090-b0, and all Nodes subordinate to the FS #1 have one or more Mn bottlenecks and Md bottlenecks, therefore the Mn bottleneck is set.

The allocated number of the Node #1-1 reaches Mn=1 in the table 2090-c1, and a Drive #1 subordinate to the Node #1-1 for which the Md bottleneck is not set is present, therefore the Mn is set.

Since the allocated number of the Drive #0 of the Node #1-1 reaches Md=1 in the table 2090-d1-1, the Md bottleneck is set.

Next, with reference to FIGS. 33 to 38, a state in which a sixth physical chunk is allocated to a Drive #0 of the Node #0-2 is shown.

Figure 33:
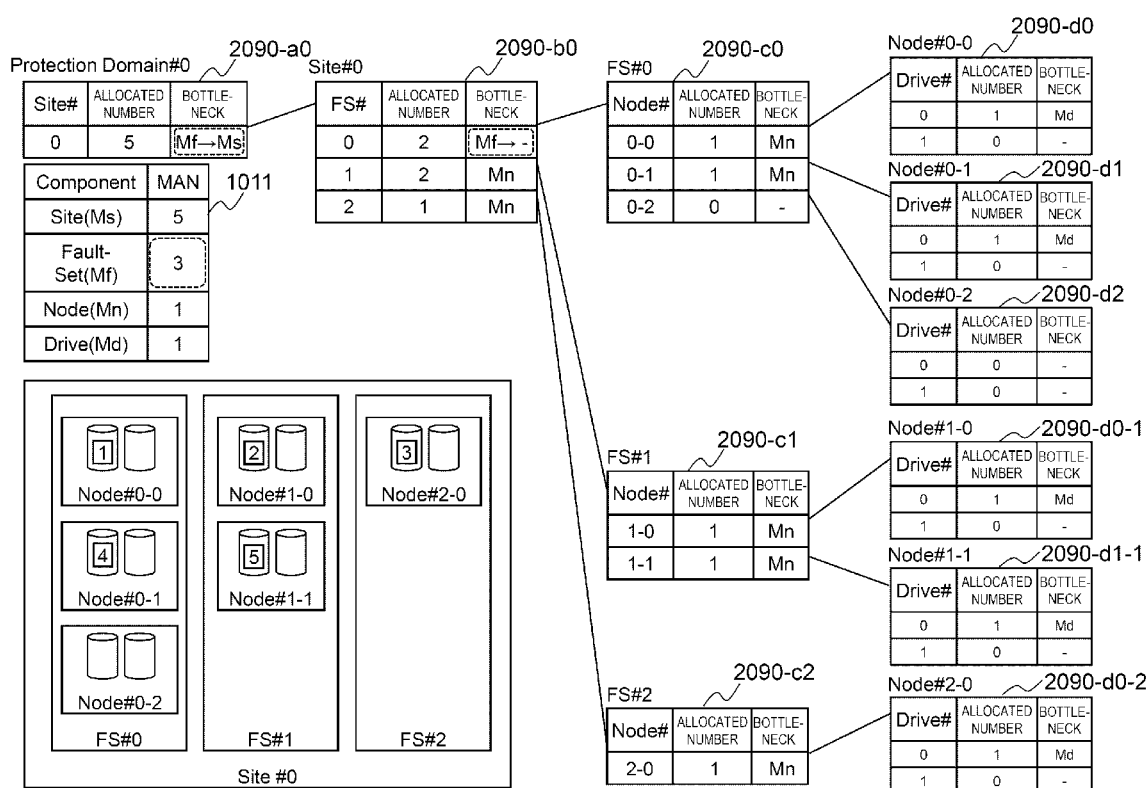
FIG. 33 illustrates the example of the state transition of the allocated number management table and the MAN management table, involved in the physical chunk allocation process according to the first embodiment (part 7).

First, as shown in FIG. 33, since the Site #0 of the Protection Domain #0 has the Mf bottleneck, Mf in the MAN management table 1011 is incremented to "3" in order to change the Mf bottleneck to an Ms bottleneck. Then, the Mf bottleneck of the FS #0 of the Site #0, which is a bottleneck, is deleted. That is, Mf in the MAN management table 1011 is incremented, and the bottleneck (Mf bottleneck) of the Site #0 is removed. Accordingly, the Mf bottleneck of the Site #0 reaches Ms=5, and the FS #0 subordinate to the Site #0, for which neither the Mf bottleneck, the Mn bottleneck and the Md bottleneck is set, is present, therefore the Ms bottleneck is set.

Figure 34:
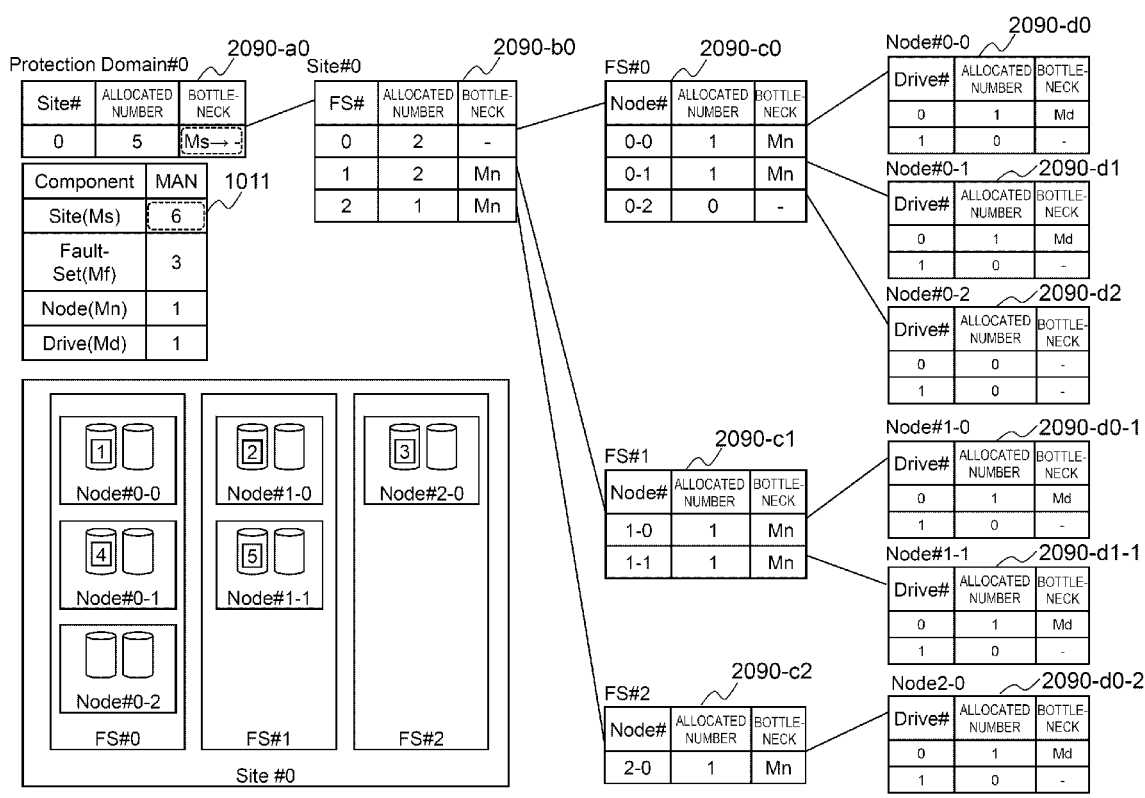
FIG. 34 illustrates the example of the state transition of the allocated number management table and the MAN management table, involved in the physical chunk allocation process according to the first embodiment (part 8).

Next, as shown in FIG. 34, Ms in the MAN management table 1011 is incremented to "6". Then, the Ms bottleneck of the Site #0, which is a bottleneck, is deleted. That is, Ms in the MAN management table 1011 is incremented, and the bottleneck of the Site #0 (Ms bottleneck) is removed.

Figure 35:
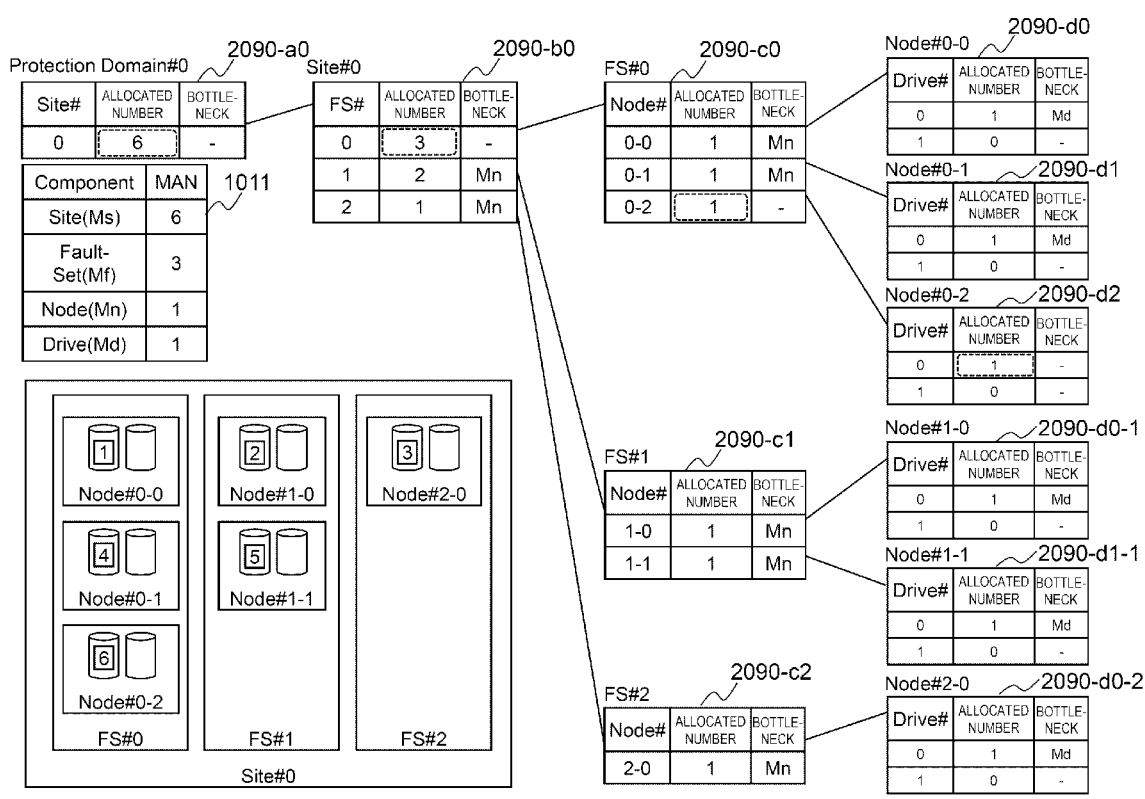
FIG. 35 illustrates the example of the state transition of the allocated number management table and the MAN management table, involved in the physical chunk allocation process according to the first embodiment (part 9).

Next, as shown in FIG. 35, the allocated number of the Site #0 of the Protection Domain #0 is updated to 6, the allocated number of the FS #0 of the Site #0 is updated to 3, and the allocated number of a Drive 0 of the Node #0-2 is updated to 1. Thereby the sixth physical chunk is allocated.

Figure 36:
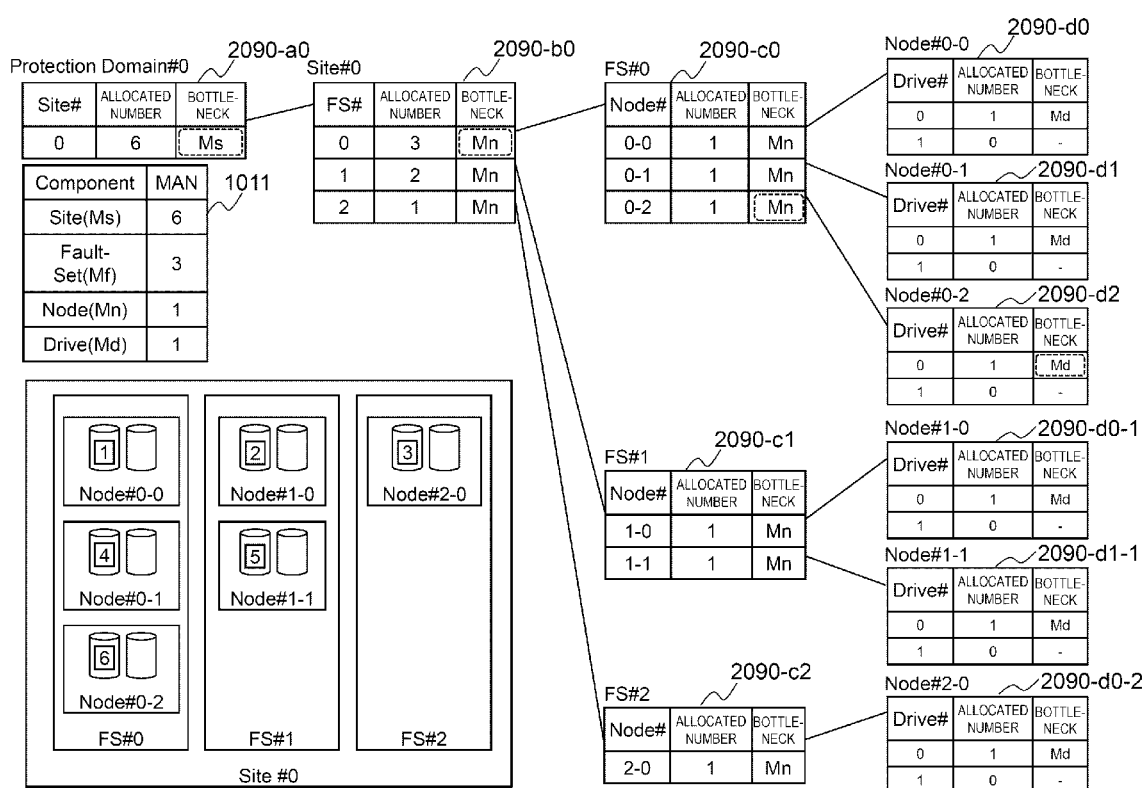
FIG. 36 illustrates the example of the state transition of the allocated number management table and the MAN management table, involved in the physical chunk allocation process according to the first embodiment (part 10).

Next, as shown in FIG. 36, the Ms bottleneck is set for the Site #0 of the Protection Domain #0, the Mn bottleneck is set for the FS #0 of the Site #0, the Mn bottleneck is set for the Node #0-2 of the F #0, and the Md bottleneck is set for the Drive #0 of the Node #0-2. Here, as shown in FIG. 36, all FSs subordinate to the Site #0 have the Mn bottleneck.

Figure 37:
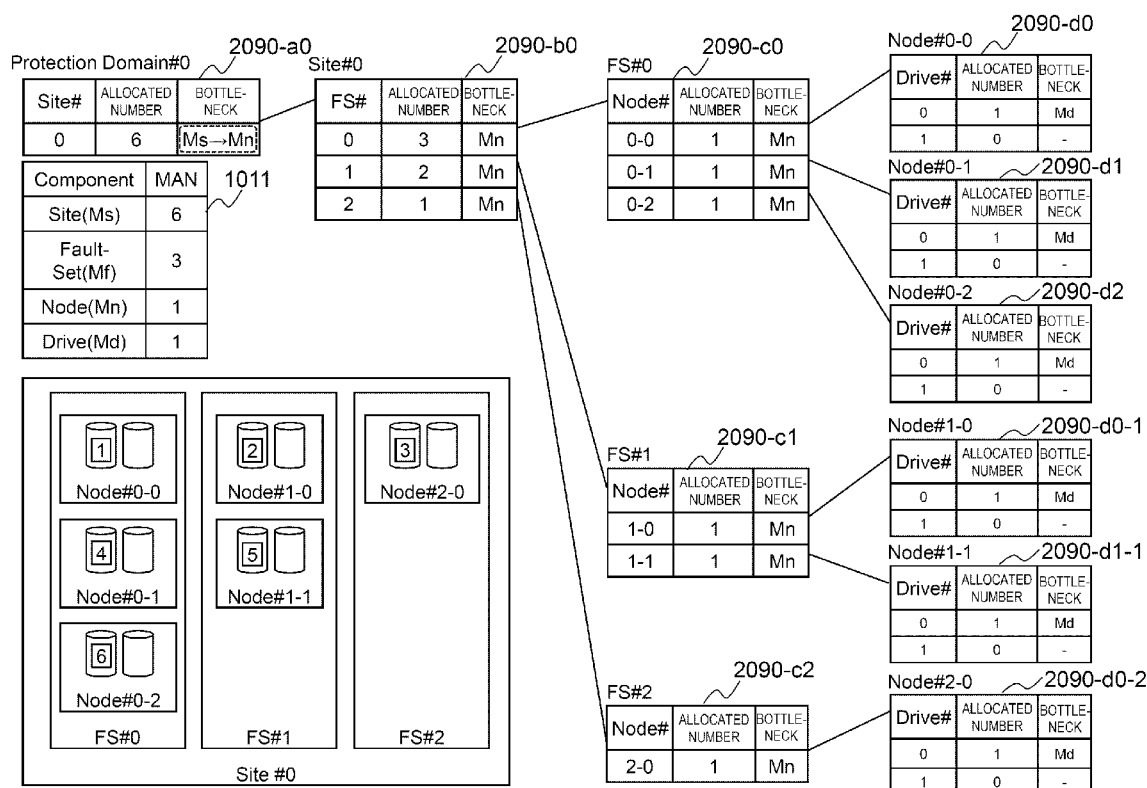
FIG. 37 illustrates the example of the state transition of the allocated number management table and the MAN management table, involved in the physical chunk allocation process according to the first embodiment (part 11).
Figure 38:
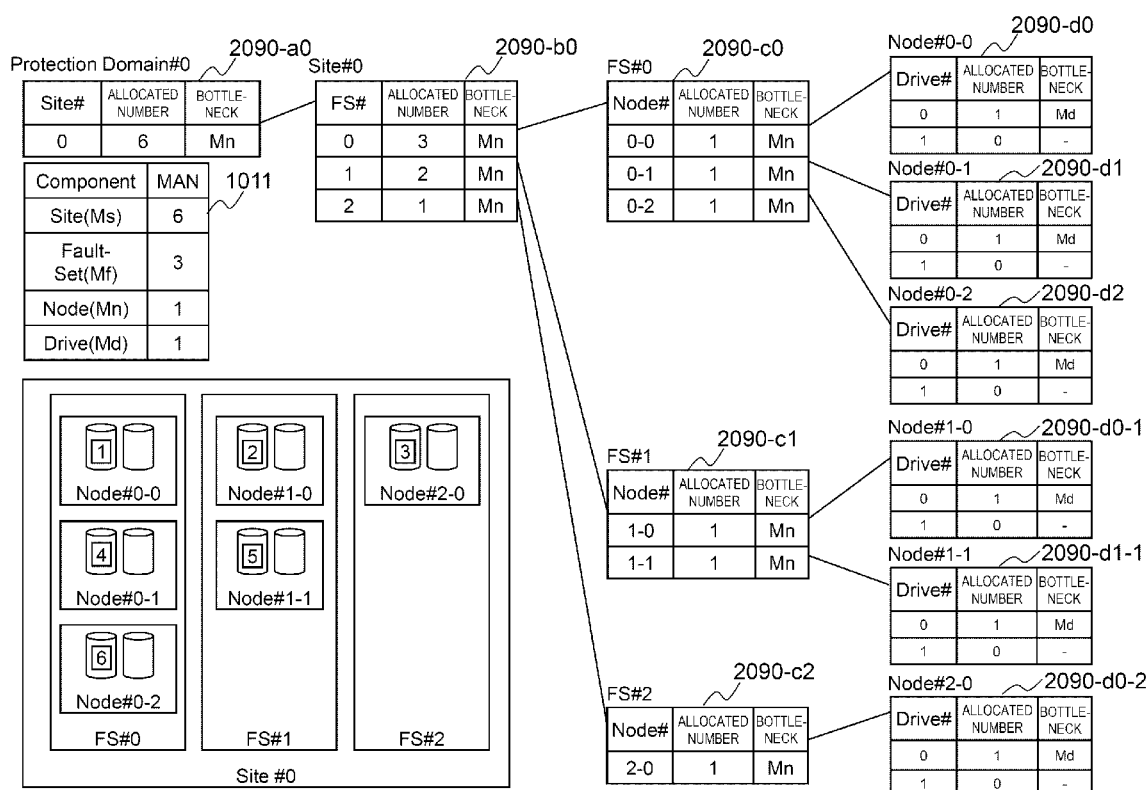
FIG. 38 illustrates the example of the state transition of the allocated number management table and the MAN management table, involved in the physical chunk allocation process according to the first embodiment (part 12).

Therefore, as shown in FIG. 37, the bottleneck of the Site #0 of the Protection Domain #0 is changed from the Ms bottleneck to the Mn bottleneck (high-order update). As described above, the allocation of the sixth physical chunk is completed as shown in FIG. 38.

Next, with reference to FIGS. 39 to 42, a state in which a seventh physical chunk is allocated to a Drive #1 of the Node #1-0 is shown.

Figure 39:
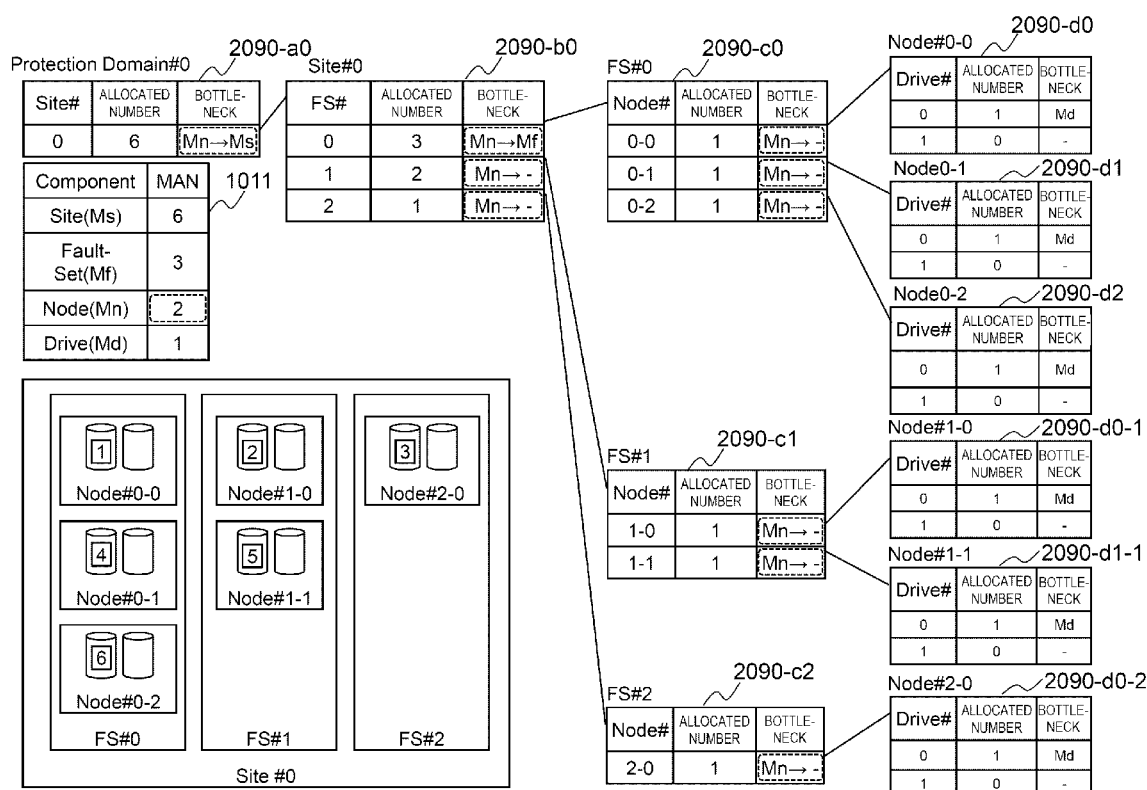
FIG. 39 illustrates the example of the state transition of the allocated number management table and the MAN management table, involved in the physical chunk allocation process according to the first embodiment (part 13).

First, as shown in FIG. 39, since the Site #0 of the Protection Domain #0 has the Mn bottleneck, Mn in the MAN management table 1011 is incremented to "2" in order to change the Mn bottleneck to a Ms bottleneck. Then, the Site #0 of the Protection Domain #0 has the Mn bottleneck changed into the Ms bottleneck, the FS #0 of the Site #0 has the Mn bottleneck changed into the Mf bottleneck, the Mn bottlenecks of FS #1 to FS #2 subordinate to the Site #0 are deleted, the Mn bottlenecks of the Node #0-0 to Node #0-2 subordinate to the FS #0 are deleted, the Mn bottlenecks of the Node #1-0 to the Node #1-1 subordinate to the FS #1 are deleted, and the Mn bottleneck of the Node #2-0 subordinate to the FS #2 is deleted. That is, Mn in the MAN management table 1011 is incremented, and the bottleneck (Mn bottleneck) of Site #0 is removed.

Figure 40:
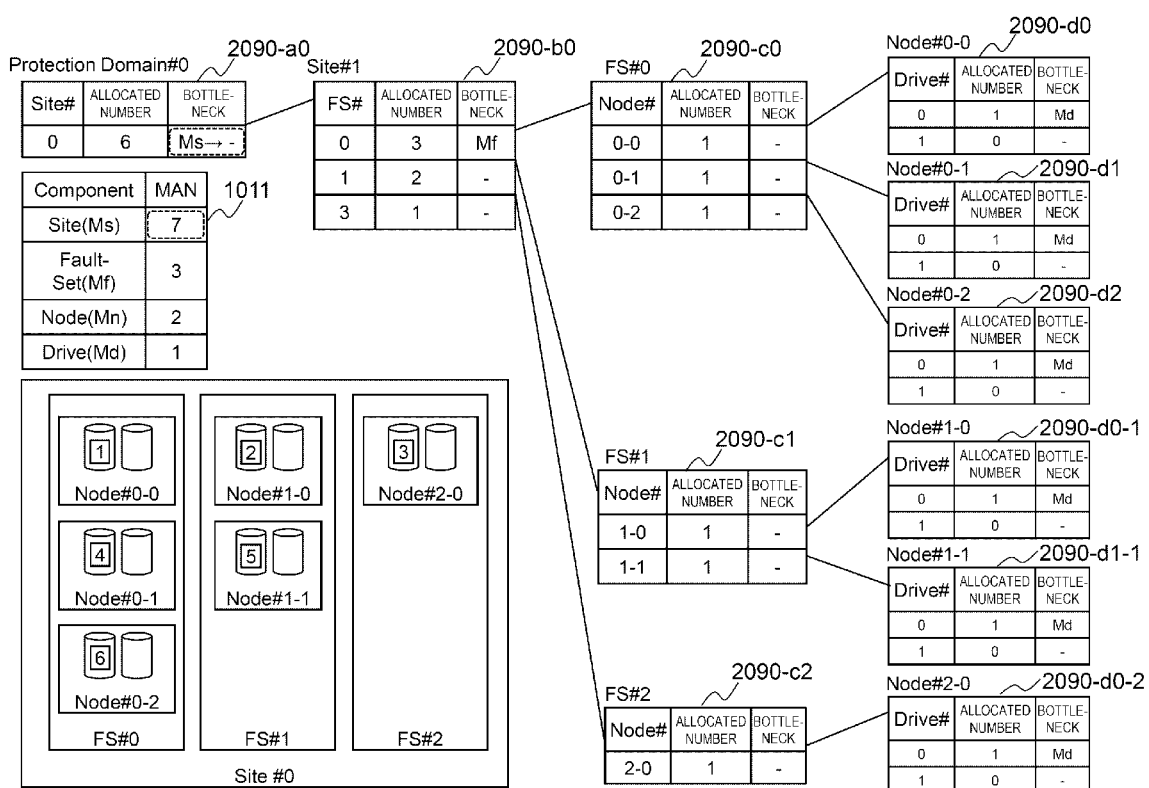
FIG. 40 illustrates the example of the state transition of the allocated number management table and the MAN management table, involved in the physical chunk allocation process according to the first embodiment (part 14).

Next, as shown in FIG. 40, Ms in the MAN management table 1011 is incremented to "7". Then, the Ms bottleneck of the Site #0, which is a bottleneck, is deleted. That is, Ms in the MAN management table 1011 is incremented, the bottleneck (Ms bottleneck) of the Site #0 is removed, and all Sites (Site #0) in the Protection Domain #0 have the Ms bottlenecks so as to eliminate a state of being unable to allocate physical chunks.

Figure 41:
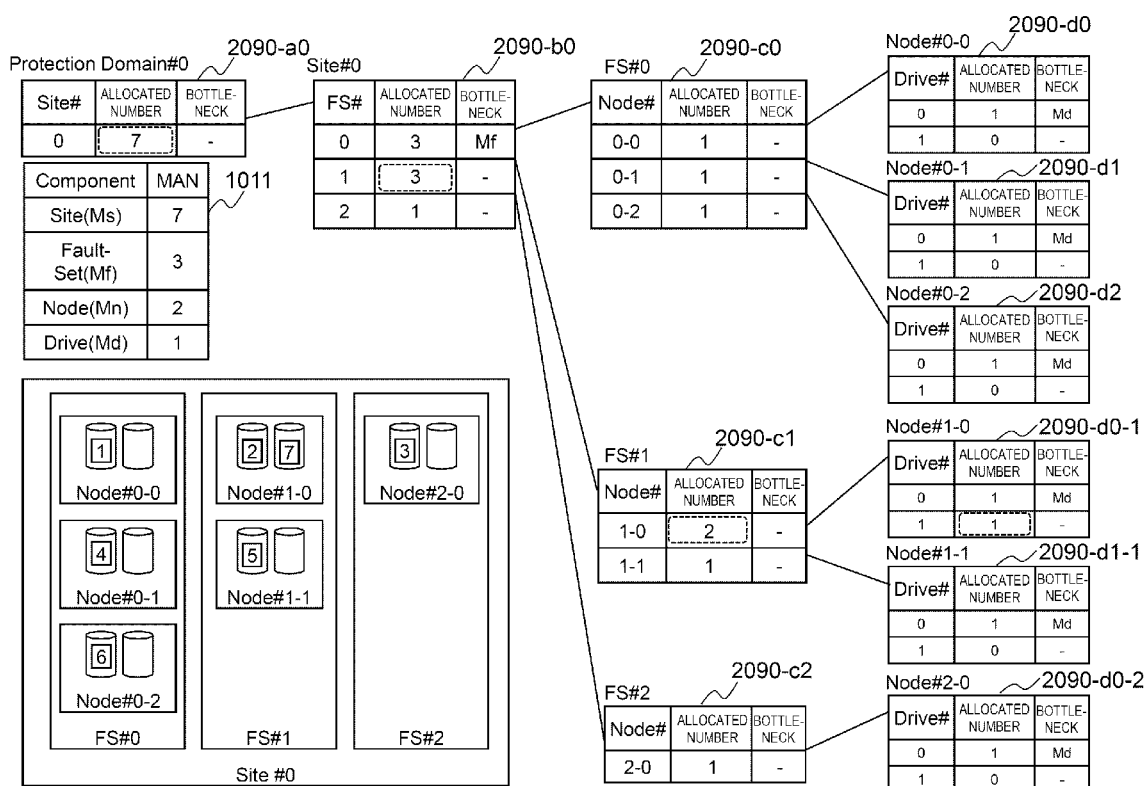
FIG. 41 illustrates the example of the state transition of the allocated number management table and the MAN management table, involved in the physical chunk allocation process according to the first embodiment (part 15).

Next, as shown in FIG. 41, the allocated number of the Site #0 of the Protection Domain #0 is updated to 7, the allocated number of the FS #1 of the Site #0 is updated to 3, the allocated number of the Node #1-0 of the FS #1 is updated to 3, and the allocated number of the Drive #1 of the Node #1-0 is updated to 1. Thereby the seventh physical chunk is allocated.

Figure 42:
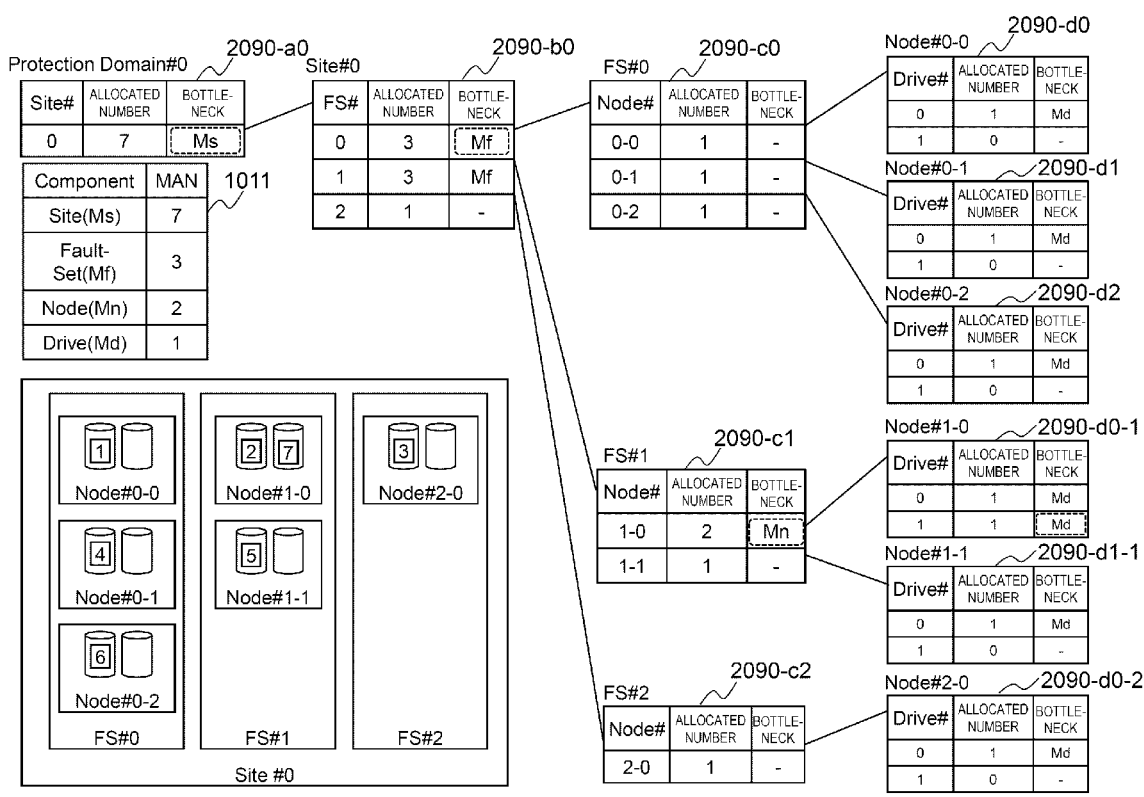
FIG. 42 illustrates the example of the state transition of the allocated number management table and the MAN management table, involved in the physical chunk allocation process according to the first embodiment (part 16).

Next, as shown in FIG. 42, the Ms bottleneck is set for the Site #0 of the Protection Domain #0, the Mf bottleneck is set for the FS #1 of the Site #0, the Mn bottleneck is set for the Node #1-0 of the FS #1, and the Md-bottleneck is set for the Drive #1 of the Node #1-0. As described above, the allocation of the seventh physical chunk is completed as shown in FIG. 42.

In the first embodiment described above, the maximum allocated number of data units (physical chunks) is managed for each of the hierarchical components including the Storage devices, the Nodes bundling the Storage devices, the Fault Sets bundling the Nodes, and the Sites bundling the Fault Sets, all of which constitute the storage system. Each data unit constituting the data set of Erasure Coding is allocated equally to a plurality of storage devices so as not to exceed the maximum allocated number for each component. Accordingly, each data unit can be arranged such that a certain fault tolerance is ensured under the constraints of the required data set redundancy and the configuration of the storage system. Therefore, for example, even with a small-scale configuration at the start, a storage system can be constructed with a configuration having a high degree of freedom and ensuring high reliability as much as possible, while achieving a balance between cost and reliability.

Further, according to the first embodiment, since each data unit (physical chunk) of the data set is arranged in the system as equally as possible, it is possible to perform maintenance of a component unit such as Fault Set or Drive within a range of fault tolerance. In other words, it may be possible to stop a certain component for maintenance within a range where no data loss occurs, and the maintainability can be improved.

Second Embodiment

Only differences from the first embodiment will be described below, and redundant description will be omitted.

(Rebalance Process performed at the Time of Changing Number of Components in System)

Figure 43:
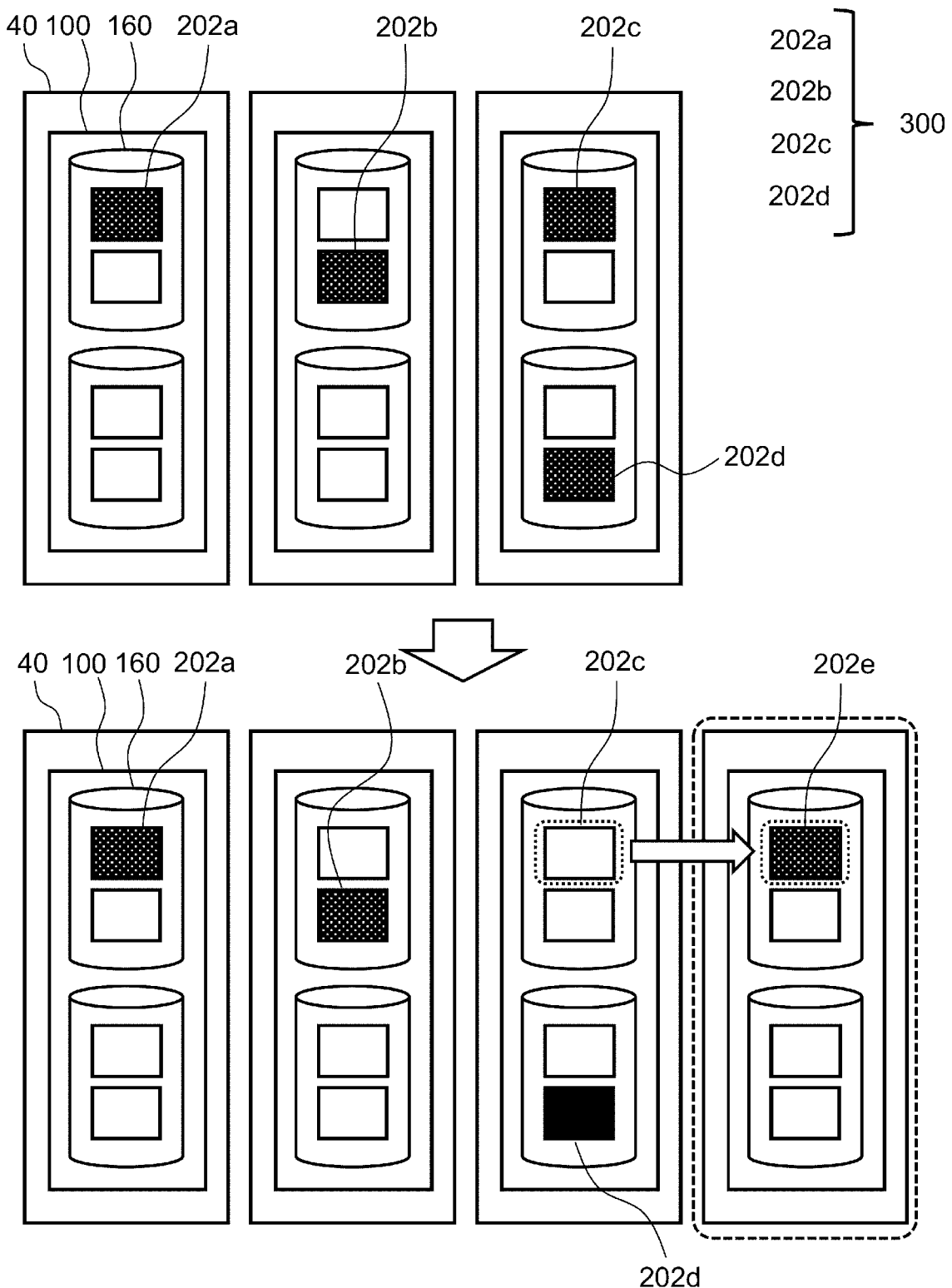
FIG. 43 is a conceptual diagram illustrating a rebalance process performed at the time of changing the number of components in a system according to a second embodiment.

FIG. 43 is a diagram conceptually illustrating a rebalance process performed at the time of changing the number of components in a system according to a second embodiment. In an upper part of FIG. 43, the allocated physical chunks 202 for the chunk group 300 of 3D1P before component addition is shown in black.

In the case of the upper part of FIG. 43, when the fault tolerance of the FS 40 is 0 and a failure occurs in the FS 40 to which two physical chunks 202 (202c, 202d) are allocated, data of the chunk group 300 is lost.

On the other hand, as shown in a lower part of FIG. 43, when a component is added to the FS 40, the physical chunks 202 are rebalanced and the physical chunk 202c is moved to an added physical chunk 202e of the FS 40, so that a fault tolerance 1 of the FS 40 can be obtained.

Conversely, when a component is reduced from the FS 40, it is necessary to prevent the fault tolerance from degrading as much as possible. For example, when a Node is to be reduced, it is necessary to migrate data stored in the Node to be reduced to another Node before the Node is removed. By migrating physical chunks belonging to the same chunk group 300 to a FS 40, to which physical chunks are not allocated, as much as possible, the component of the system can be reduced while maintaining the fault tolerance.

When the fault tolerance is degraded due to the component reduction, operations such as notifying the user of the degradation or presenting an option of rejecting the component reduction request may be performed.

(Program Stored in Control Program Storage Area in Memory According to Second Embodiment)

Figure 44:
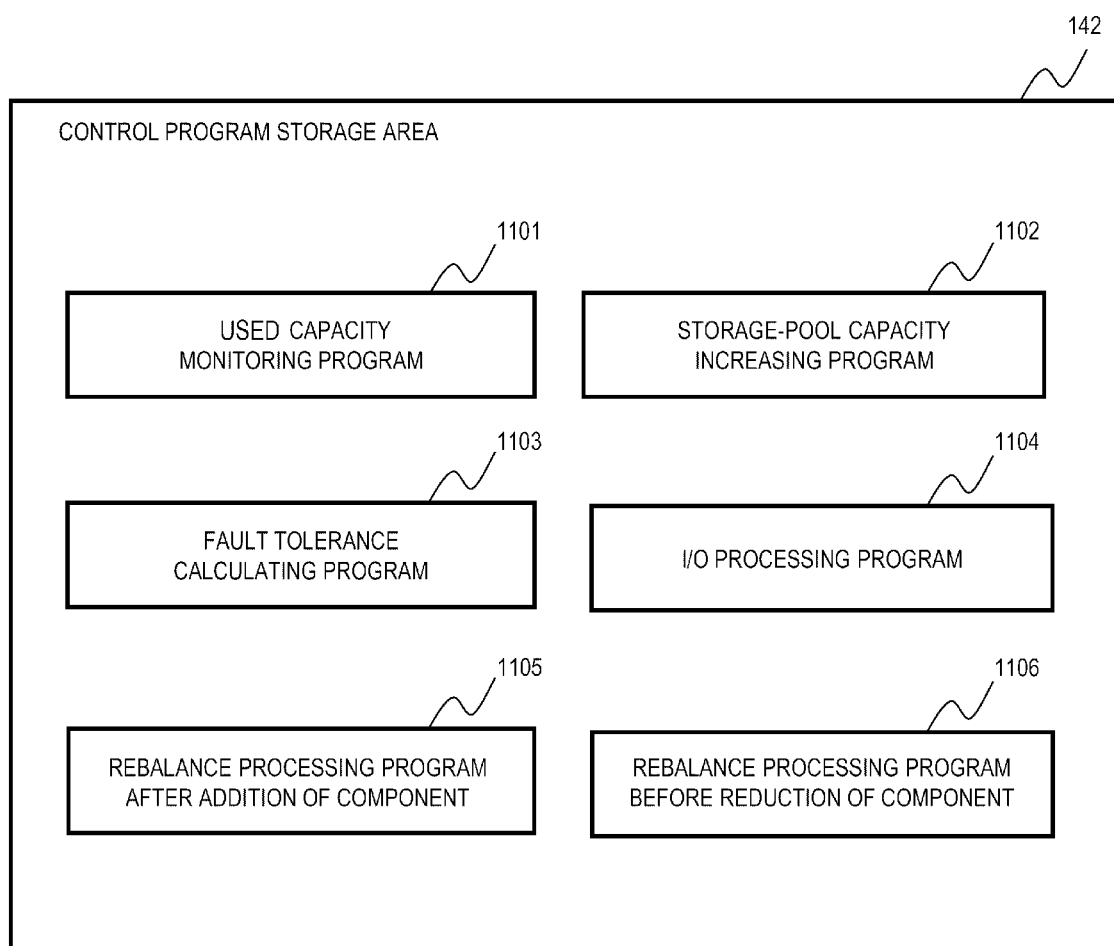
FIG. 44 illustrates an example of a program stored in a control program storage area in a memory according to the second embodiment.

FIG. 44 illustrates an example of programs stored in a control program storage area in a memory according to the second embodiment. In the second embodiment, a rebalance processing program 1105 after addition of a component and a rebalance processing program 1106 before reduction of a1106 are further stored in the control program storage area 142 in the memory 140 as compared with the first embodiment.

Among the plurality of Nodes 100 provided in the computer system 1, the CPU 130 of the predetermined Node 100, as a main CPU, executes a program while the other CPUs 130 operate in accordance with an instruction from the main CPU. Accordingly, processes of the rebalance processing program 1105 after addition of a component and the rebalance processing program 1106 before reduction of a component are performed.

When one or more storage devices or storage Nodes are added, the rebalance processing program 1105 after addition of a component is executed to migrate data between components to level out the used capacity among the components. In the present embodiment, by executing the rebalance processing program 1105 after addition of a component, the allocated number of the physical chunks 202 (Pchunk) may be leveled out, and the fault tolerance may be improved.

Before the one or more storage devices or storage nodes are reduced, the rebalance processing program 1106 before reduction of a component is executed to migrate the data between components to make it possible to reduce the components to be reduced. In the present embodiment, by executing the rebalance processing program 1106 before reduction of a component, migration destination of the physical chunks 202 (Pchunk) may be appropriately selected, and degradation of the fault tolerance after the component reduction may be avoided.

(Chunk Rebalance Process After Addition of Component)

Figure 45:
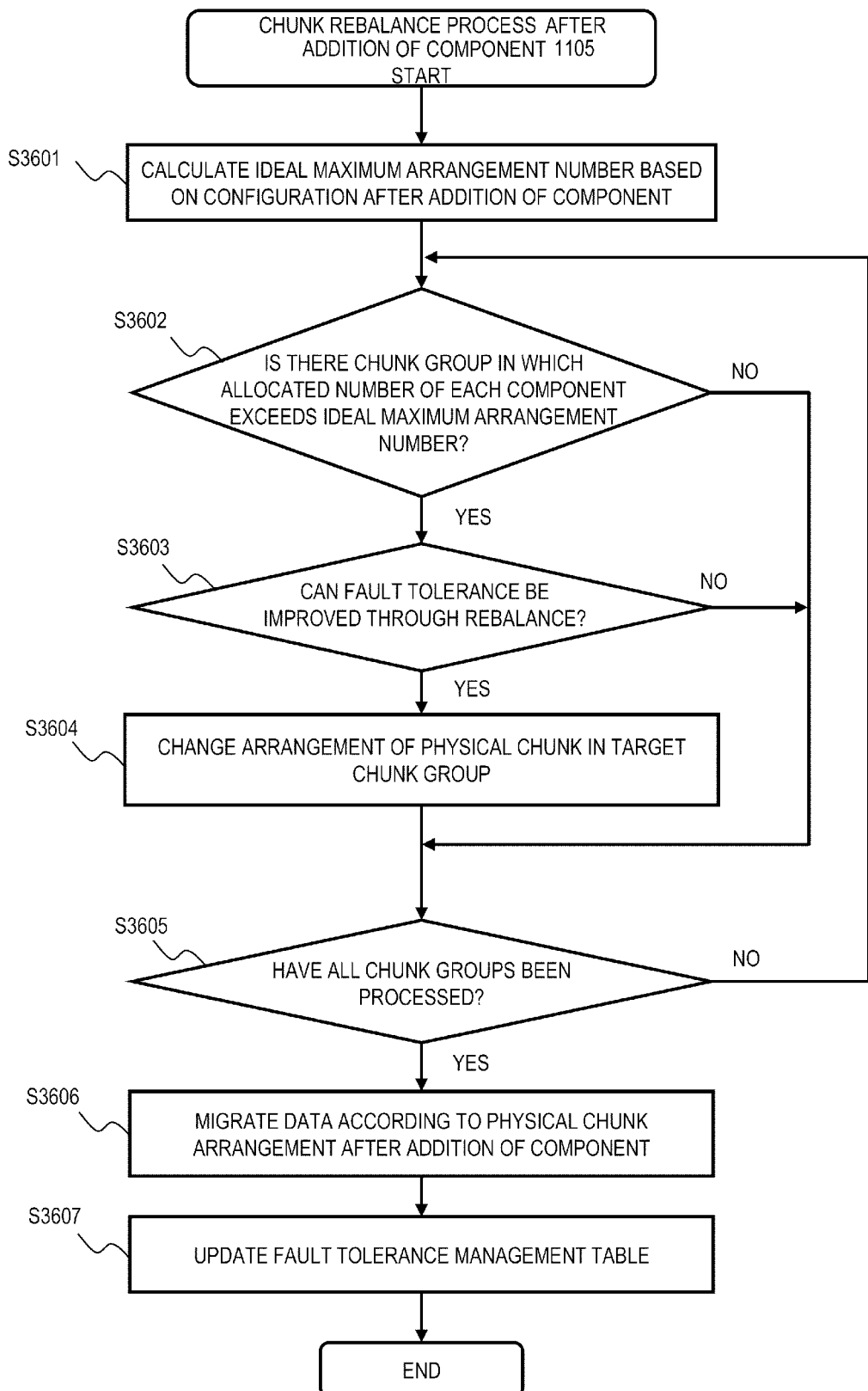
FIG. 45 is a flowchart illustrating an example of a chunk rebalance process after addition of a component according to the second embodiment.

FIG. 45 is a flowchart illustrating an example of a chunk rebalance process after addition of a component. The chunk rebalance process after addition of a component is started after component addition of the system (for example, Node or Device thereof) in accordance with a user instruction from the management server 20, to rearrange the physical chunks 202.

First, the CPU 130 calculates the ideal maximum arrangement number based on a configuration after addition of a component (step S3601). The ideal maximum arrangement number is calculated by the following equation. Floor (*) is a floor function (truncating the decimal point), ceiling (*) is a ceiling function (rounding up the decimal point), N is the total number of components X in the computer system 1, and x and y are the number of pieces of data and the number of parities respectively in data set of xDyP.

$$\text{Ideal maximum arrangement number} = \text{floor}(y/\text{ceiling}((x+y)/N)) \quad (3)$$

Next, the CPU 130 determines whether there is a chunk group 300 in which the allocated number of each component exceeds the ideal maximum arrangement number (step S3602). That is, the CPU 130 detects the chunk group 300 whose physical chunks allocated to the same Site/Fault Set/Node/Drive by a certain number or more based on the chunk group management table 1003.

When there is a chunk group in which the allocated number of each component exceeds the ideal maximum arrangement number (step S3602: YES), the CPU 130 moves the process to step S3603. When there is no chunk group in which the allocated number of each component exceeds the ideal maximum arrangement number (step S3602: NO), the CPU 130 moves the process to step S3605.

In step S3603, the CPU 130 calculates the fault tolerance after rebalance, and determines whether the fault tolerance can be improved through rebalance. When the fault tolerance can be improved through rebalance (step S3603: YES), the CPU 13 changes arrangement of the physical chunk 202 in the target chunk group 300 (step S3604). On the other hand, when the fault tolerance cannot be improved through rebalance (step S3603: NO), the CPU 130 moves the process to step S3605.

In step S3605, the CPU 130 determines whether all chunk groups 300 determined in step S3602 have been processed. When all the chunk groups 300 determined in step S3602 have been processed (step S3605: YES), the CPU 130 moves the process to step S3606. On the other hand, when all the chunk groups 300 determined in step S3602 have not been processed (step S3605: NO), the CPU 130 returns the process to step S3602.

In step S3606, the CPU 130 migrates the data according to the physical chunk arrangement after addition of a component. When a write request is issued to a migration source physical chunk 202 during the data migration, the data is written to both the migration source physical chunk 202 and a migration destination physical chunk 202. Next, the CPU 130 updates the fault tolerance management table 1012 with the fault tolerance calculated in step S3603 (step S3607). When step S3607 ends, the CPU 130 ends the chunk rebalance process after addition of a component.

(Chunk Rebalance Process Performed at the Time of Component Reduction)

Figure 46:
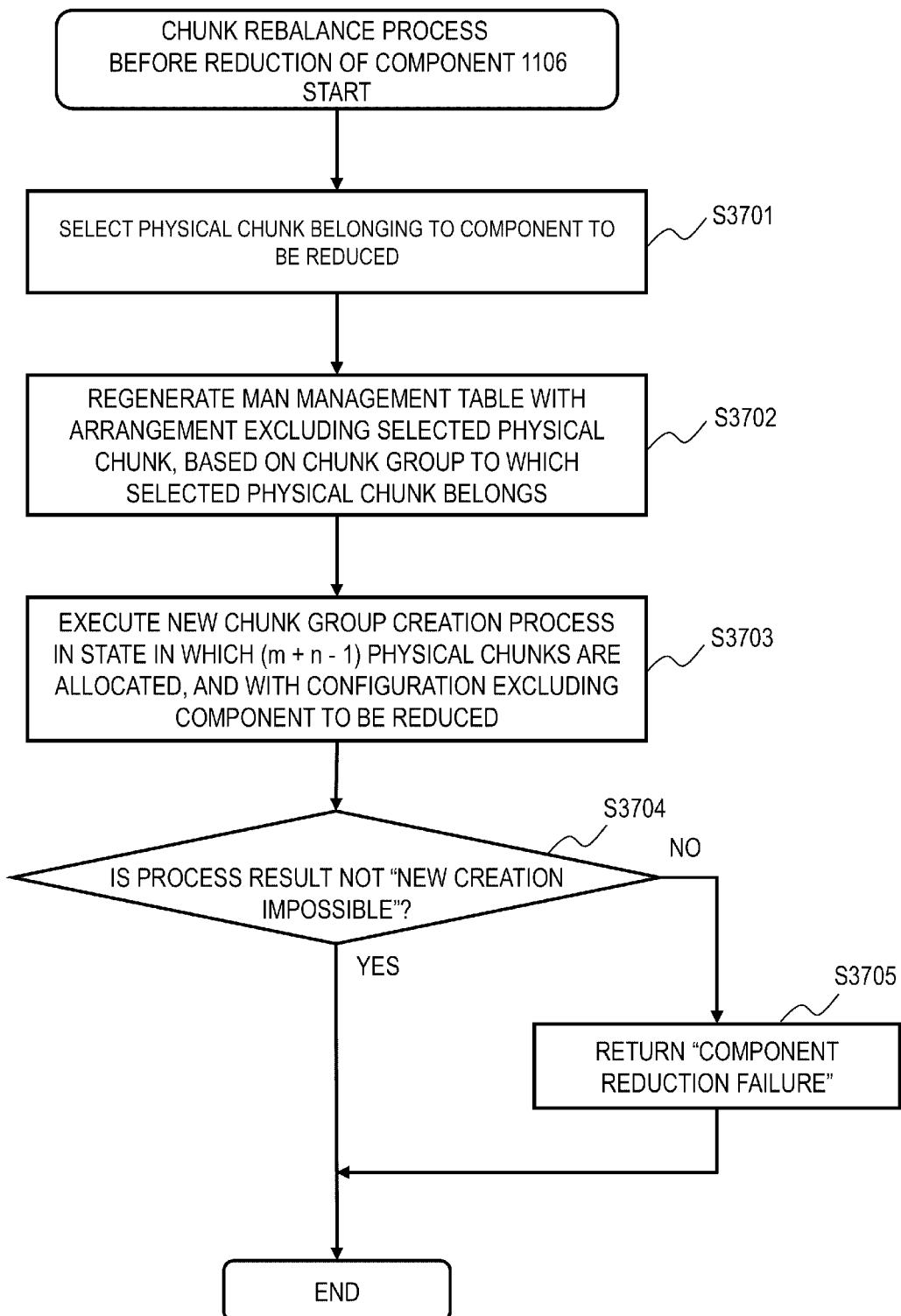
FIG. 46 is a flowchart illustrating an example of the chunk rebalance process performed at the time of component reduction according to the second embodiment.
Figure 47:
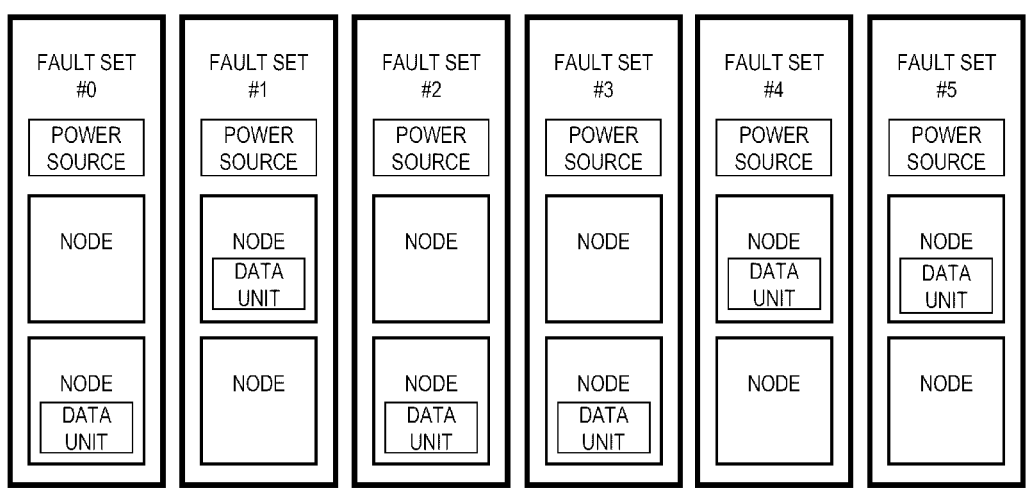
FIG. 47 illustrates a configuration example in which the same protection level (fault tolerance) is ensured for all components in a related-art storage system.

FIG. 46 is a flowchart illustrating an example of a chunk rebalance process performed at the time of component reduction according to the second embodiment. The chunk rebalance process performed at the time of component reduction is started before component reduction of the system (for example, Node or Device thereof) in accordance with a user instruction from the management server 20, to migrate data from a component to be reduced so that component reduction (physical removal) is possible.

First, the CPU 130 selects one physical chunk 202 belonging to the component to be reduced (step S3701). In step S3701, at the time of selecting one physical chunk 202 in the component (for example, a Node/Drive) to be reduced, for example, the physical chunk 202 may be sequentially selected from the top.

Next, the CPU 130 regenerates the MAN management table 1011 with an arrangement excluding the selected physical chunk 202, based on the chunk group 300 to which the selected physical chunk 202 belongs (step S3702). In step S3702, for example, in the case of 4D1P (five physical chunks 202), the MAN management table 1011 is regenerated based on an allocation state of the four physical chunks 202 excluding the selected one physical chunk 202.

Next, the CPU 130 executes a new chunk group creation process (see FIG. 22) in a state in which (m+n−1) physical chunks 202 are allocated with respect to a protection level before reduction of a component mDnP, and with a configuration excluding the component to be reduced (step S3703). For example, in the case of the 4D1P protection level, a new chunk group allocation process (see FIG. 22) is performed in a state in which the allocation of the four physical chunks 202 is completed. At this time, it is necessary to exclude the component to be reduced from the selection destination so that the physical chunk 202 is not allocated thereto.

Next, the CPU 130 determines whether a result of the new chunk group creation process performed in step S3703 is not "new creation impossible" (step S3704). When the result of the new chunk group creation process is not "new creation impossible" (step S3704: YES), the CPU 130 ends the chunk rebalance process performed at the time of component reduction.

On the other hand, when the result of the new chunk group creation process is "new creation impossible" (step S3704: NO), "component reduction failed" is returned (step S3705). When step S3705 ends, the CPU 130 ends the chunk rebalance process performed at the time of component reduction. When the available capacity is insufficient for component reduction, or when only an arrangement that does not satisfy a fault tolerance reference value set by the user is obtained, since the new chunk group creation process (see FIG. 22) returns "new creation impossible", "component reduction impossible" is returned to the request source via the management server 20.

According to the second embodiment described above, under the constraints of the required data set redundancy and the configuration of the storage system, component addition and component reduction can be performed while ensuring the highest possible reliability by rearranging each data unit such that a certain fault tolerance is ensured.

The invention is not limited to the embodiments described above, and includes various modifications. For example, the embodiments described above are described in detail for easy understanding of the invention, and the invention is not necessarily limited to those including all the configurations described above. A part of the configuration of one embodiment or modification can be replaced with the configuration of another embodiment, and the configuration of another embodiment can be added to the configuration of one embodiment. A part of the configuration of each embodiment may be added, deleted, replaced, integrated, or distributed with another configuration. The processes described in the embodiments may be appropriately distributed or integrated based on processing efficiency or implementation efficiency.

What is claimed is:

1. A storage system comprising:
   a plurality of nodes that process an I/O processing request of data, wherein
   each of the plurality of nodes includes:
      a storage device; and
      a processor configured to:
      perform the I/O processing on the storage device;
      use a data redundancy configuration in which data stored in different storage devices is combined as a data set;
      perform a fault tolerance calculation of calculating fault tolerance information for a failure of each component by using component information that is information of a component including at least one of a node and the storage device, and by using data redundancy configuration information related to the data redundancy configuration; and
   determine a data arrangement by applying the data redundancy configuration related to the calculated fault tolerance information,
   wherein the fault tolerance information related to the data redundancy configuration includes a number of components having operational continuity in a case where a failure occurs for each of plurality of component types, and
   the data arrangement, to which the data redundancy configuration is applied, is determined such that the number of components having operational continuity satisfies a predetermined reference in a case where the failure occurs for each of the plurality of component types.

2. The storage system according to claim 1, wherein
   the component includes a power source or a network, and
   the fault tolerance information includes an operational continuity in a case where a failure occurs in the power source or the network.

3. The storage system according to claim 1, wherein
   the component includes a site, and the fault tolerance information includes an operational continuity in a case where a failure occurs in the site.

4. The storage system according to claim 1, wherein
   the fault tolerance information includes information of a bottleneck region serving as a bottleneck of the data arrangement.

5. The storage system according to claim 1, wherein
   the processor determines the data redundancy configuration and the data arrangement based on the fault tolerance information.

6. The storage system according to claim 1, wherein
   the fault tolerance information is output, and a selection of the data redundancy configuration and the data arrangement is received from a user.

7. A data arrangement method in a storage system including a plurality of nodes that process an I/O processing request of data, wherein
   each of the plurality of nodes includes:
      a storage device; and
      a processor configured to:
      perform the I/O processing on the storage device;
      use a data redundancy configuration in which data stored in different storage devices is combined as a data set;
      perform a fault tolerance calculation of calculating fault tolerance information for a failure of each component by using component information that is information of a component including at least one of a node and the storage device, and by using data redundancy configuration information related to the data redundancy configuration determine a data arrangement by applying the data redundancy configuration related to the calculated fault tolerance information, wherein the fault tolerance information related to the data redundancy configuration includes a number of components having operational continuity in a case where a failure occurs for each of plurality of component types, and the data arrangement, to which the data redundancy configuration is applied, is determined such that the number of components having operational continuity satisfies a predetermined reference in a case where the failure occurs for each of the plurality of component types.

* * * * *